United States Patent [19]
Ookubo et al.

[11] Patent Number: 5,202,717
[45] Date of Patent: Apr. 13, 1993

[54] OPTICAL LENS SYSTEM-DRIVING CONTROL APPARATUS FOR DRIVING A PLURALITY OF LENS GROUPS IN ACCORDANCE WITH SMALL AMOUNT OF DATA

[75] Inventors: Mitsumasa Ookubo; Tsuyoshi Yaji; Yasushi Toizumi; Toyoji Sasaki; Shigeru Kato, all of Hachioji, Japan

[73] Assignee: Olympus Optical Co., Ltd., Tokyo, Japan

[21] Appl. No.: 696,858

[22] Filed: May 7, 1991

[30] Foreign Application Priority Data

May 8, 1990 [JP] Japan .................. 2-118210
Jun. 29, 1990 [JP] Japan .................. 2-170234

[51] Int. Cl.$^5$ ............................................. G03B 13/36
[52] U.S. Cl. .......................... 354/400; 354/195.1; 354/195.12
[58] Field of Search ............... 354/400, 402, 407, 408, 354/195.1, 195.12; 352/140; 358/227

[56] References Cited

U.S. PATENT DOCUMENTS

| | | | |
|---|---|---|---|
| 4,043,642 | 8/1977 | Hirose et al. | |
| 4,161,756 | 7/1979 | Thomas | 352/140 |
| 4,735,494 | 4/1988 | Makino et al. | 358/227 |
| 4,851,869 | 7/1989 | Ishimaru et al. | |
| 4,881,799 | 11/1989 | Ohno et al. | 354/408 |
| 4,899,190 | 2/1990 | Hata | 354/400 |
| 4,920,369 | 4/1990 | Kaneda et al. | 354/400 |
| 4,931,820 | 6/1990 | Matsuzawa et al. | |
| 4,950,054 | 8/1990 | Wada et al. | 354/400 |
| 4,951,075 | 8/1990 | Takumaru et al. | 354/400 |
| 5,005,956 | 4/1991 | Kaneda et al. | 354/402 |
| 5,036,348 | 7/1991 | Kusaka | 354/402 |

FOREIGN PATENT DOCUMENTS 1-124515 8/1989 Japan.

Primary Examiner—Russell E. Adams
Attorney, Agent, or Firm—Frishauf, Holtz, Goodman & Woodward

[57] ABSTRACT

A plurality of lens groups are movable in the direction of an optical axis. A plurality of motors are provided for the lens groups, respectively, so as to drive the lens groups. A focusing distance detector detects the position of a lens group which is one of the lens groups and which is changed in position in accordance with a change in the focusing distance, and outputs focusing distance data in accordance with the data representing the detected position of the lens group. A lens position detector detects the positions of the lens groups other than the lens group. A memory stores positional relationships between the predetermined lens group and the other lens groups. A zooming operation member is used for commanding a zooming operation. A driving controller actuates that motor which corresponds to the lens group in accordance with the zooming operation in such a manner that the motor is driven for a driving distance determined on the basis of the focusing distance data, calculates driving distances of the other lens groups in accordance with the positions detected by the lens position detector and with the positional relationships stored in the memory being referred to, and then controls the motors which correspond to the other lens groups in accordance with the calculated driving distances.

24 Claims, 40 Drawing Sheets

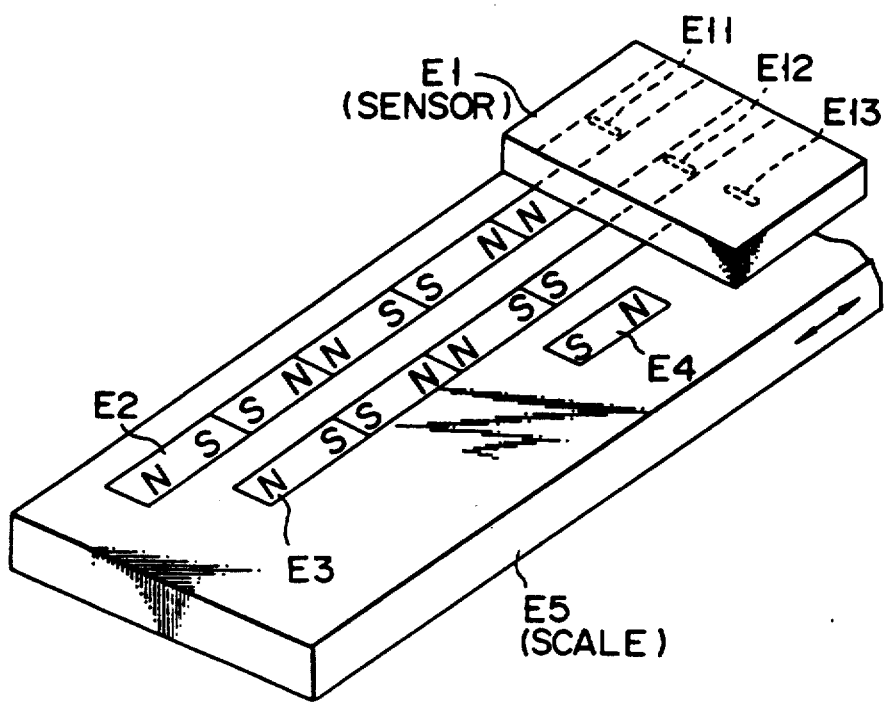
F I G. 1B
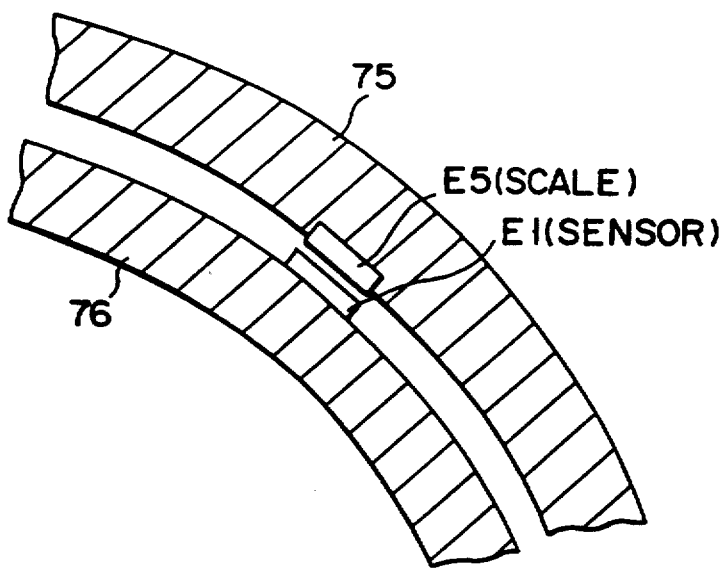
F I G. 1C

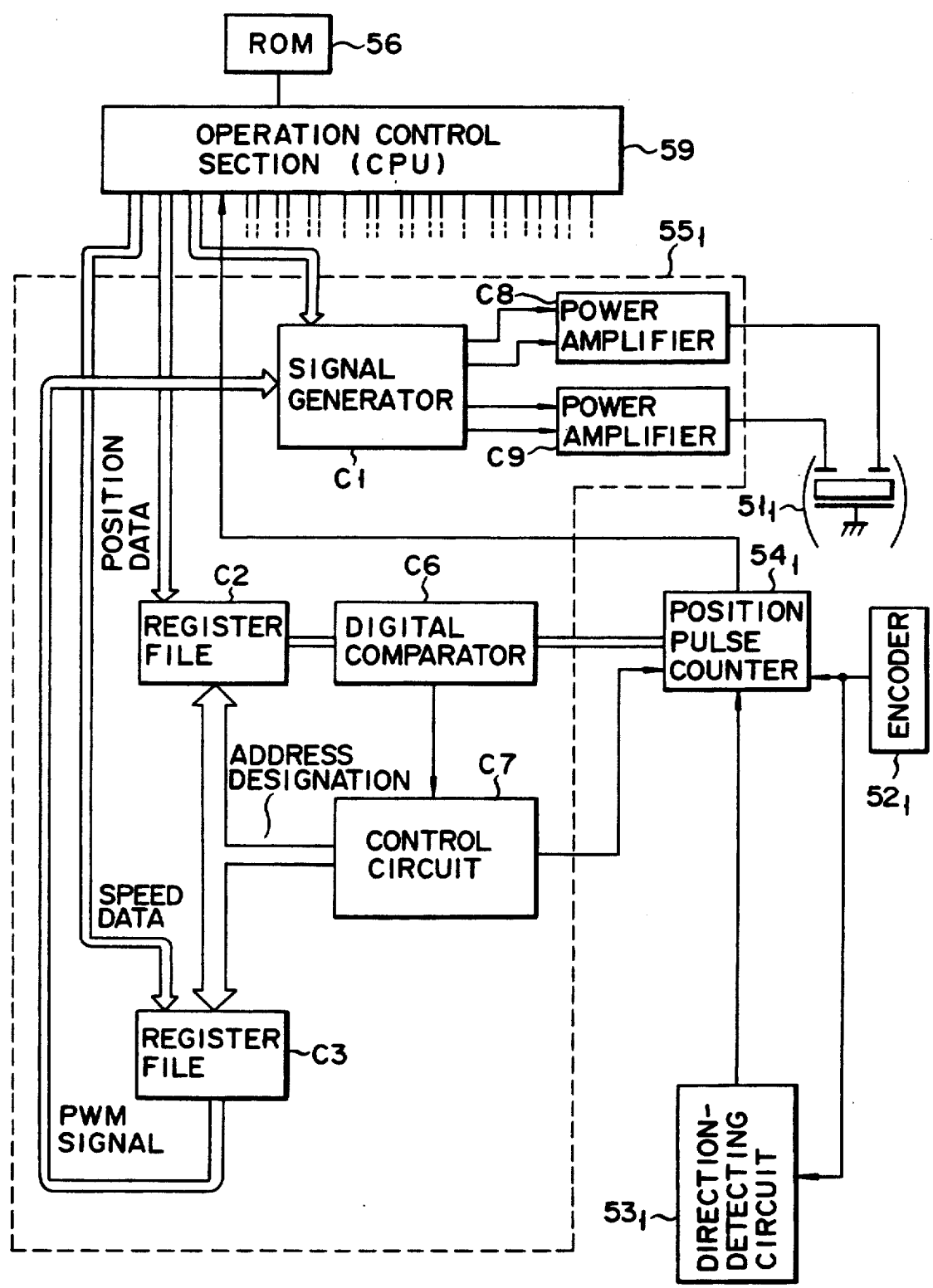
F I G. 2

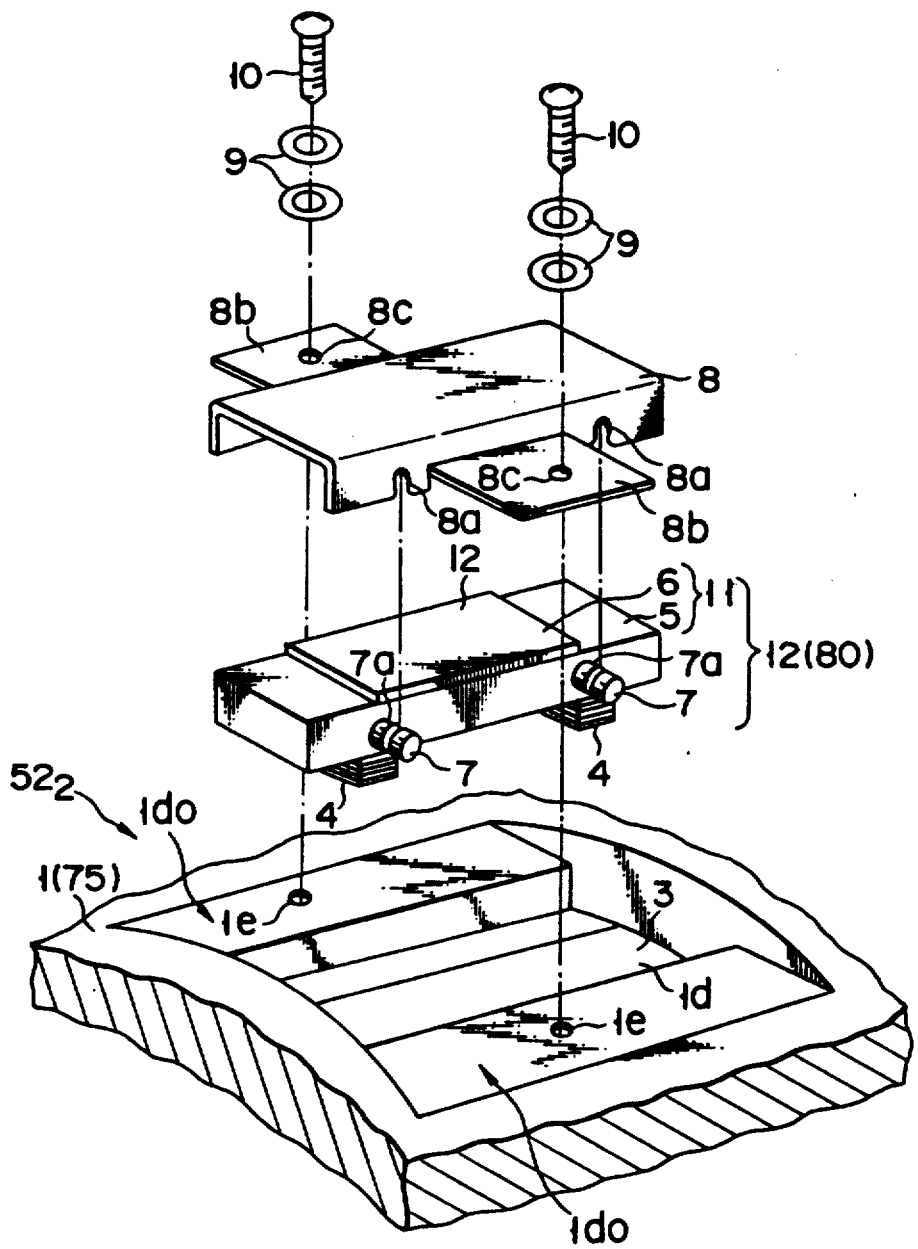
F I G. 7

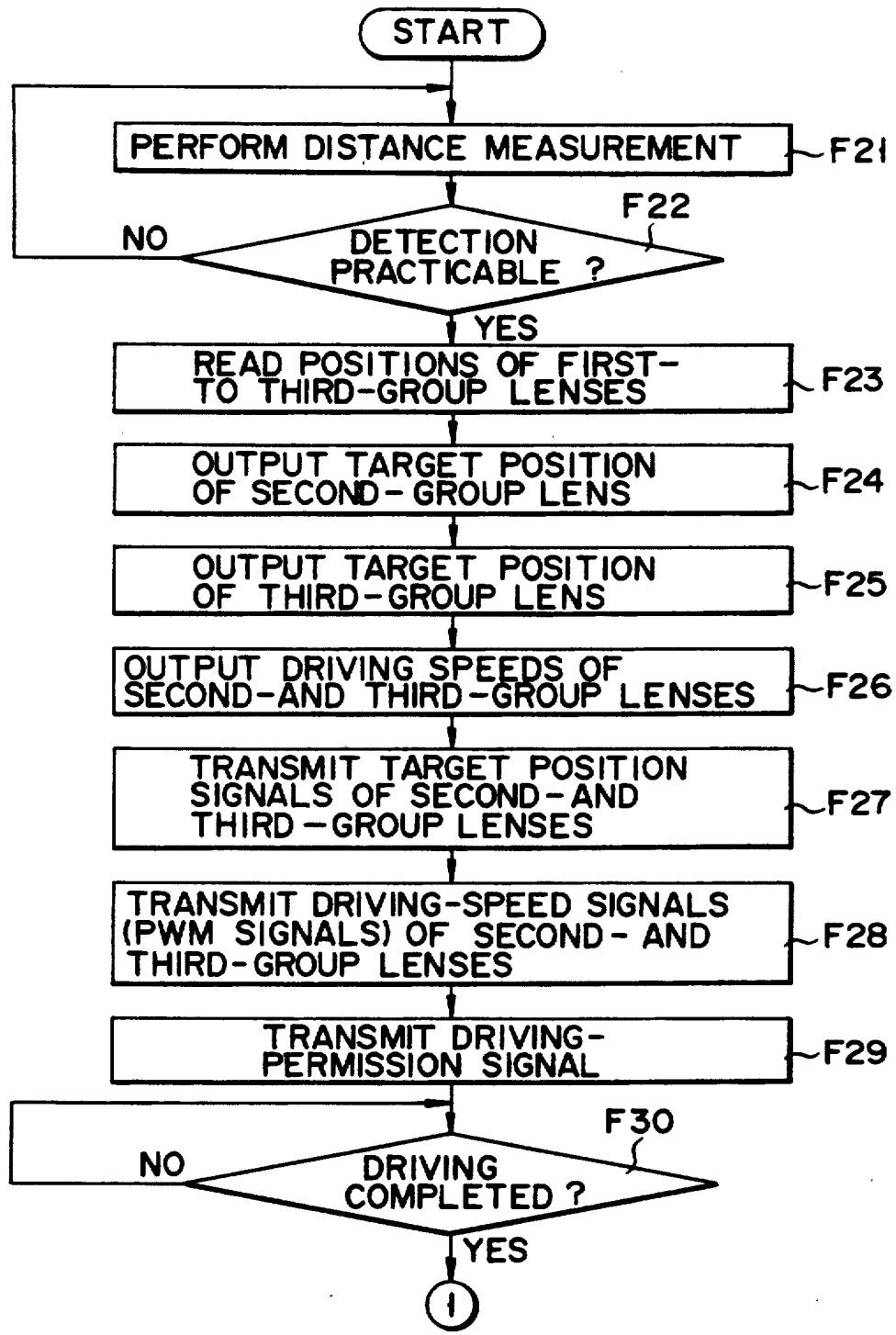
F I G. 11A

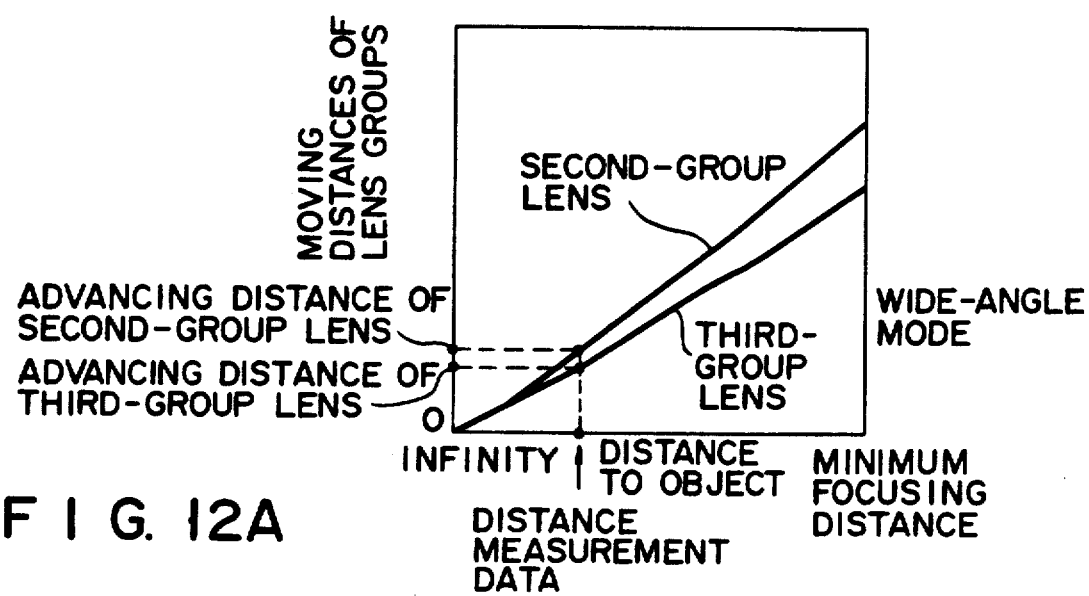
F I G. 12A
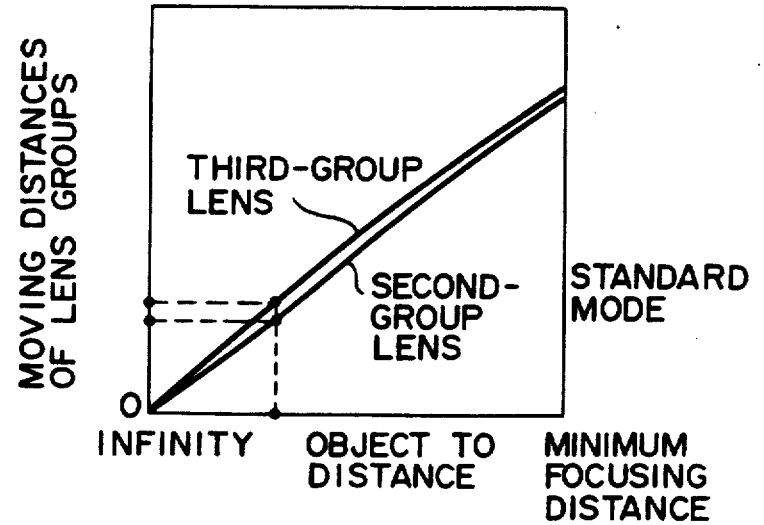
F I G. 12B
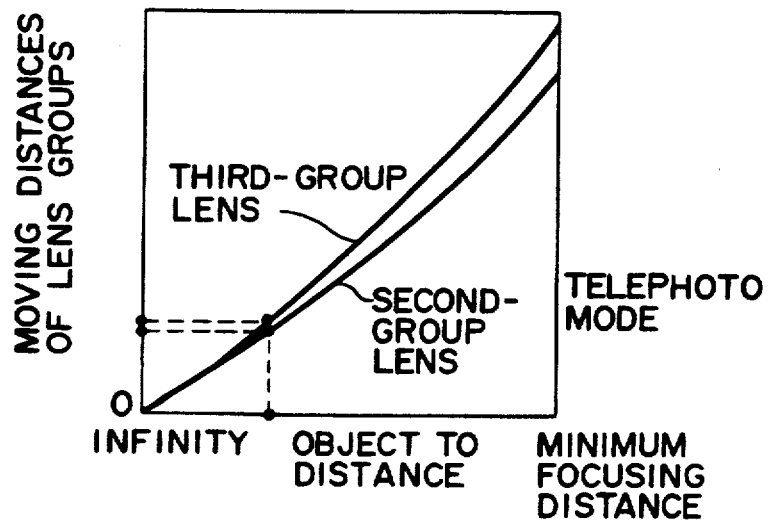
F I G. 12C

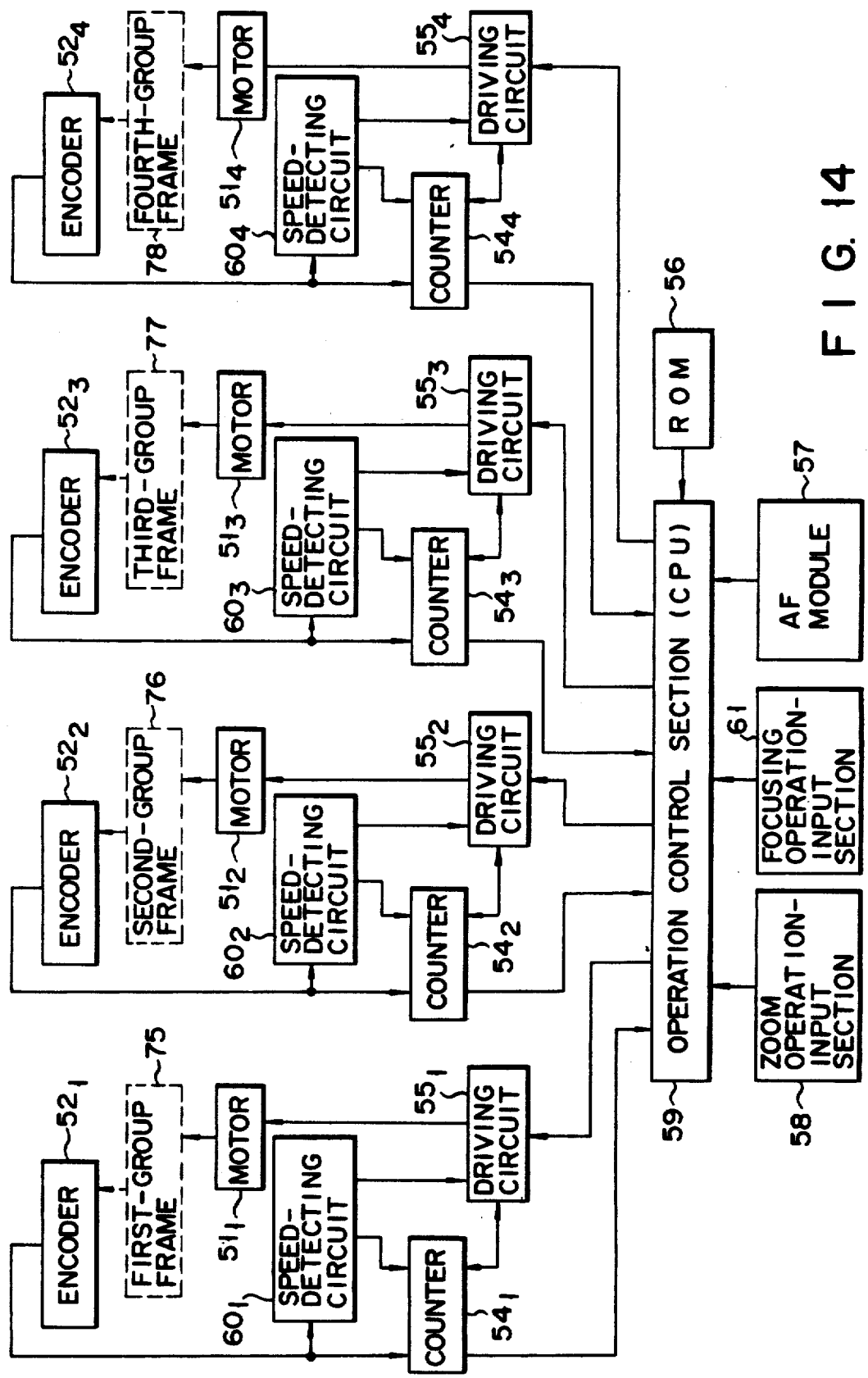
F I G. 14

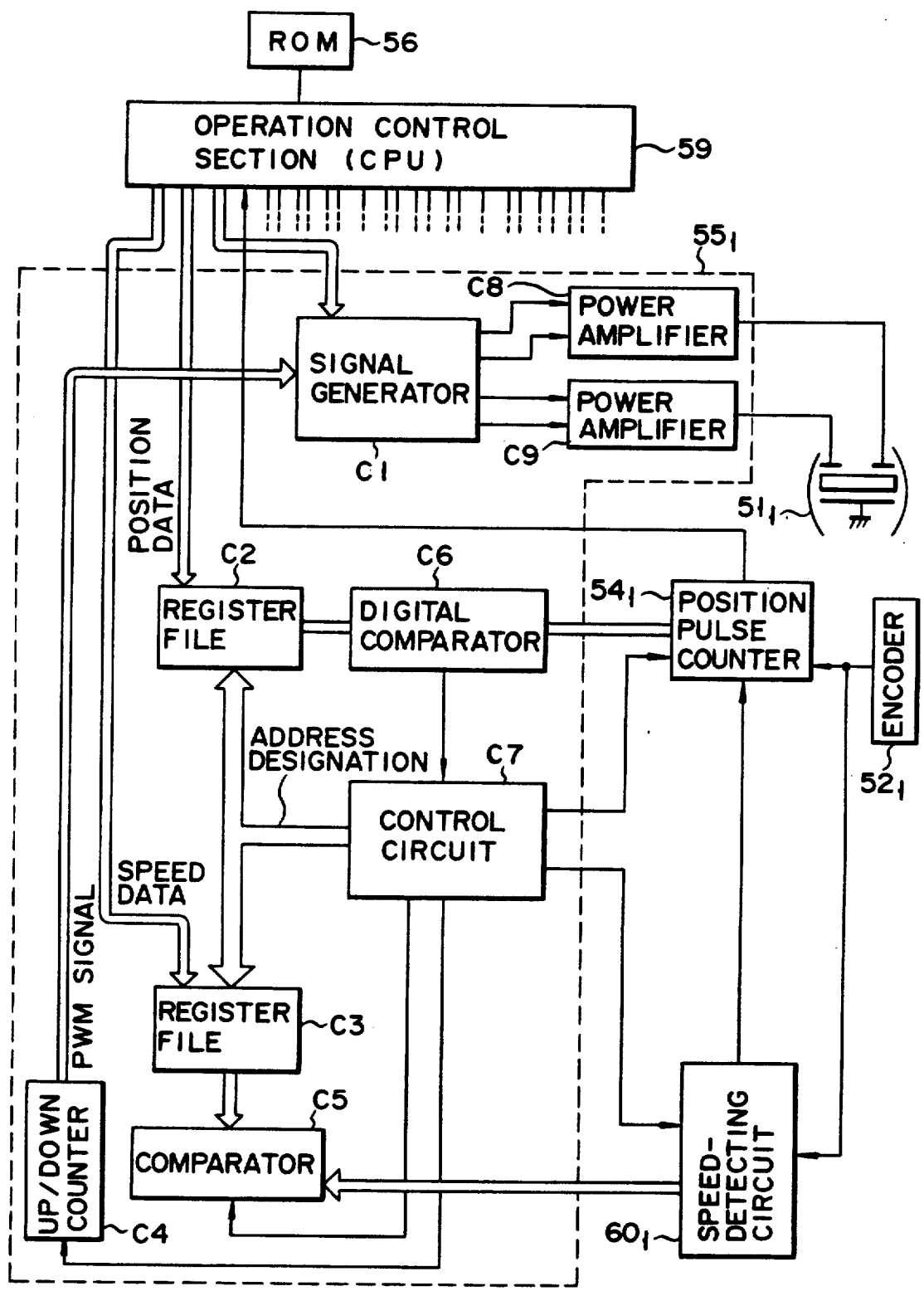
F I G. 15

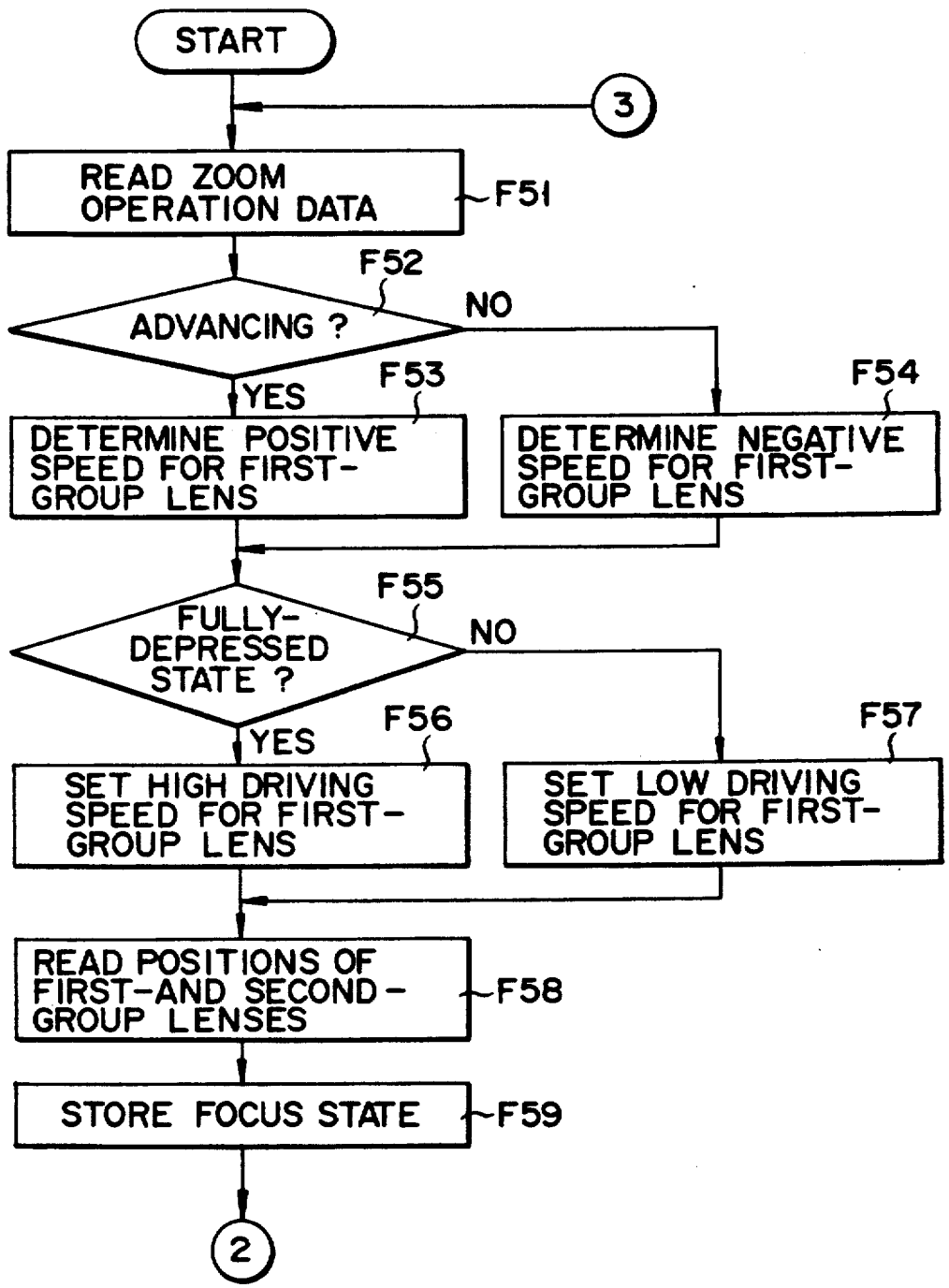
F I G. 17A

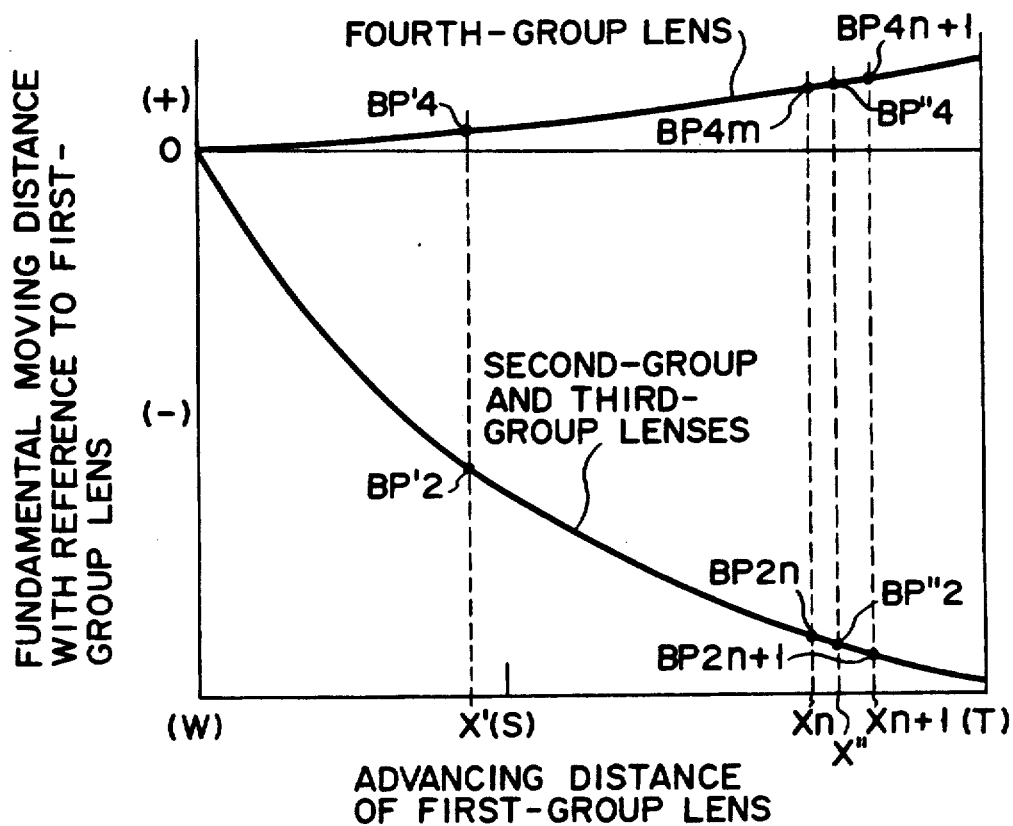
F I G. 18
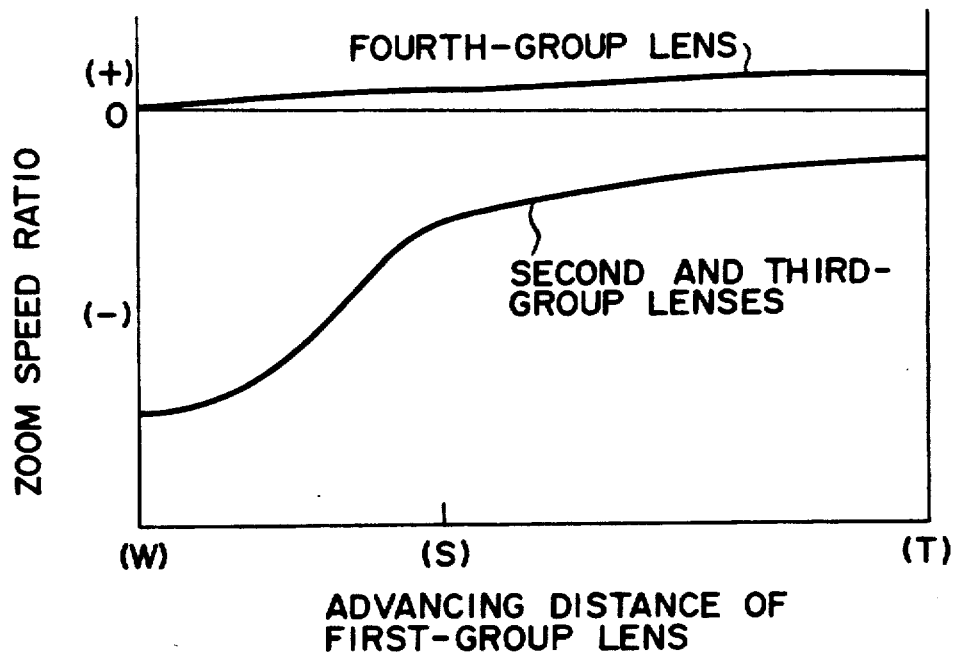
F I G. 19

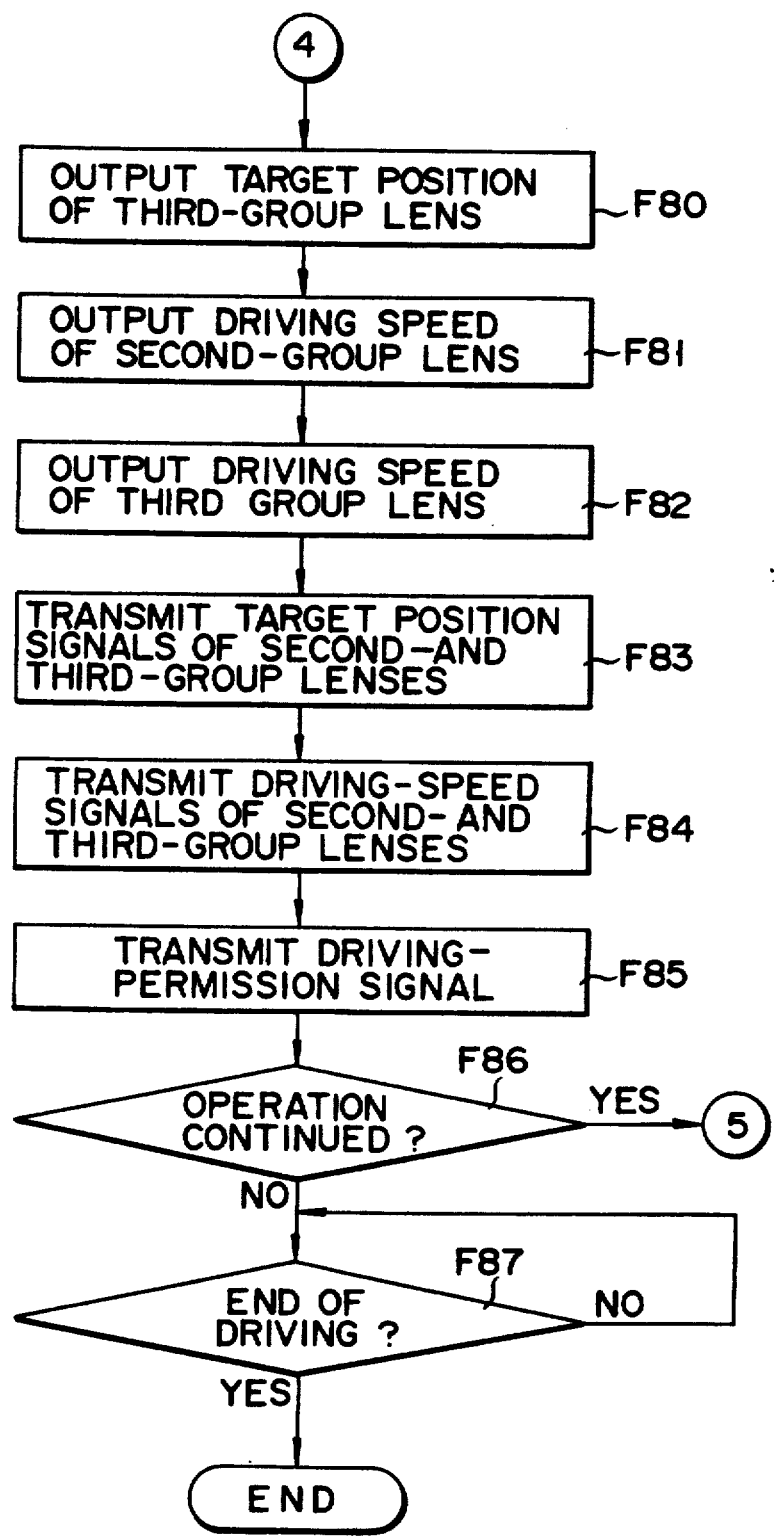
F I G. 21B

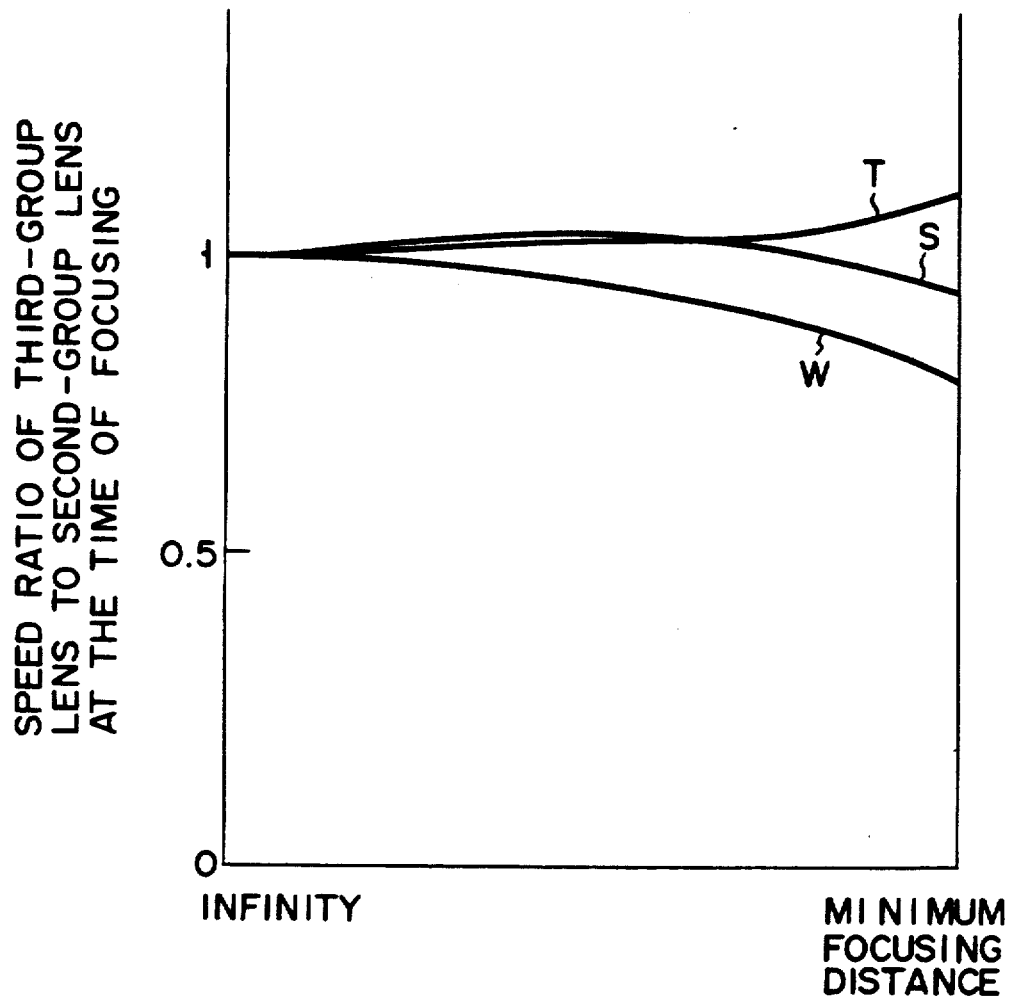
F I G. 22

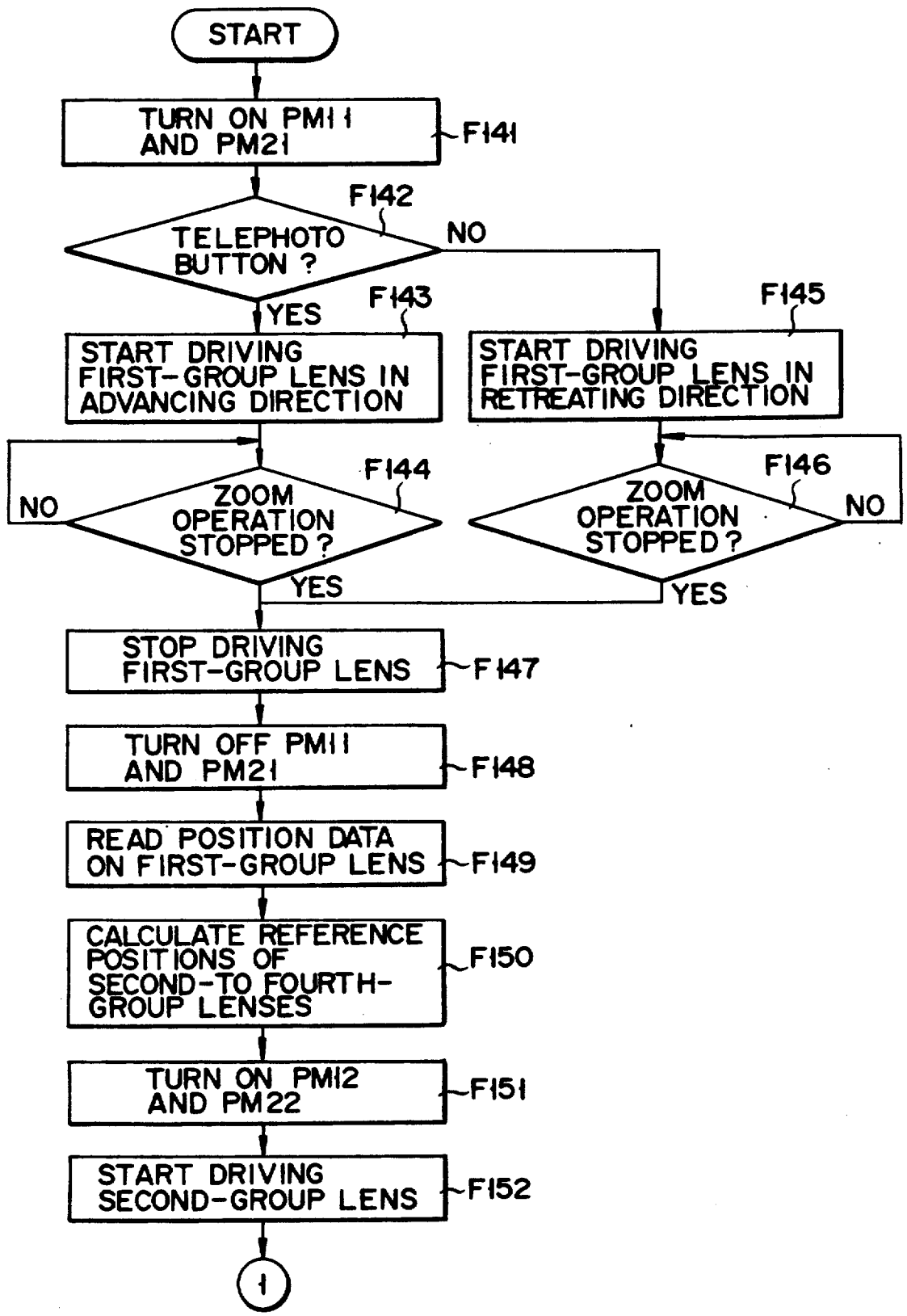
F I G. 26A

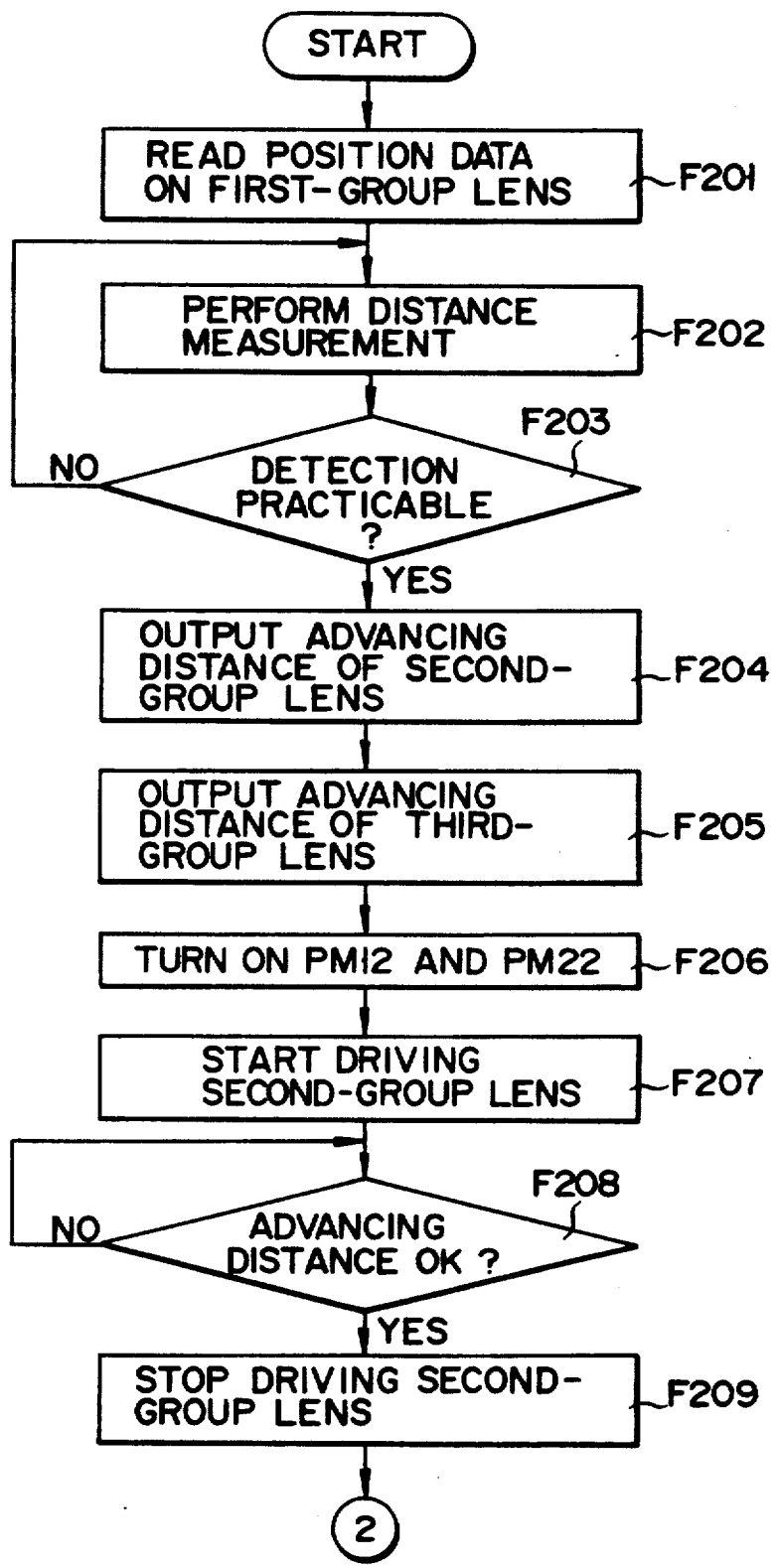
F I G. 27A

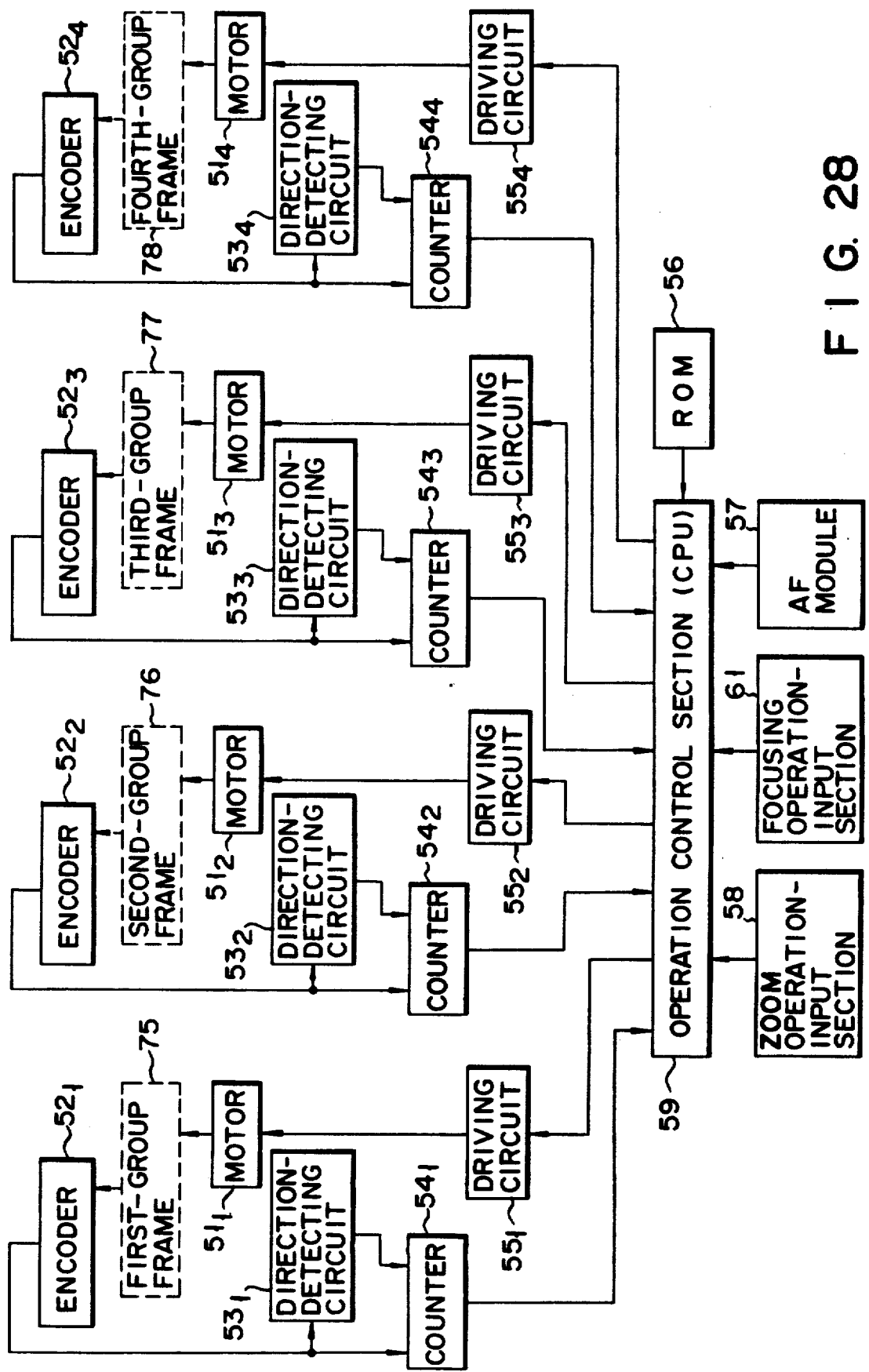
F I G. 28

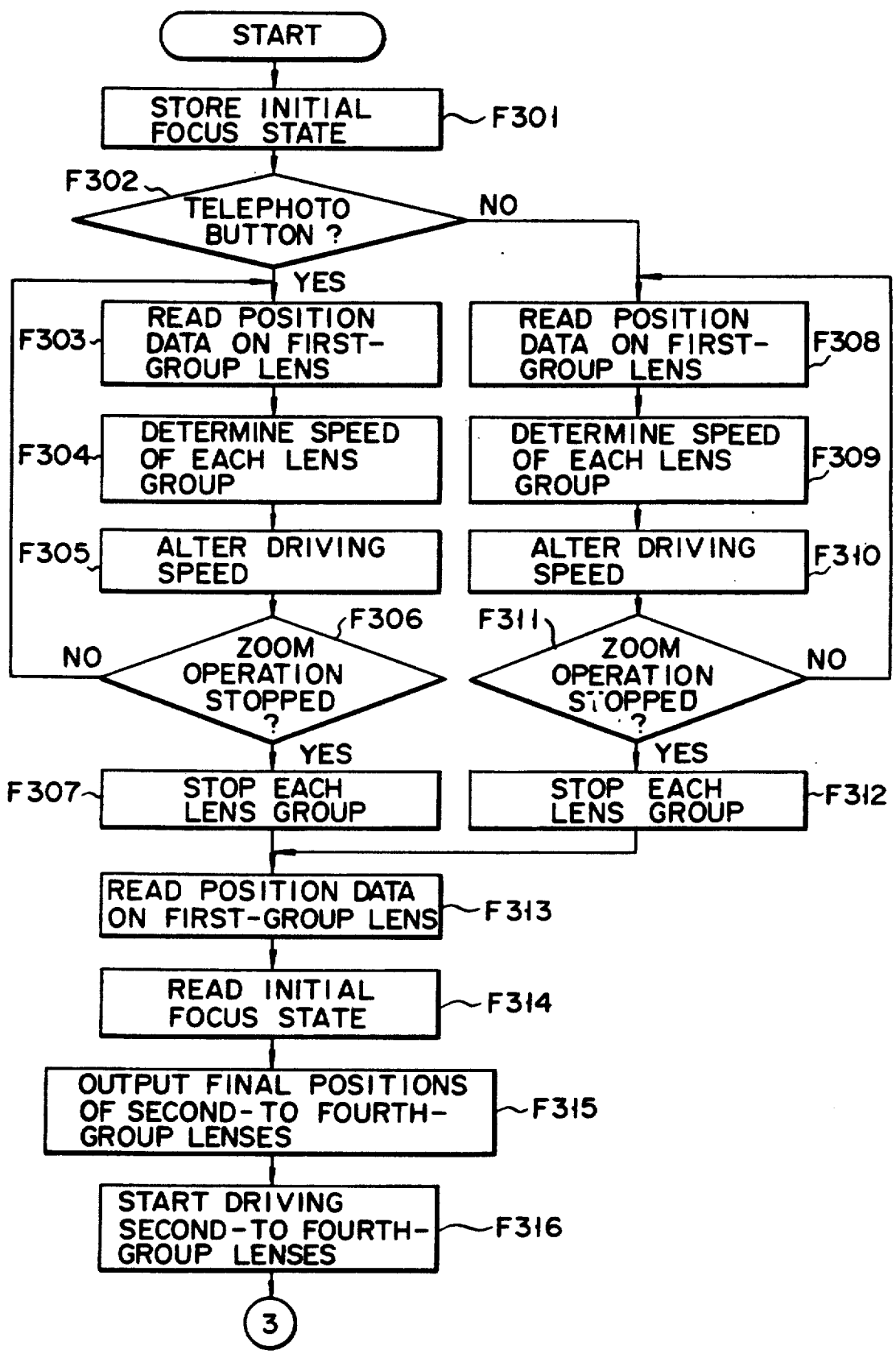
F I G. 29A

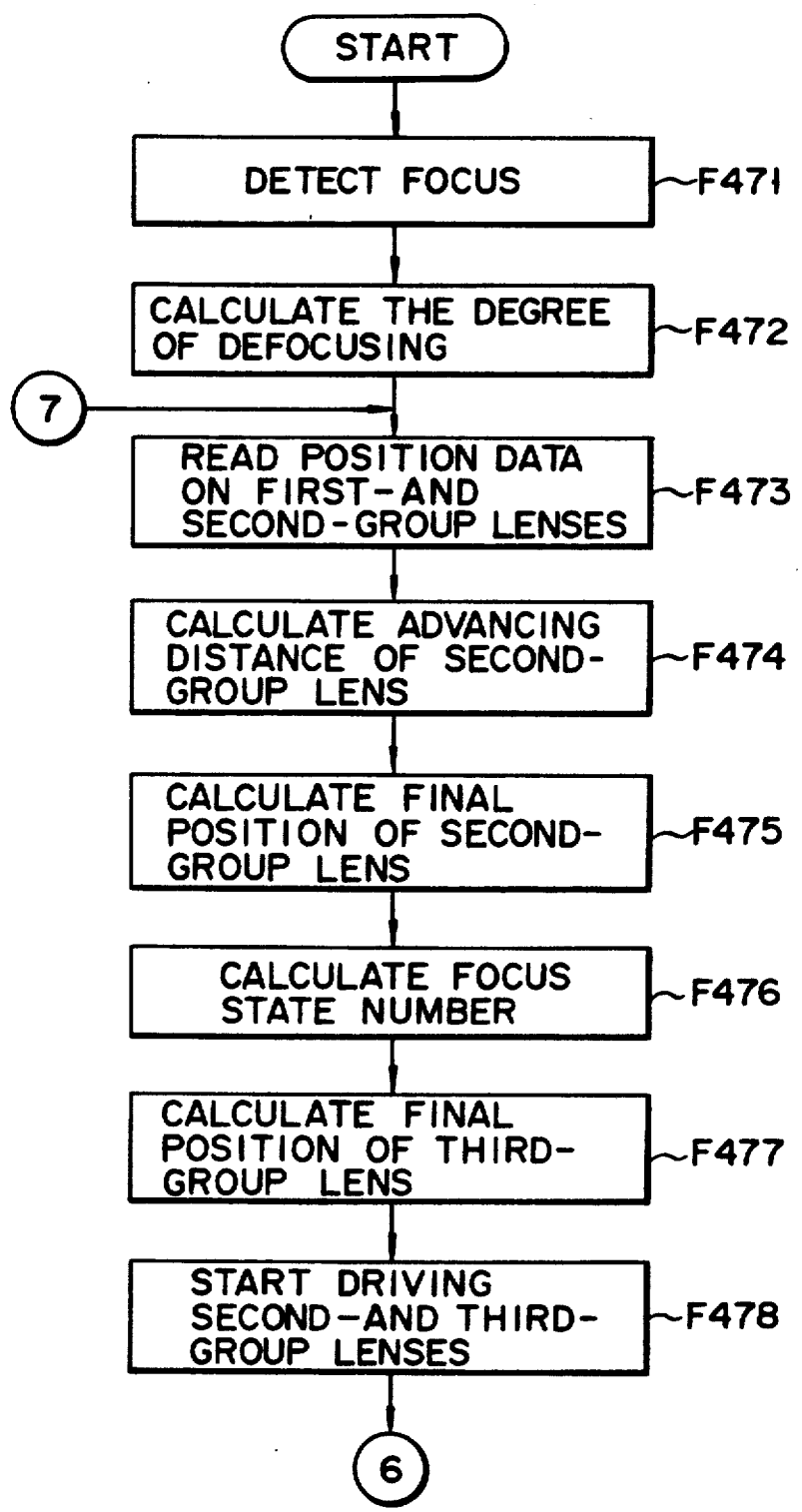
F.I.G. 31A

OPTICAL LENS SYSTEM-DRIVING CONTROL APPARATUS FOR DRIVING A PLURALITY OF LENS GROUPS IN ACCORDANCE WITH SMALL AMOUNT OF DATA

BACKGROUND OF THE INVENTION

1. Field of the Invention

The present invention relates to an optical lens system-driving control apparatus. More specifically, the present invention relates to a driving control apparatus which is incorporated in a camera having a plurality of optical lens groups movable in the optical axis direction and which control the driving of the optical lens groups, for the purpose of zooming or focusing.

2. Description of the Related Art

In a conventional photographing lens, the focusing state is adjusted by moving the lens elements, for zooming or focusing. In this type of photographing lens, the pin provided on the frame of each lens element is guided by use of a cam cylinder, and the lens elements are maintained at the positional relationships determined at the time of design.

In recent years, there has been an increased demand for a small-sized, multi-function and high-performance lens. An example of such a lens is a so-called varifocal zoom lens wherein the focal plane is moved in accordance with the movement of a power-varying lens element. The lens elements incorporated in this type of lens have to attain a large number of positional relationships predetermined beforehand, and the movement of the lens elements is complicated, accordingly.

If the lens elements require complicated movement, the cam cylinder cannot be easily designed and results in a high manufacturing cost. To solve this problem, U.S. Pat. No. 4,043,642 proposes a technique wherein the position of a power-varying lens group is detected and a correcting lens group is driven in accordance with that detection by a motor independently provided. Since small-sized motors and small-sized, high-performance calculation devices have become available in recent years, the technique disclosed in the U.S. patent enables the development of a lens arrangement which can be manufactured at less cost and permits complicated movement of lens elements with high accuracy.

The lens arrangement shown in U.S. Pat. No. 4,043,642 is comprised of a power-varying lens group having a zooming function and a correcting lens group having a focusing function. However, some of the recently-developed lenses require more complicated lens movement. A zoom lens incorporating four groups of lenses, such as the zoom lens shown in FIG. 8, is an example of such a lens. At the time of zooming, the first-to fourth-group lenses change their lens powers at different rates, and the focal plane is corrected in accordance with the change in the lens powers. At the time of focusing, the second-group and third-group lenses are moved different distances. The zoom lens shown in FIG. 8 is compact in size and has very high performance. In addition, its minimum focusing distance is very short. However, if the lens groups incorporated in the zoom lens are individually driven without employing a cam cylinder, the problems mentioned below arise.

For simplicity, the lens arrangement disclosed in U.S. Pat. No. 4,043,642 will be referred to as lens arrangement A, while the lens arrangement shown in FIG. 8 will be referred to as lens arrangement B. In the case of lens arrangement A, the factors indicating a lens state, such as a zoom value and a focal position, correspond to the position of a single lens group, and no intended focus state is produced when the lens group corresponding to the factors is driven. In the case of lens arrangement B, however, the factors indicating a lens state are associated with the positions of several lens groups. When the lens groups corresponding to the factors are driven, they may fail to have an intended positional relationship, resulting in an unexpected focus state variation, which could be caused by a lens aberration.

This problem will be described in more detail. In the case of lens arrangement A, the focal plane may be shifted in position when the group of correcting lens is driven for zooming. However, such a positional shift of the focal plane can be corrected by the technique disclosed in U.S. Pat. No. 4,043,642, and lens aberration can be maintained within a range intended at the time of design. In the case of lens arrangement B, in contrast, the first to fourth lens groups may fail to have desirable positional relationships when they are driven for zooming. If the lens groups have unintended positional relationships, various aberrations will increase, resulting in a complicated change in the focusing state.

In the case of lens arrangement B, therefore, it is required that the driving of the lens groups be controlled in such a manner that the lens groups can maintain desirable positional relationships at all times. To meet this requirement, it has been proposed to adopt the technique wherein a change in the factors (zooming and focusing) is controlled by causing a calculation device to calculate the driving parameters (such as a target position) of each lens group. However, this technique is not practical, since the load applied to the calculation device increases too much and since desirable position relationships among the lens groups are not always maintained.

Conventionally, focusing has been performed in two techniques with respect to the photographing lens of a camera. One is a method wherein all lens groups are advanced, while the other is a method wherein part of the lens groups are advanced. Of these two techniques the second technique recently draws the attention of those skilled in the art since the lens driving distances are short, as is seen in inner focusing.

A high-level technique has been derived from the second technique. An example of such a technique is a so-called floating technique wherein two or more lens groups are moved in different ways at the time of focusing, so as to suppress the aberration.

Under these circumstances, a photographing lens having a zooming or focusing function has been employed in a camera. In the photographing lens, the pin provided on the frame of each lens group is guided by the cam groove formed in a cam cylinder such that all lens elements are moved in predetermined ways.

Where the cam cylinder is employed, it is difficult to use the floating technique since the movement of each lens group is dependent on the cam cylinder. Further, in many zoom lenses (the demand for the zoom lenses is great these days), the optimal floating states needed to suppress the aberration related with focusing differ in accordance with different zoom states, such as a wide-angle state and a telephoto state.

Where a zoom lens employs a focusing mechanism of a floating type, a single floating state is determined such that the lens groups are moved in a suitable manner from a wide angle, (when short-distance photographing) to a photographing and are moved in a suitable manner for the telephoto focus position, when long-distance photographing occurs such that the single floating state suppress the overall aberration to the possible degree. With this technique, however, the aberration cannot be suppressed, depending upon the zoom state or the distance to an object to be photographed. It is therefore difficult to design a high-performance zoom lens.

According to U.S. Pat. No. 4,161,756, the positional relationships among a plurality of lens groups are stored in a memory (such as a ROM) as digital-value data. On the basis of the digital-value data and the positional information obtained by actual measurement, the lens groups are driven independently of one another, with no need to use a cam groove.

If the driving of the lens groups is controlled on the basis of in accordance with the technique disclosed in U.S. Pat. No. 4,161,756, it may be thought that the load applied to the calculation device can be decreased and that the aberration can be suppressed using the single floating state. However, if the positional information regarding the driving control of all lens groups is stored in the memory, the amount of data required will be very large. Since the storage capacity of the memory is limited, it is not practical to store all positional information.

SUMMARY OF THE INVENTION

It is, therefore, an object of the present invention to provide a new and improved optical lens system-driving control apparatus which enables remarkable reduction of the storage capacity to be stored the positional information needed to reliably control the driving of a plurality of lens groups.

According to one aspect of the present invention, there is provided a zooming lens system-driving control apparatus comprising:

a plurality of lens groups movably provided along in the direction of an optical axis therebetween;

a plurality of motors provided in order to drive the plurality of lens groups, respectively;

focusing distance-detecting means for detecting a position of a predetermined lens group which is one of the plurality of lens groups and which is changed in the position in accordance with a change in a focusing distance, and for outputting focusing distance data in accordance with data representing a detected position lens position-detecting means for detecting positions of the lens groups other than the predetermined lens group of the plurality of lens groups;

storage means for storing positional relationships between the predetermined lens group and the other lens groups of the plurality of the lens groups;

zooming operation means for commanding a zooming operation; and driving control means for actuating a motor which drives the predetermined lens group of the plurality of motors in accordance with the zooming operation commanded by the zooming operation means such that the motor is driven by a driving distance determined on the basis of the focusing distance data, calculating driving distances of the other lens groups in accordance with the positions detected by the lens position-detecting means, with the positional relationships stored in the storage means being referred to, and actuating the motors which drive other lens groups in accordance with the driving distances of the other lens groups.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A–1C through FIGS. 12A to 12C illustrate the first embodiment of the present invention, in which:

FIG. 1A is a block circuit diagram showing an electric circuit;

FIGS. 1B and 1C are detailed views of the encoder shown in FIG. 1A;

FIG. 2 shows in detail a driving circuit;

FIGS. 6A, 6B and 7 are views showing a detailed structure of a linear ultrasonic motor;

FIGS. 11A and 11B are flowcharts showing a focusing operation;

FIG. 12A is a graph showing the distances for which the lens groups are moved in relation to the distance to a to-be-photographed object in the wide-angle mode;

FIG. 12B is a graph showing the distances for which the lens groups are moved in relation to the distance to the to-be-photographed object in the standard mode;

FIG. 12C is a graph showing the distances for which the lens groups are moved in relation to the distance to the to-be-photographed object in the telephoto mode;

FIGS. 13 through 23 illustrate the second embodiment of the present invention, in which;

FIG. 13 is a perspective view of a single-lens reflex camera;

FIG. 14 is a block circuit diagram showing an electric circuit;

FIG. 15 shows in detail a driving circuit;

FIG. 16 shows in detail a signal generator;

FIGS. 17A and 17B are flowcharts showing a zooming operation;

FIG. 18 is a graph showing the relationships between the advancing distance of a first-group lens and the fundamental moving distances of second- to fourth-group lenses;

FIG. 19 is a graph showing the speeds at which the second- to fourth-group lenses are moved when the first-group lens is moved at a constant speed;

FIG. 20 is a graph showing how the second-group and third-group lenses are advanced from their reference positions when the first-group lens is advanced;

FIGS. 21A and 21B are flowcharts showing a power focusing operation;

FIG. 22 is a graph showing how the speed ratio of the third-group lens to the second-group lens is at the time of focusing;

FIG. 23 is a flowchart showing an autofocus operation;

FIGS. 24 through 27A-27C illustrate the third embodiment of the present invention, in which;

FIG. 24 show a block circuit diagram showing an electric circuit;

FIG. 25 shows a driving circuit and a switching circuit in detail;

FIGS. 26A and 26B are flowcharts showing a zooming operation;

FIGS. 27A-27C are flowcharts showing a focusing operation;

FIGS. 28 through 31A-31B illustrate the fourth embodiment of the present invention, in which;

FIG. 28 is a block circuit diagram showing an electric circuit;

FIGS. 29A and 29B are flowcharts showing a zooming operation;

FIGS. 31A and 31B are flowcharts showing an auto focusing operation.

DETAILED DESCRIPTION OF THE PREFERRED EMBODIMENTS

Figure 1A:
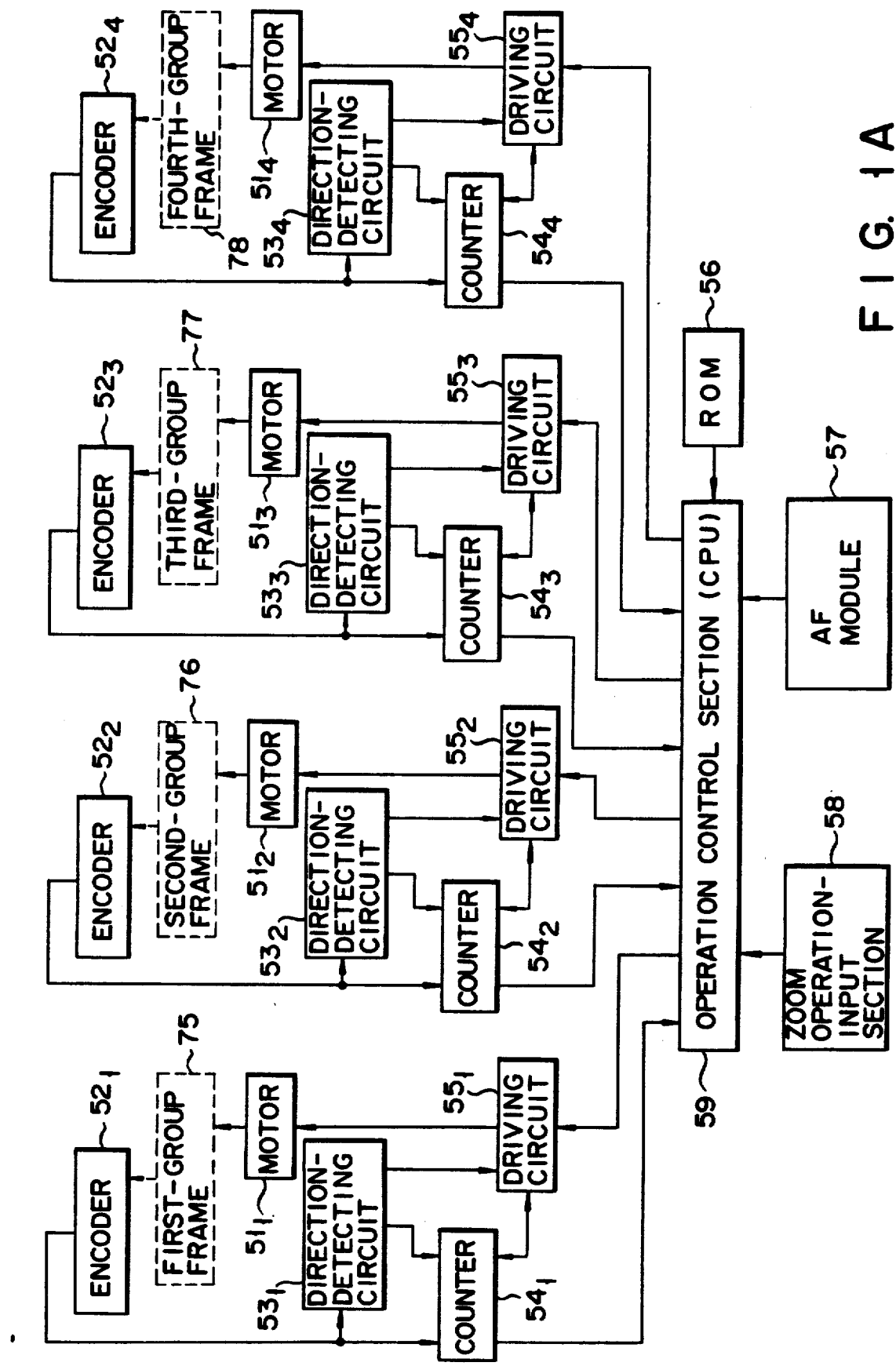

Reference will now be made to the presently preferred embodiments of the invention as illustrated in the accompanying drawings, in which like reference characters designate like or corresponding parts throughout the several drawings.

The first embodiment of the present invention will now be described, referring to a lens shutter camera which employs a zoom lens made up of four lens groups.

Figure 8:
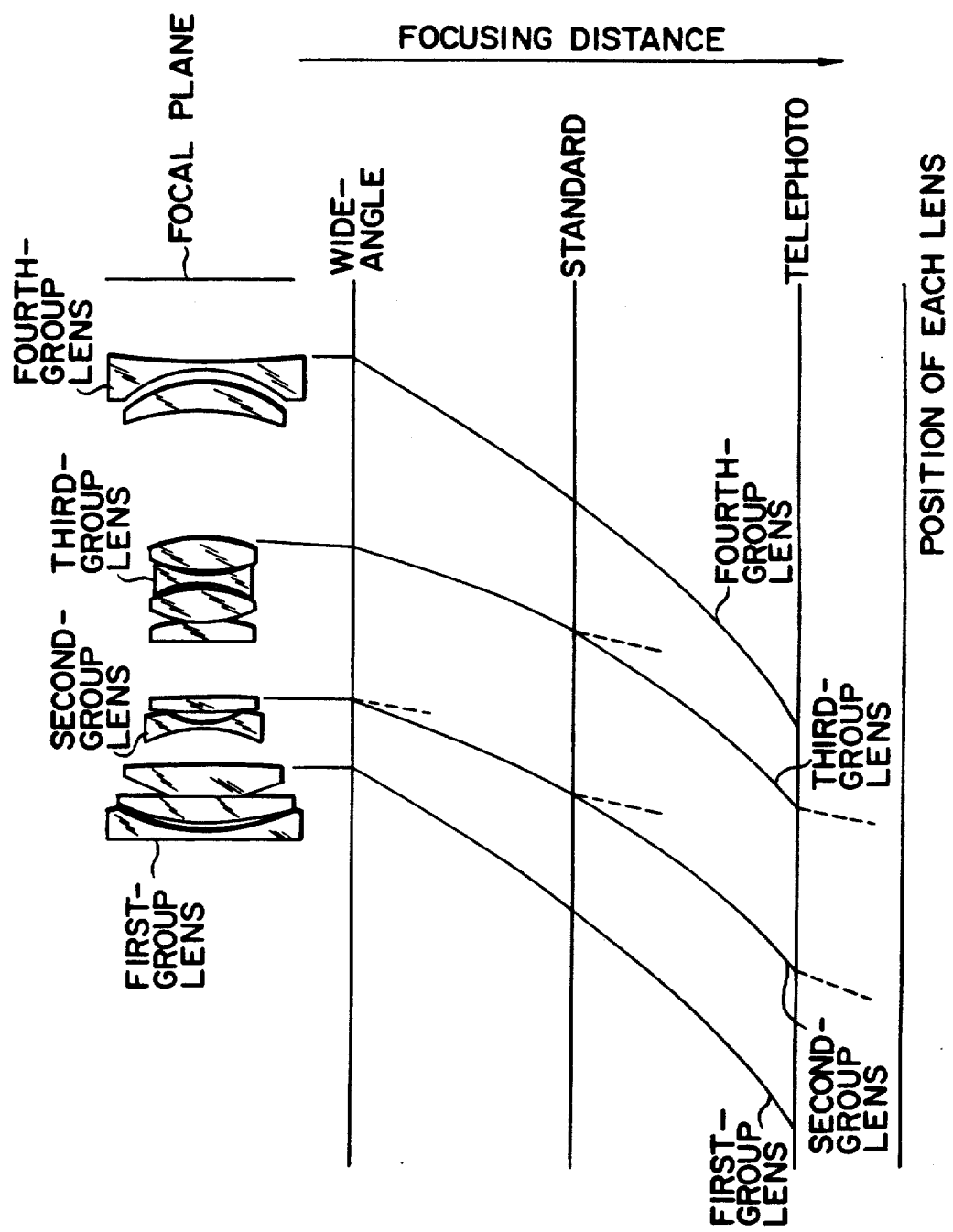
FIG. 8 shows how each lens group is moved.

FIG. 8 shows how each lens group is moved in the first embodiment. Referring to FIG. 8, when the focusing distance is changed by zooming from the wide-angle position to the telephoto position, the first- to fourth-group lenses are advanced by different distances with reference to the focal plane. (The solid lines in FIG. 8 represent the positions where the rear-end planes of the lens groups are located when the focusing distance is $\infty$). Further, when focusing is performed in the wide-angle (W) mode, the standard (S) mode or the telephoto (T) mode, the second-group lens and the third-group lens are advanced from the infinity position to the minimum focusing distance position, as is indicated by the broken lines in FIG. 8. That is, the advancing distances at the time of focusing differ depending upon each focusing distance. If the lens groups of a zoom lens are moved in the manner shown in FIG. 8, the frame structure cannot be made by a conventional cam.

Figure 4:
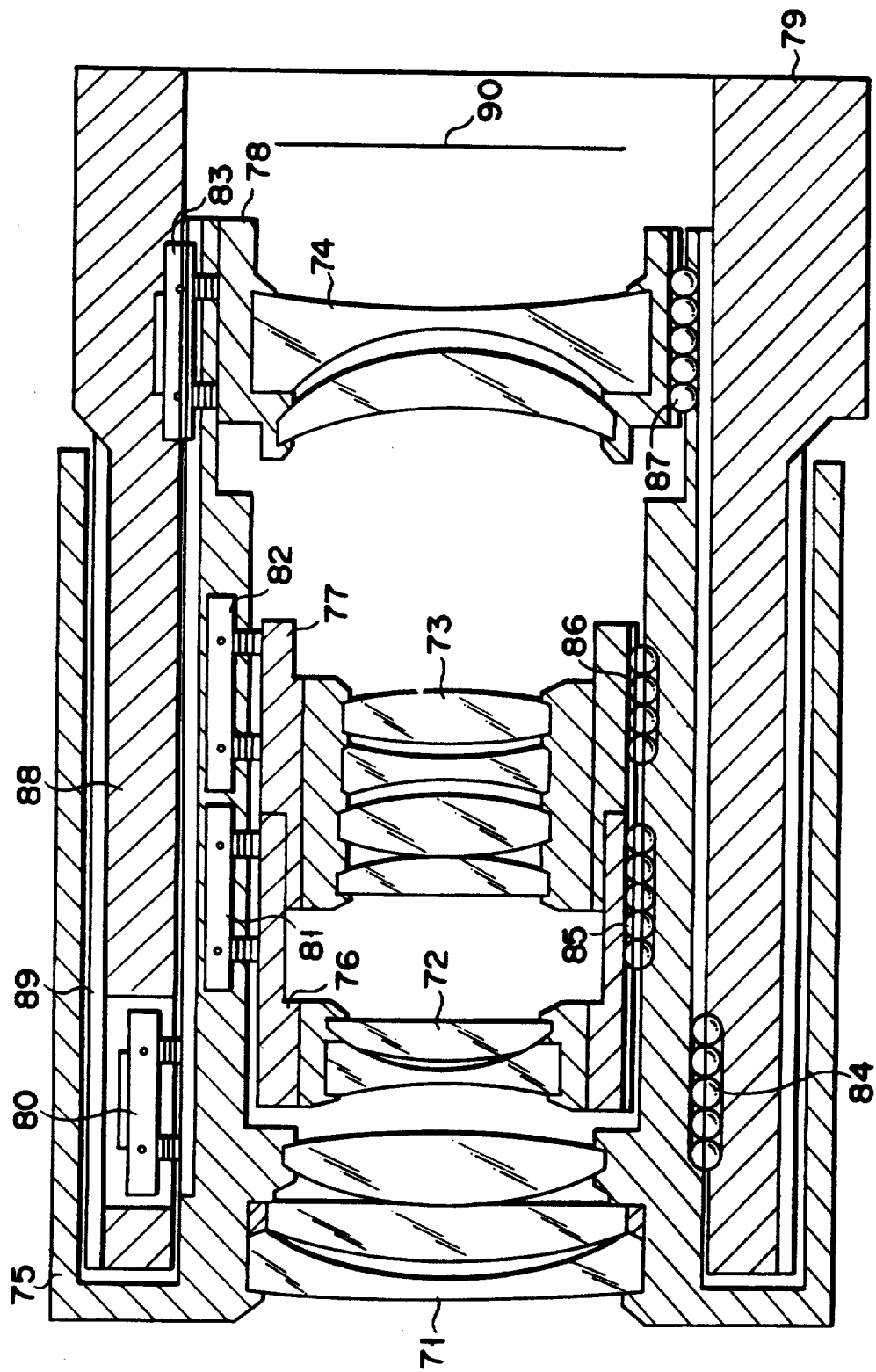
FIG. 4 is a sectional view of a zoom lens and illustrates, in particular, the structures of lenses and lens frames.

In the first embodiment, the frame structure shown in FIG. 4 is employed. As is shown in FIG. 4, a first-group lens 71, a second-group lens 72, a third-group lens 73 and fourth-group lens 74 are securely held by a first-group frame 75, a second-group frame 76, a third-group frame 77 and a fourth-group frame 78. The second-group, third-group and fourth-group frames 76, 77 and 78 are arranged inside the first-group frame 75 and are movable only in the direction of the optical axis. The second- to fourth-group frames 76, 77 and 78 are guided by bearings 85, 86 and 87 when they move, and are pressed toward the bearings by vibrating members 81, 82 and 83. With this structure, the second- to fourth-group frames 76, 77 and 78 are positioned with reference to the first-group frame 75 by the bearings 85-87 and the vibrating members 81-83, and are not shifted from the positions predetermined in the direction of the optical axis and from the optical axis. In addition, the second- to fourth-group lenses 76-78 are positioned without an unnecessary play.

The first-group frame 75 is movable only in the direction of the optical axis, and is guided by bearings 84 arranged on a fixing frame 88 when it moves. Also, the first-group frame 75 is pressed toward the bearings 84 by a vibrating member 80 which is provided for the fixing frame 88 and located at the position opposing the bearings 84. Therefore, the first-group frame 75 is positioned with reference to the fixing frame 88 without an unnecessary play. Reference numerals 89 and 90 in FIG. 4 denote a cover and a film plane, respectively.

A detailed description will be given of the structure for securely holding the vibrating members 80-83 and the operation of a linear ultrasonic motor. In the first embodiment, four linear ultrasonic motors (which are indicated by reference numerals $51_1$, $51_2$, $51_3$ and $51_4$ in FIG. 1A) are employed such that they correspond to frames 75-78, respectively. Since the four linear ultrasonic motors $51_1$-$51_4$ are arranged in similar manners and have structures similar to one another, they will be explained, with the linear ultrasonic motor $51_1$ employed for the first-group frame 75 being taken by way of example.

Figure 6A:
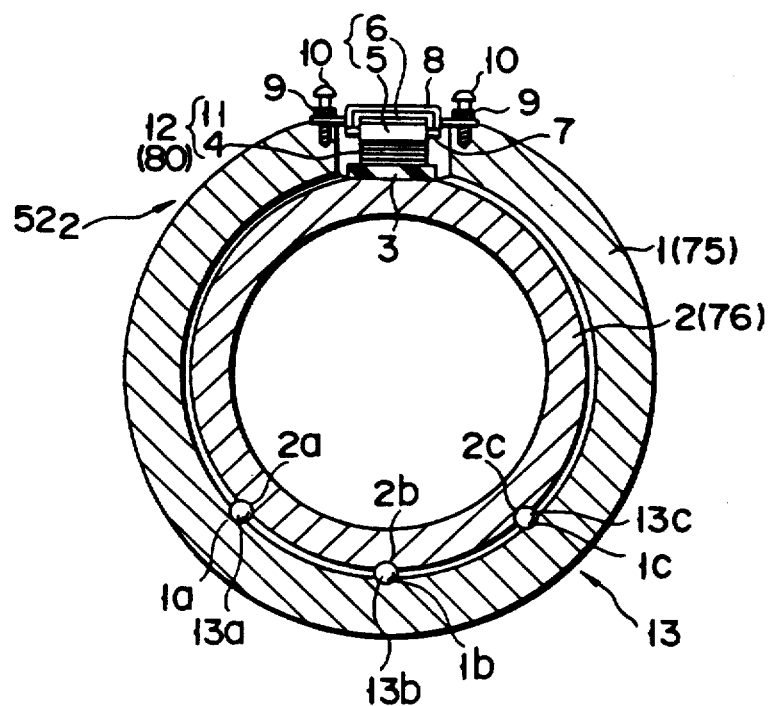
Figure 6B:
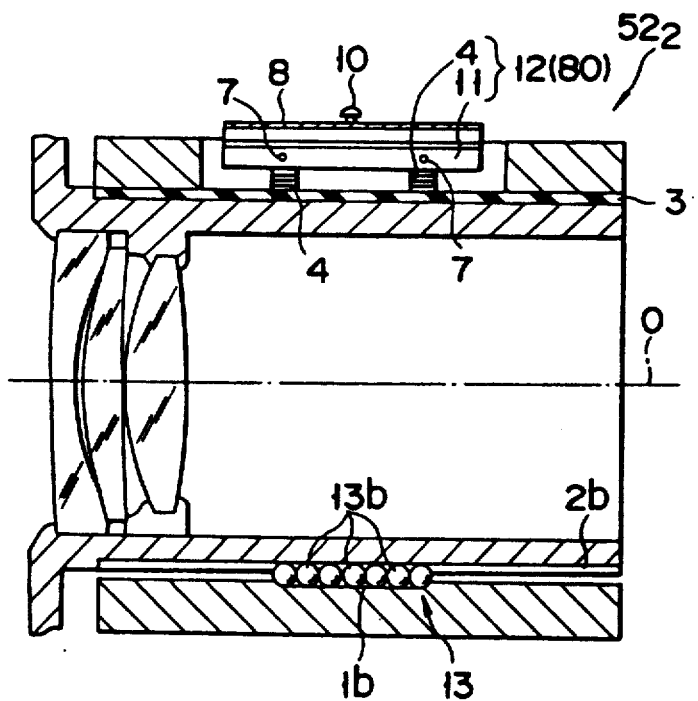

Details of the linear ultrasonic motor are illustrated in FIGS. 6A, and 6B and FIG. 7. Referring to these Figures, the fixing frame 1 (88) is a hollow cylindrical stationary member, and the first-group frame 2 (75) is a hollow cylindrical movable member. The first-group frame 2 is arranged in the fixing frame 1, with a certain gap maintained therewith, and is movable in the direction of the central axis O. In the region of the gap which is depicted in FIGS. 6A and 6B, a slide plate 3 is arranged. This slide plate 3 is fixed to the first-group frame 2 and extends in parallel to the central axis O. As is best shown in FIG. 7, a cutout section 1d having a rectangular-parallelpipedic shape is formed in the fixing frame 1 such that it is located at the longitudinal middle position of the fixing frame 1 and corresponds in position to the slide plate 3. The cutout section 1d is elongated in parallel to the central axis 0. As will be detailed later, the vibrating member 12 (80) is arranged within the cutout section 1d.

A mechanism 13 for supporting/guiding the first-group frame 2 is located in that region of the gap which is opposite to the slide plate 3. In the first embodiment, the support/guide mechanism 13 is obtained by forming three guide regions (1a, 2a; 1b, 2b; 1c, 2c) and arranging a plurality of support members (i.e., bearing balls 13a, 13b and 13c) in each of the guide regions. More specifically, a linear groove 2b having a semicircular cross section is formed in the outer circumferential portion of the first-group frame 2, such that the linear groove 2b is located opposite to the slide plate 3 and extends in parallel to the central axis O. A linear groove 1b having a semicircular cross section is formed in the inner circumferential portion of the fixing frame 1, such that the linear groove 1b is located at the longitudinal middle position of the fixing frame 1 and corresponds in position to linear groove 2b. Linear grooves 2a and 2c, each having a semicircular cross section, are formed in the outer circumferential portion of the second-group frame 2, such that linear grooves 2a and 2c are located away from linear groove 2b by the same circumferential distance and extend in parallel to the central axis O. Likewise, linear grooves 1a and 1c, each having a semicircular cross section, are formed in the inner circumferential portion of the fixing frame 1, such that linear grooves 1a and 1c are located away from linear groove 1b by the same circumferential distance and extend in parallel to the central axis O. Support members 13a are arranged in the guide region defined by grooves 1a and 2a, support members 13b are arranged in the guide region defined by grooves 1b and 2b, and support members 13c are arranged in the guide region defined by grooves 1c and 2c.

When the vibrating member 12, which is located opposite to support members 13b, pushes the slide plate toward the central axis O, a centripetal force is produced by support members 13a-13c arranged in the guide regions and is applied to the first-group frame 2. Therefore, since the central axis of the first-group frame 2 is aligned with that of the fixing frame 1, the members associated with the first-group frame 2 are positioned with precision. In addition, since support members 13a-13c are arranged in parallel to the central axis O of the fixing frame 1, the central axis of the first-group frame 2 is prevented from being shifted from that of the fixing frame 1. It should be also noted that the first-group frame 2 is supported by use of support members 13a-13c alone. Therefore, the first-group frame 2 can be accurately positioned with reference to the fixing frame 1 by working linear grooves 1a-1c and 2a-2c with precision.

As is shown in FIGS. 6A and 6B, the cutout section 1d is located at the longitudinal middle portion of the upper portion of the f.xing frame 1 and corresponds in position to the slide plate 3. To form the cutout section 1d, the upper portion of the fixing frame 1 is partially cut out at the longitudinal middle position thereof in such a manner as to form a flat-surface portion. The surface of this portion is flat and parallel to the central axis O. Then, a through hole having an axially-elongated rectangular-parallelpipedic shape is formed in the central of the flat-surface portion, thereby obtaining the cutout section 1d. Since the cutout section 1d is obtained in this manner, flat surfaces 1do are located on the sides of the cutout section 1d. To these flat surfaces 1do, a holder 8 for supporting the vibrating member 12 is attached.

The vibrating member 12 comprises a bendable vibration element 11 and a longitudinal-vibration element 4. The bendable vibration element 11 is made up of: a rectangular, comparatively-thick elastic member 5 which has such a size as to leave a certain space inside the cutout section when installed therein; and a piezoelectric element 6, which is shorter and thinner than the elastic member 5 and which is bonded to the upper surface of the elastic member 5 by use of an epoxy adhesive. A high-frequency driving voltage is applied between the two sides of the piezoelectric element 6 of the bendable vibration element 11 As a result of the application of this driving voltage, primary bending resonance is produced in the case of the first embodiment. The longitudinal-vibration element 4 is of a laminated structure made up of rectangular piezoelectric plates. It is attached to the lower side of the elastic member 5 (i.e., to that side of the elastic member 5 on which the piezoelectric element 6 is not provided), such that it vibrates longitudinally (i.e., in the thick direction of the laminated structure) at two of the nodes of the bending vibration.

In the bendable vibrating element 11, four cylindrical support pins extending outwardly in the widthwise direction of element 11 are fixed to the elastic member 5. An annular groove 7a, which is engageable with the holder 8, is formed in the longitudinal center of each support pin 7.

The holder 8 has a U-shaped cross section, and the vibrating member 12 is fitted and held inside the holder 8. More specifically, the holder 8 is obtained by bending an elastic thin plate in such a manner as to form two side walls. Semicircular cutout sections 8a are formed from the edges of the side walls, such that the cutout sections 8a correspond in position to the support pins 7 and are engageable with the annular grooves 7a of the support pins 7. The diameter of the semicircular cutout sections 8a is slightly shorter than the diameter of that portion of the support pin 7 where the annular grooves 7a are formed. The holder 8 is provided with a fixing portion 8b which is projected outwardly from each side wall in the horizontal direction. The fixing portion 8b has openings 8c through which fixing screws 10 are inserted.

The vibrating member 12 is arranged within the holder 8 by loosely fitting the annular grooves 7a of the support pins 7 in the semicircular cutout sections 8a, and can freely vibrate inside the holder 8. Thereafter, the fixing screws 10 are inserted into the respective openings 8c of the holder 8, with conical spring washers 9 interposed, and are then threadably inserted into the screw holes 1e formed in the flat surfaces 1do of the fixing frame 1. In this manner, the vibrating member 12 is arranged inside the cutout section 1d. In the thus arranged vibrating member 12 the lower surface of the longitudinal-vibration element 4 is pressed against the upper flat surface of the slide plate 3 which is fixed to the second-group frame 2.

The operating principle of the ultrasonic motor of the above structure is detailed in U.S. Pat. application Ser. No. 558,826 (title: "Ultrasonic Motor"), filed by Hiroyuki TAKIZAWA et al. on Jul. 26, 1990 and assigned to Olympus Optical Co., Ltd. The descriptions in this U.S. Patent application are incorporated herein as a reference.

The operating principle of the ultrasonic motor will be described briefly.

Where the phase difference between the bending vibration and the longitudinal vibration is set to be 90°, elliptical vibration, which causes the first-group frame 2 to reciprocate in the direction of the central axis O, is produced in the end faces of each longitudinal-vibration element 4. Since the two longitudinal-vibration elements 4 of the first embodiment are designed to vibrate with a vibration phase of 180°, only the one-direction motion of the pendulum vibration produced at the nodes of the bending vibration is transmitted to the slide plate 3 of the first-group frame 2. As a result, the first-group frame 2 is reciprocated in the direction of the central axis O.

Figure 5:
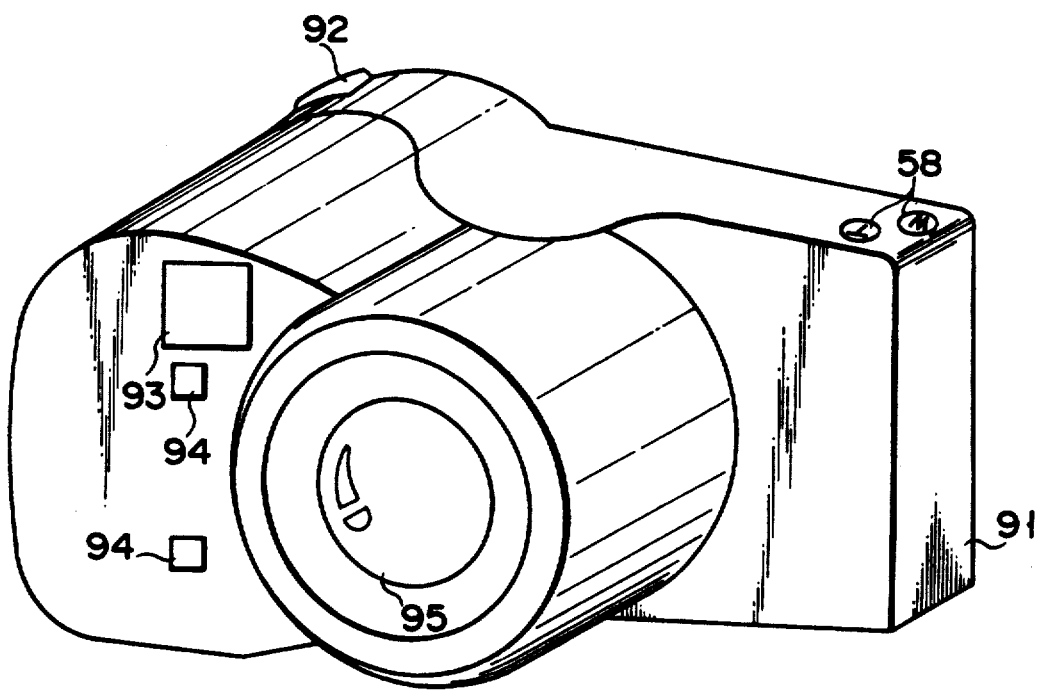
FIG. 5 is a perspective view of a camera.

FIG. 5 is a perspective view of a camera built in accordance with the first embodiment. As is shown in FIG. 5, the camera comprises: a camera body 91; a release button 92 capable of outputting two kinds of signals in accordance with the depressed states: a half-depressed state (a first release state) and a fully-depressed state (a second release state); a viewfinder window 93 which the angle of view; a distance measurement window 94 for guiding light to a distance measurement sensor (not shown); a photographing lens 95; and a zoom operation-input section (i.e., a zoom button) 58.

The electric circuit employed in the first embodiment will now be described, with reference to FIG. 1A. Referring to FIG. 1A, reference numeral $51_1$ to $51_4$ denote linear ultrasonic motors provided for the vibrating members 80 to 83 shown in FIGS. 4A and 4B, respectively, and reference numeral $52_1$ to $52_4$ denote encoders which are driven by motors $51_1$ to $51_2$ and detect the movements of the frames 75 to 78, respectively. Each of the encoders $52_1$ to $52_4$ is made up of a scale and a reader (i.e., a sensor). On the scale, two graduation lines are formed, with their graduations being shifted in phase at equal intervals. On the scale, one graduation line is also formed, so as to indicate the terminating position serving as a reference position. The scale of encoder $52_1$ is provided for the fixing frame 1, and the reader thereof is provided for the first-group frame 75. The scales of the other encoders $52_2$ to $52_4$ are provided for the second-group frame 76, third-group frame 77 and fourth-group frame 78, respectively, and the readers thereof are provided for the first-group frame 75. When the reader moves with reference to the scale, it generates and outputs a pulse at the position corresponding to each graduation.

The encoders $52_1$ to $52_4$ will be described in more detail, with reference to FIGS. 1B and 1C, when a known MR encoder is employed.

As is shown in FIG. 1B, each encoder is made up of: a scale E5 on which two graduation lines E2 and E3 are formed, with their graduations being shifted in phase at equal intervals; and a sensor E1 which has two reader portions E11 and E12 for reading the two graduation lines E2 and E3, respectively. Another graduation line E4 is also formed on the scale E5, so as to indicate the terminating position serving as a reference position, and a reader portion E13 for reading this graduation line E4 is provided for the sensor E1. Each of the reader portions E11-E13 is made by a known magneto-electric converting element, and each of the graduations is a magnetic graduation. The resistance of the magneto-electric converting element of each reader portion varies in accordance with the direction in which magnetic fluxes in the neighborhood of the reading portion extend. An output is obtained on the basis of the detection of the resistance of the magneto-electric converting element.

FIG. 1C is a sectional view showing the positional relationships between the sensor E1 and the scale E5. As mentioned above, the scale E5 is provided for the fixing frame 75 (1), and the sensor E1 is provided for both the second-group frame 76 and the third-group frame 77. The longitudinal axes of the sensor E1 and each scale E5 are set in parallel to the optical axis. When the sensor E1 moves with reference to the scale E5, it generates and outputs a pulse at the position corresponding to each graduation.

Turning back to FIG. 1A, reference numerals $53_1$ to $53_4$ denote direction-detecting circuits. These direction-detecting circuits $53_1$ to $53_4$ detect the moving directions on the basis of the information regarding the phase difference between the pulses generated by the encoders $52_1$ to $52_4$. Reference numerals $54_1$ to $54_4$ denote position pulse counters (i.e., up/down counters) which detect the absolute positions on the basis of the pulses generated by encoders $52_1$ to $52_4$ and of the moving-direction signals output from direction-detecting circuits $53_1$ and $53_2$. The position pulse counters $54_1$ to $54_4$ are reset by reference position pulses output from the encoders $52_1$ to $52_4$. At the time of an advancing movement, the position pulse counters $54_1$ to $54_4$ count, in an ascending order, the pulses corresponding to the graduations. At the time of a retreating movement, the position pulse counters $54_1$ to $54_4$ count, in a descending order, the pulses corresponding to the graduations.

Reference numerals $55_1$ to $55_4$ denote driving circuits for driving the ultrasonic motors $51_1$ to $51_4$ (which are constituted by vibrating members 80, 81, 82 and 83, respectively) on the basis of a driving control signal supplied from an operation control section 57 (i.e., a CPU). Reference numeral 56 denotes a ROM for storing programs which are necessary for operation control (to be mentioned later) and for storing data of various kinds. Reference numeral 57 denotes an AF (autofocus) module of known trigonometrical distance-measuring type (such a type of AF module is disclosed in Published Unexamined Japanese Utility Model Application No. 1-124515). Reference numeral 58 denotes a zoom operation-input section provided with a zooming button.

Reference numeral 59 denotes an operation control section (i.e., a CPU). This operation control section 59 receives outputs (position data) of the position pulse counters $54_1$-$54_4$, an output (distance measurement data) of the AF module 57, and an output of the zoom operation-input section 58, and supplies a driving control signal to the driving circuits $55_1$-$55_4$, so as to drive the linear ultrasonic motors $51_1$-$51_4$.

Figure 3:
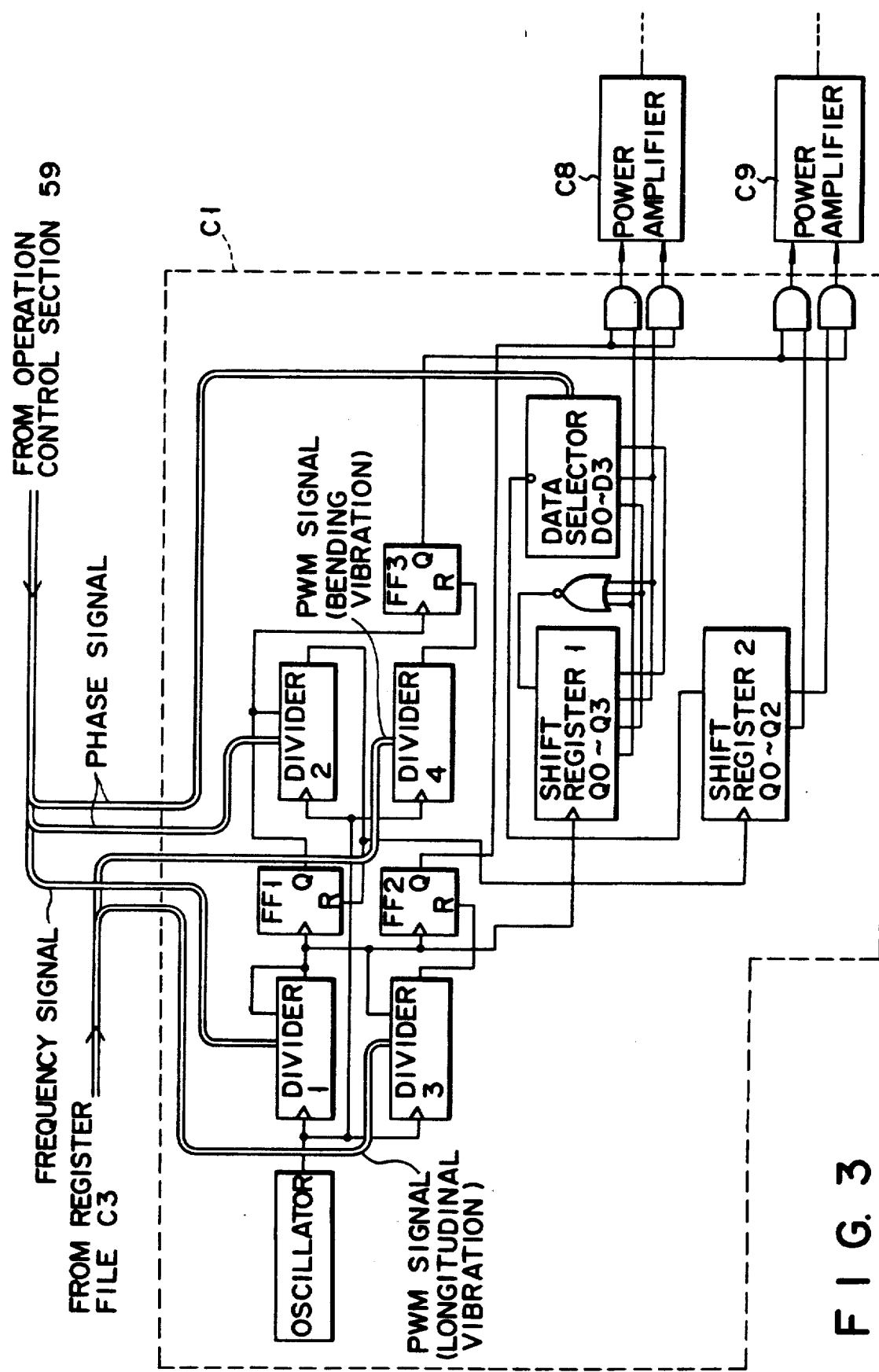
FIG. 3 shows in detail a signal generator.

FIG. 2 shows the structure of driving circuit $55_1$ in detail. Since the other driving circuits $55_2$-$55_3$ have similar structures to that of driving circuit $55_1$, explanation will be made with respect to driving circuit $55_1$ only. Referring to FIG. 2, "C1" denotes a signal generator for generating a signal used for driving linear ultrasonic motor $51_1$. The signal generator C1 are shown in FIG. 3 in detail. Since the signal generator C1 is detailed in U.S. Patent application Ser. No. 512,983 (title: "Circuit for Driving Ultrasonic Motor"), filed by Toyoji SASAKI on Apr. 23, 1990 and assigned to Olympus Optical Co., Ltd., the descriptions in this U.S. Patent Application are incorporated herein as a reference, and detailed explanation of the signal generator C1 will be omitted herein.

Referring to FIG. 2, a signal generated by the signal generator C1 is first amplified by power amplifiers C8 and C9, and is then supplied to linear ultrasonic motor $51_1$. Reference symbol C2 in FIG. 2 denotes a 4-byte register file, and position data supplied from the CPU 59 is written in the register file C2. The CPU 59 calculates not only a driving target position but also three positions which are on the way to the driving target position and located slightly away from the driving target position. In short, the CPU 59 writes data on four positions in the register file C2. The three points on the way to the driving target position are deceleration points that are used at the time or stopping a lens group, as will be described later.

The register file C2 supplies data on the value corresponding to one of the positions to a digital comparator C6 in accordance with an address signal output from the control circuit C7. The digital comparator C6 compares the value in the register file C2 with the value of the position pulse counter $54_1$, and results of the comparison are supplied to the control circuit C7. Reference symbol C3 in FIG. 2 denotes a 4-byte register file, and PWM signals (i.e., pulse width modulated signals) of the linear ultrasonic motor $51_1$, which are supplied from the CPU 59 and correspond to speeds calculated beforehand, are written in the register file C3. The PWM signals written in the register file C3 represents four speeds at which the lens group is driven to the respective four points data on which is stored in the register file C2.

The register file C3 supplies one of the PWM signals to the signal generator Cl in accordance with an address signal output from the control circuit C7. The control circuit C7 controls each structural element (indicated as a block in FIG. 2) of the driving circuit $55_1$, and resets the position pulse counter $54_1$ each time a reference position signal of the encoder $52_1$ is output. When it is determined on the basis of the output of the digital comparator C6 that the lens group has been driven to a point located immediately before the target position, the control circuit C7 alters the address signal and thereby changes outputs of the two register files C2 and C3, such that the lens group is gradually decelerated and stops at the target position.

As mentioned above, the driving circuit $55_1$ not only drives the lens group but also controls the position of the lens group in accordance with the target position value supplied from the CPU 59 and the PWM signal supplied corresponding to a driving speed. Therefore, the single CPU 59 can reliably control all driving circuits.

Figure 9:
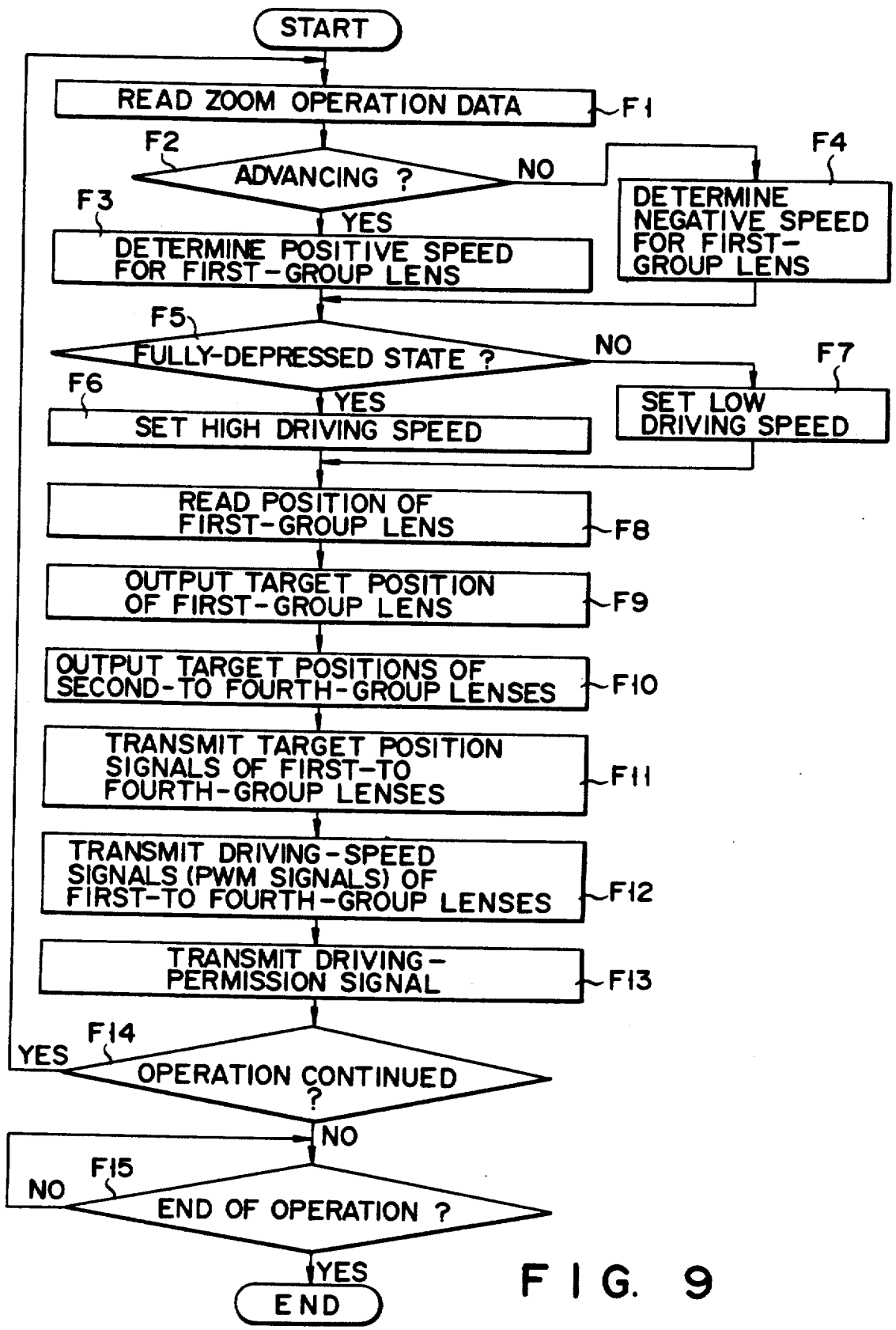
FIG. 9 is a flowchart showing a zooming operation.

A description will now be given, with reference to the flowchart in FIG. 9, as to how a zooming operation is performed in the first embodiment.

The CPU 59 selects a zooming mode when the operator operates the zooming operation-input section 58, and reads a signal representing how a zooming operation is performed (step Fl). In step F2, the CPU 59 determines in which direction the zooming operation-input section 58 is operated. If the zooming operation-input section 58 is operated in the advancing direction (T: telephoto), the CPU 59 determines a positive speed with respect to the first-group lens 71 in step F3. If the zooming operation-input section 58 is operated in the retreating direction (W: wide-angle), the CPU 59 determines a negative speed with respect to the first-group lens 71 in step F4. Then, in step F5, the CPU 59 determines whether the release button 102 is in a fully-depressed state or a half-depressed state. If the release button 102 is in the fully-depressed state, the CPU 59 determines in step F6 that the first-group lens 71 should be driven at high speed. If the release button 102 is in the half-depressed state, the CPU 59 determines in step F7 that the first-group lens 71 should be driven at a low speed.

Thereafter, in step F8, the CPU 59 detects the present position of the first-group lens 71 on the basis of the output of the position pulse counter $54_1$. Since the first-group lens 71 has one-to-one correspondence with respect to a zoom state, the zoom state can be determined on the basis of the position of the first-group lens 71. In step F9, the CPU 59 outputs a driving target position corresponding to the first-group lens 71, in accordance with the present position, the driving speed and the driving direction of the first-group lens 71. Subsequently, in step F10, the CPU 59 calculates the target positions of the second-group to fourth-group lenses 72-74 on the basis of the target position of the first-group lens 71, and outputs the calculated target positions. The technique used for determining the target positions will be described later.

In step F11, the CPU 59 transmits signals corresponding to the target positions of the first- to fourth-group lenses 71-74 to the driving circuits $55_1$-$55_4$, respectively. In step F12, the CPU 59 transmits the PWM signals, which are determined in accordance with the high-speed or low-speed operation, to the driving circuits $55_1$-$55_4$, respectively. Thereafter, in step F13, the CPU 59 outputs a driving-permission signal, to thereby start the driving of the lens groups. In step F14, the CPU 59 checks whether or not the zooming operation is still continued. If the zooming operation is still continued, the flow returns to step Fl. If not, the flow advances to step F15, wherein the CPU 59 is kept in a stand-by state until all lens groups are driven to their respective target positions. After all lens groups are driven to the target positions, the operation performed in the zooming mode is brought to an end.

Unless the flow advances to step F15, steps F1-F14 are repeatedly executed. During this period, the CPU 59 transmits the target position signals and the PWM signals to the driving circuits $55_1$-$55_4$ in steps F11 and F12, and the lens groups are started in accordance with those signals in step F13. However, the lens groups are driven such that they do not reach the target positions before steps F11 and F12 are executed again. To be more specific, the driving of the lens groups is controlled in accordance with control data read out of ROM 56. Therefore, each lens group can be driven smoothly during the zooming operation, without stopping or moving again in the meantime. In addition, the target positions of the lens groups are so determined as to maintain basic positional relationships at all times. Therefore, the lens groups attain desirable positional relationships whenever they reach the target positions.

Figure 10:
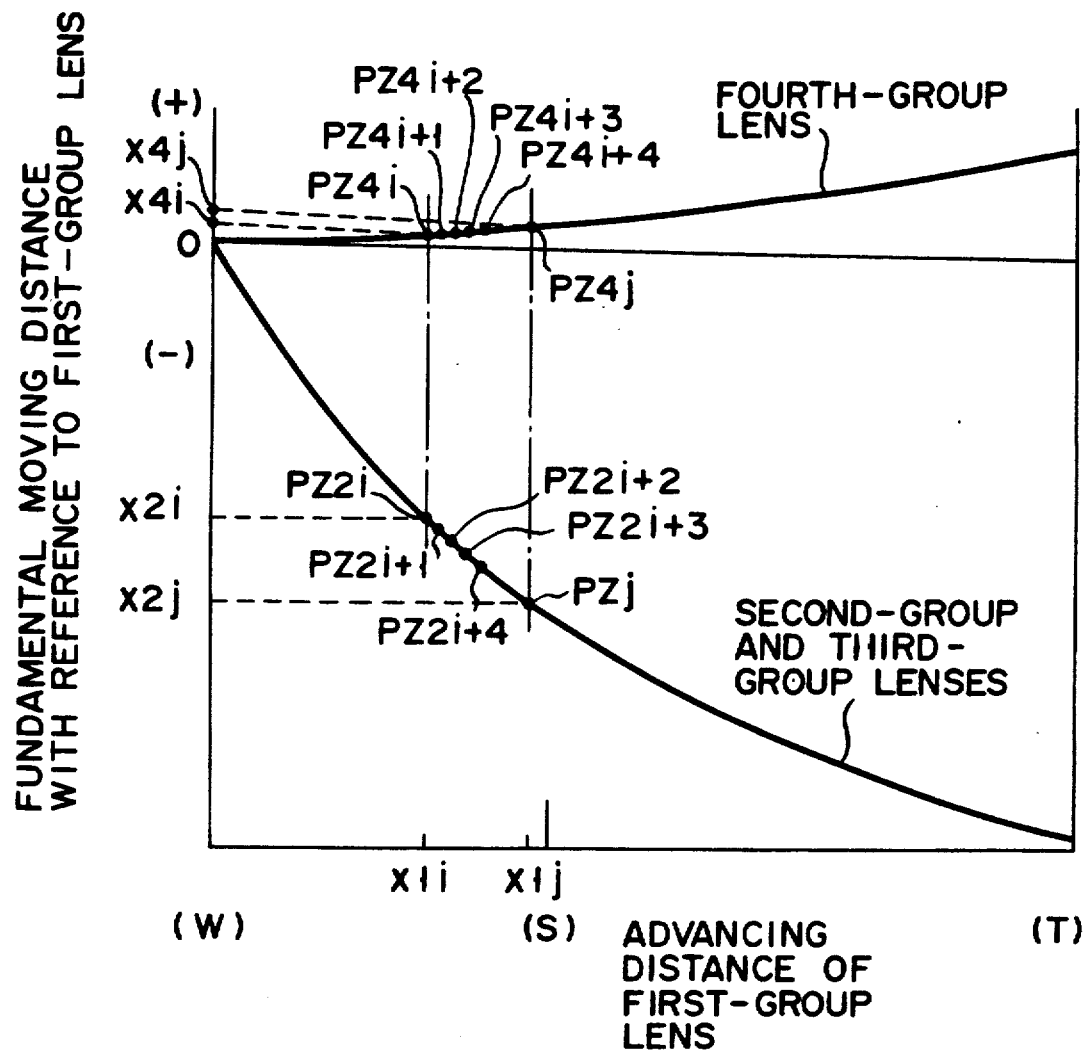
FIG. 10 is a graph showing the relationships between the advancing distance of a first-group lens and the fundamental moving distances of second- to fourth-group lenses.

Next, a description will be given as to how the target positions are determined. FIG. 10 is a graph showing the basic moving distances of the second-group to fourth-group lenses 72-74 in relation to the advancing distance of the first-group lens 71. (The basic moving distances are distances which permit the lens groups to maintain an in-focus state with reference to the infinity.) In the graph shown in FIG. 10, the symbols "+" and "−" indicate the lens-advancing direction and lens-retreating direction, respectively, and the basic moving distances are plotted against the ordinate, with the basic moving distances in the wide-angle state being set at 0. In the graph, the point expressed by PZ1m is the target position of 1 th-group lens when the first-group lens 71 is located at the position expressed by x1m. In accordance wit the target position, the position data on the first-group lens 71 and the position data on the second- to fourth-group lenses 72-74 are determined, and the position data, thus determined, is stored in ROM 56.

Let it be assumed that a zooming operation is started when the first-group lens 71 is at position x1i and is stopped when it is at the position immediately before position x1j. In this case, the CPU 59 detects the position of the first-group lens 71 in step F8. If it is determined that the first-group lens 71 is at position x1i and that the zooming operation is performed in the advancing direction at low speed, then CPU 59 determines point x1i+2 (which is slightly away from position x1i in the advancing direction) as the target position of the first-group lens 71, by referring to the data stored in ROM 56. Since positions PZ2i+2, PZ3i+2 and PZ4i+2 correspond to the target position x1i+2 of the first-group lens 72, the CPU 59 reads the data on moving distances $x2i+2$, $x3i+2$ and $x4i+2$ out of ROM 56. (The moving distances $x2i+2$, $x3i+2$ and $x4i+2$ correspond to positions $PZ2i+2$, $PZ3i+2$ and $PZ4i+2$, respectively.) On the basis of the moving distances, the 5 target positions of the second- to fourth-group lenses 72-74 are determined. When the first-group lens 71 has reached position $x1i+1$, the CPU 59 changes "i" to "i+1" and changes "i+1" to "i+2", and repeats the determination of the target position in a similar manner. In the highspeed driving mode (i.e., the mode in which the lens groups are driven at high speed, the data corresponding to the speed three times higher than that of the lowspeed driving mode is provided for the lens groups. If the position of the first-group lens 71 is position xi, then the CPU 59 outputs data on the positions corresponding to $i+4$ as the target position data of the lens groups.

Figure 11B:
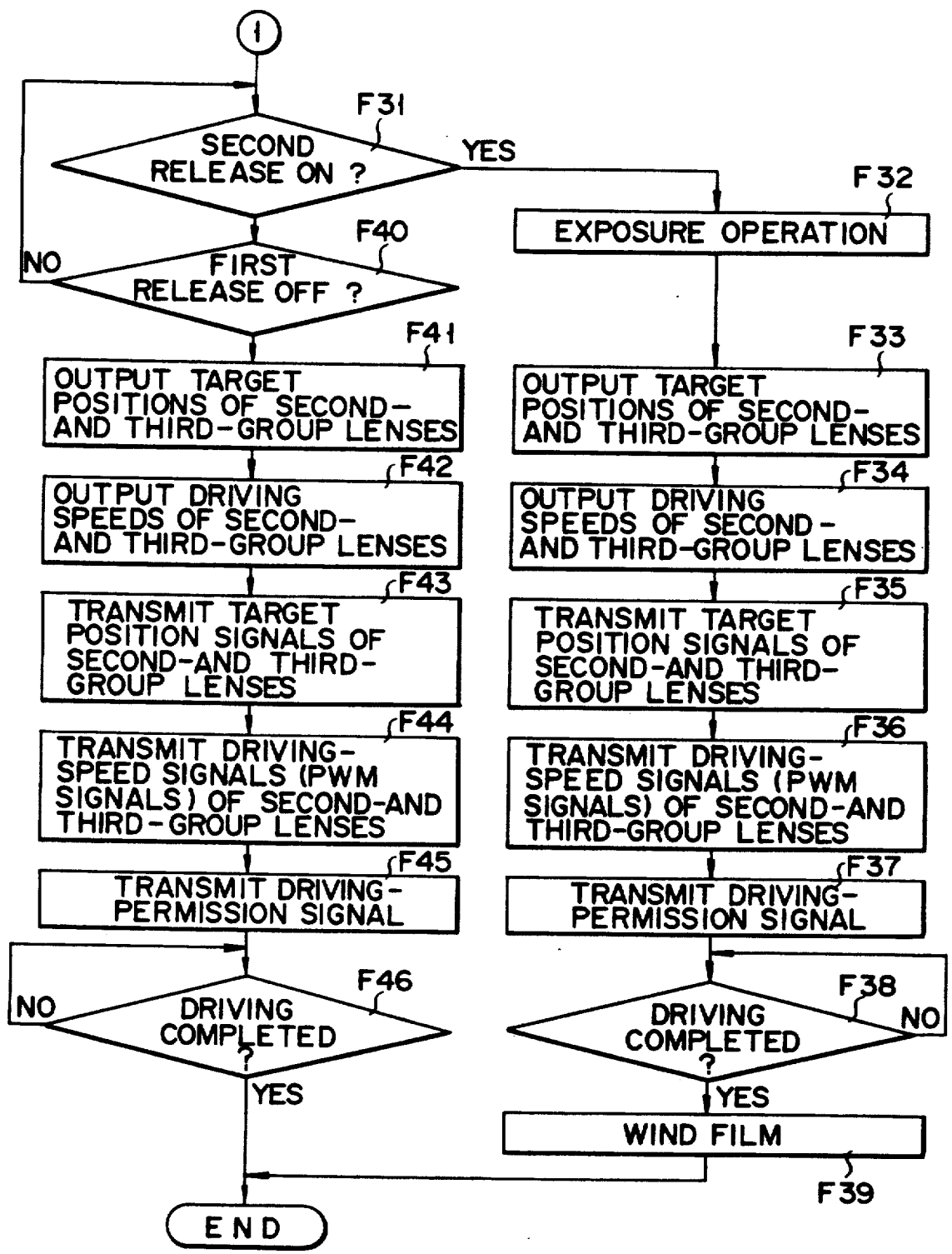

A description will now be given, with reference to the flowchart shown in FIGS. 11A and 11B, as to how an auto focusing operation is performed in the first embodiment.

The CPU 59 selects an autofocus mode when the operator depresses the release button 92 halfway (i.e., the first release state). In the autofocus mode, the CPU 59 first measures the distance to an object by means of the AF module 57 in step F21. If it is determined in step F22 that detection is possible, the CPU 59 reads the positions of the first- to third-group lenses 71-73 in position step F23. At the time of focusing, the lens groups employed in the first embodiment are advanced in different ways in accordance with a zoom state. In the wide-angle, standard and telephoto modes, the lens groups are driven in the manners shown in FIGS. 12A, 12B and 12C, respectively. Therefore, the CPU 59 first determines the present zoom state on the basis of the position of the first-group lens 71, then reads the data on the advancing distances of the second- and third-group lenses out of ROM 56 in accordance with the graphs shown in FIGS. 12A, 12B and 12C, and then determines the target driving position of the second- and third-group lenses 72 and 73 by adding the data read out of ROM 56 to the initial position data read out in step F23. The data representing the target driving positions of the second- and third-group lenses 72 and 73 is output from the CPU 59 in steps F24 and F25.

In step F26, the CPU 59 reads the data regarding the target driving speeds of the second- and third-,group lenses 72 and 73 out of ROM 56. The data regarding the target driving speeds is determined for auto focusing and is stored in ROM 56 beforehand. In steps F27 and F28, the target position signals and driving-speed signals of the second- and third-group lenses 72 and 73 are supplied to the driving circuits $55_2$ and $55_3$. Thereafter, in step F29, the CPU 59 transmits a driving-permission signal to the driving circuits $55_2$ and $55_3$, thereby starting the driving of the second- and third-group lenses 72 and 73. In step F30, the CPU 59 confirms whether or not the driving of the lens groups has come to an end. When the driving of the lens groups has come to an end, the photographing lens is in focus. Then, in step F31, the CPU 59 checks whether or not the release button 92 is in the fully-depressed state (i.e., the second release state). If the release button 92 is in the second release state, then an exposure operation is carried out in step F32, the second- and third-group lenses 72 and 73 are returned to their initial positions in steps F33-F38, and the film is wound in step F39. Thereafter, the auto focusing operation is brought to an end. If, on the other hand, the release button 92 is not in the second release state, step F40 is executed, wherein the CPU 59 checks whether or not the button 92 is released from the first release state. If the button 92 is released from the first release state, the second- and third-group lenses 72 and 73 are returned to their initial positions in steps F41-F46, and the auto focusing operation is brought to an end.

According to the first embodiment, the position of the first-group lens 71 is detected, and the zoom state is determined on the basis of the position of the first-group lens 71. The target driving position of each lens group is determined in accordance with the determined zoom state, and data representing the target driving position is output for the zoom-driving of each lens group. Therefore, the first embodiment requires nether a highly-accurate absolute amount encoder which is coupled to an operation member nor a counter which counts the number of pulses generated when the operation member is operated. Without such an encoder or counter, a satisfactory zoom state can be maintained in accordance with the zooming operation, with a high degree of resolution maintained.

In the first embodiment, the second- to fourth-group lenses 72-74 are arranged within the first-group frame 75. With this structure, a heavier load is applied when the first-group lens 71 is driven than when the second- to fourth-group lenses 72-74 are driven, and the driving speed of the first-group lens 71 decreases, accordingly. However, since the second- to fourth-group lenses 72-74 are driven in accordance with the position of the first-group lens 71, it rarely happens that the second- to fourth-group lenses 72-74 will fail to follow the movement of the first-group lens 71.

In the first embodiment, the first-group lens 71 is located at the forward end of the first-group frame 75. Due to this structure, it is likely that the user will mistakenly touch the first-group lens 71 or that the first-group lens 71 will collide with something around it. Even in such cases, desirable positional relationships among the lens groups can be maintained since the driving of the second- to fourth-group lenses is controlled in accordance with the position of the first-group lens. In addition, the moving stroke of the first-group lens 71 is longer than the moving strokes of the other lenses, and the first-group lens 71 requires a longer driving time than the other lenses. Therefore, the second- to fourth-group lenses 72-74 can easily follow the first-group lens 71. Further, since the moving strokes of the second- to fourth group lenses 72-74 are comparatively short, ROM 56 does not have to store a large amount of data used for driving the lenses, and the scale of the encoder need not be long.

According to the first embodiment, moreover, the focus driving can be controlled, on the basis of the detection of the positions of the second- and third-group lenses 72 and 73 and the data stored in ROM 56. Thus, a desirable focus state can be selected in accordance with a zoom state. In accordance with the case where a cam cylinder is employed, the driving of the lenses can be controlled in various manners by use of a simple structure. Needless to say, desirable positional relationships among the lenses are ensured at all times in focusing or zooming.

The second embodiment of the present invention will now be described, referring to the case where a single-lens reflex camera employs a similar zoom lens to that of the first embodiment.

Figure 13:
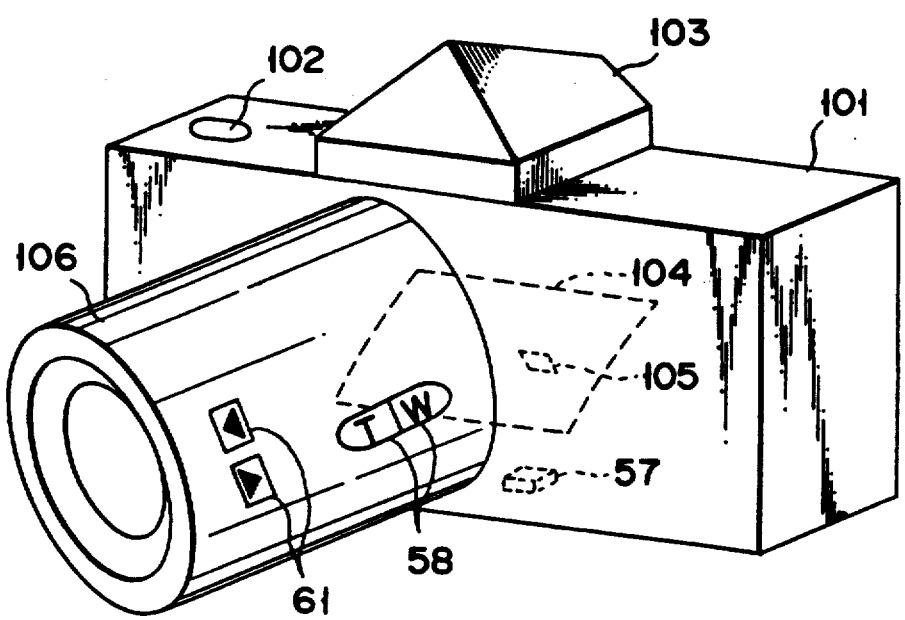

FIG. 13 is a perspective view of a single-lens reflex camera obtained in accordance with the second embodiment. As is shown in FIG. 13, the body 101 of the camera is provided with: a release button 102 capable of outputting a signal corresponding to a half-depressed state (i.e., a first release state) and a signal corresponding to a fully-depressed state (i.e., a second release state); a viewfinder 103 which employs a pentaprism used for determining the angle of view; a quick-return type main mirror 104 for guiding light to the viewfinder 103; and a sub mirror 105, attached to the center of the main mirror 104, for guiding light to an AF module 57 contained in the bottom of the body 101. On the other hand, the photographing lens 106 of the camera is provided with a zooming operation-input section 58 and a focusing operation-input section 61.

Since the lens arrangement and frame structure employed in the second embodiment are similar to those of the first embodiment, a description of them will be omitted herein.

The electric circuit employed in the second embodiment will be described, with reference to FIG. 14. Since the second embodiment is applied to a TTL camera, the lens groups of the second embodiment have to maintain the positional relationships predetermined at the time of design. If the positional relationships among the lens groups become greatly different from the predetermined ones, the image observed through the viewfinder is adversely affected. As a result, the operator looking through the viewfinder may feel unpleasant, and think it difficult to accurately operate the keys when looking into the viewfinder. In the second embodiment, therefore, the target positions of the lens groups are determined more minutely than in the first embodiment, and the driving of the lens groups is controlled in accordance with the driving speeds of the lens groups. In order to control the driving of the lens groups in accordance with the driving speeds, the second embodiment employs speed-detecting circuits $60_1$ to $60_4$, in place of the direction-detecting circuits $53_1$ to $53_4$ of the first embodiment, as is shown in FIG. 14. In addition, the second embodiment employs a focusing operation-input section 61.

FIG. 15 shows driving circuit $55_1$. (The structures of driving circuits $55_2$–$55_4$ are similar to the structure of driving circuit $55_1$.) As is shown in FIG. 15, the driving circuit $55_1$ comprises an up/down counter C4 and a comparator C5. In the driving circuit $55_1$, four kinds of speed data are output from the operation control section and are stored in a register file C3. The comparator C5 compares the value of the data stored in the register file C3 with a value output by the speed-detecting circuit $60_1$. Results of the comparison are supplied to the up/down counter C4. If the value output by the speed-detecting circuit $60_1$ is larger than the value of the data stored in the register file C3, the up/down counter C4 counts in a descending order, and a PWM signal output from the up/down counter C4 is supplied to a signal generator C1. In this case, the driving speed of the lens groups is decreased. In the opposite case, the driving speed is increased.

When a reference position signal is output from an encoder $52_1$, the control circuit C7 resets a position a resetting pulse to the speed-detecting circuit $60_1$ at predetermined intervals, for speed detection. Further, the control circuit C7 outputs a clock pulse, so as to update the outputs of the up/down counter C4 and comparator C5.

Figure 16:
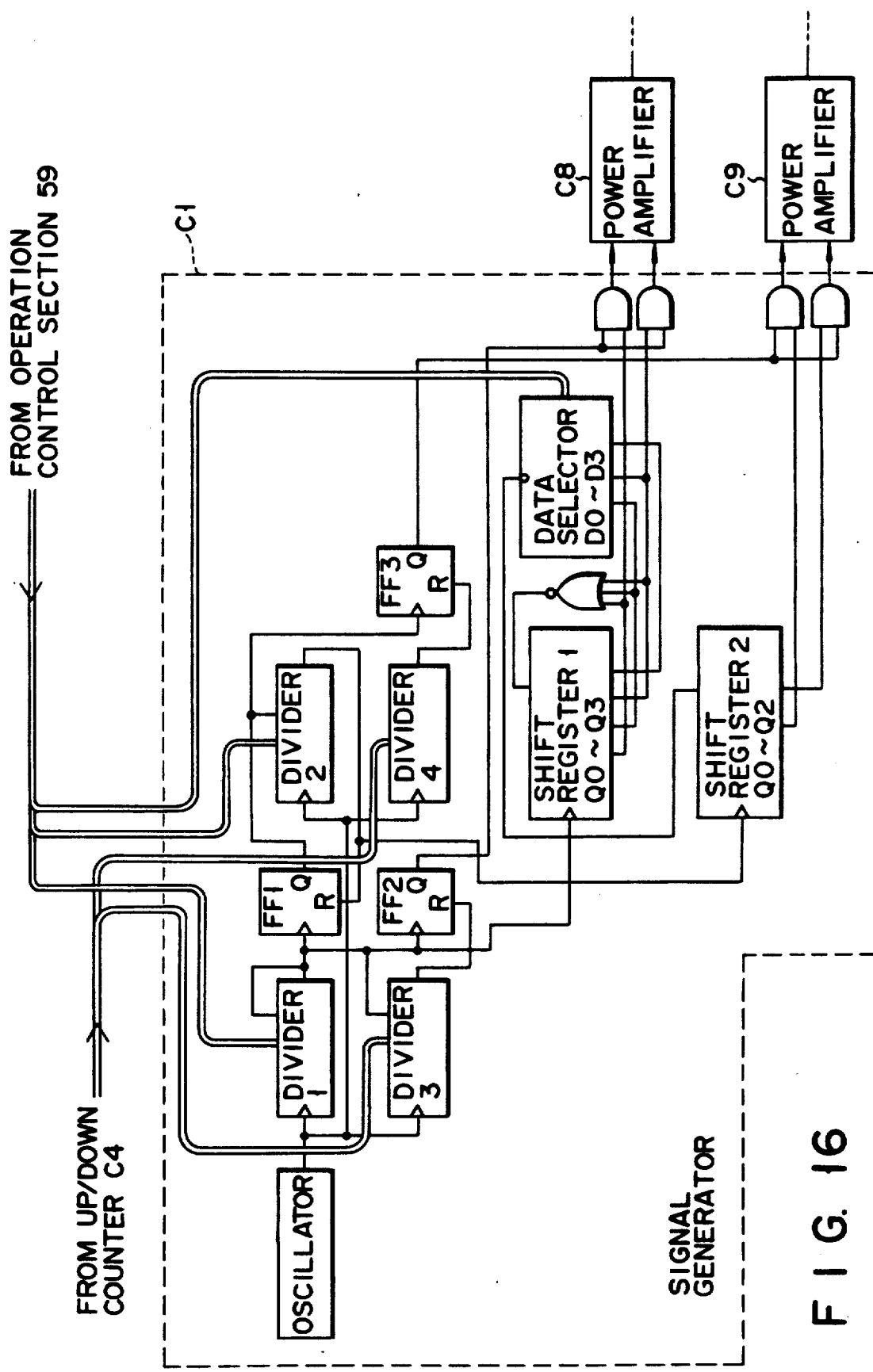

FIG. 16 shows a detailed structure of the signal generator C1 employed in the second embodiment. As is shown in FIG. 16, signals input to dividers 3 and 4 are supplied from the up/down counter C4; they are not supplied from the register file C3, as they are in the first embodiment. As for the other structures, the signal generator C1 of the second embodiment is similar to that of the first embodiment, and its description will be omitted.

Figure 17B:
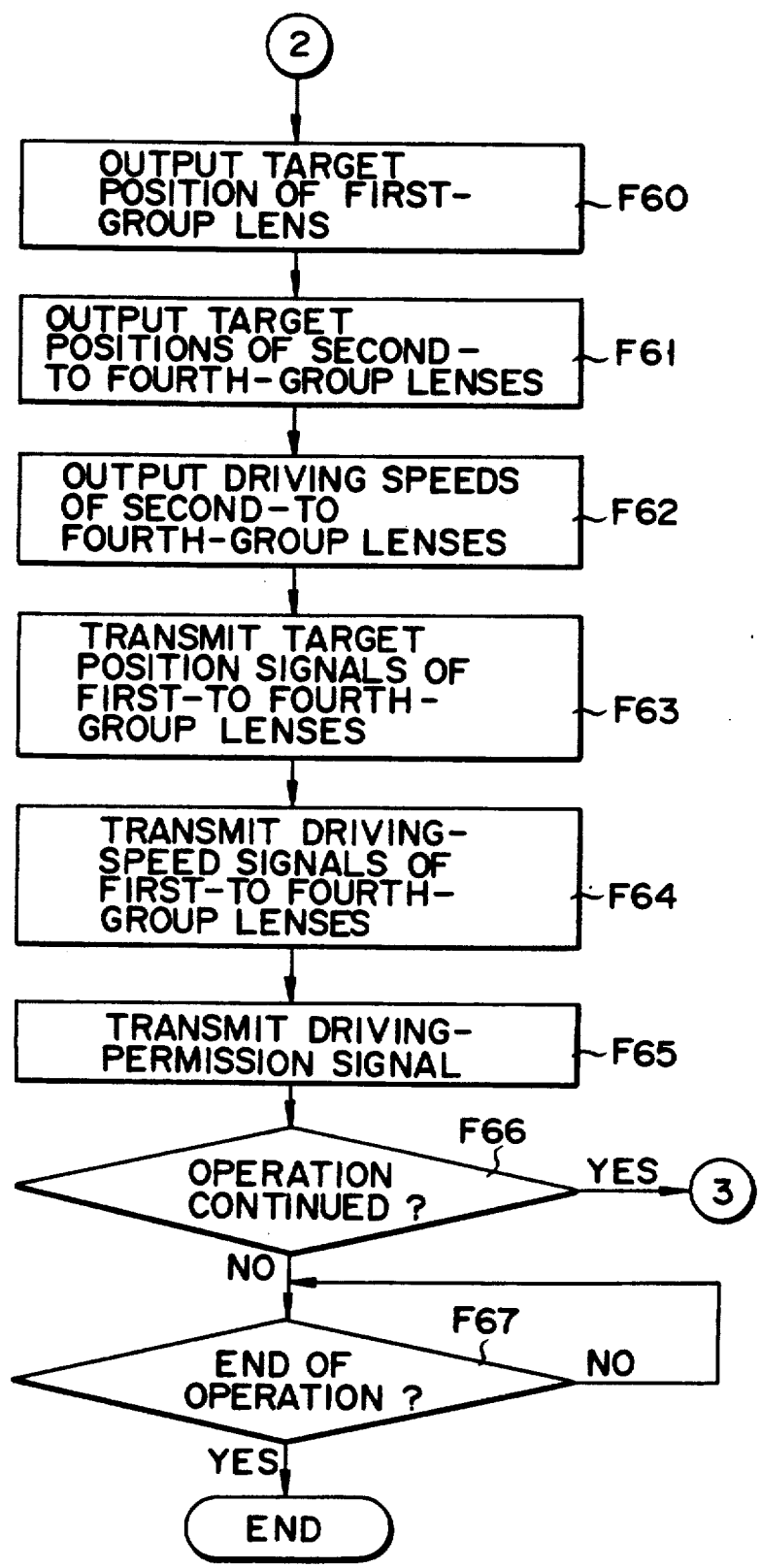

A description will now be given, with reference to the flowchart in FIGS. 17A and 17B, as to how a zooming operation is performed in the second embodiment.

The CPU 59 selects a zooming mode when the operator operates the zooming operation-input section 58, and reads a signal representing how a zooming operation is performed (step F51). In step F52, the CPU 59 determines in which direction the zooming operation-input section 58 is operated. If the zooming operation-input section 58 is operated in the advancing direction (T:telephoto), the CPU 59 determines a positive speed with respect to the first-group lens 71 in step F53. If the zooming operation-input section 58 is operated in the retreating direction (W: wide-angle), the CPU 59 determines a negative speed with respect to the first-group lens 71 in step F54. Then, in step F55, the CPU 59 determines whether the release button 102 is in a fully-depressed state or a half-depressed state. If the release button 102 is in the fully-depressed state, the CPU 59 determines in step F56 that the first-group lens 71 should be driven at high speed. If the release button 102 is in the half-depressed state, the CPU 59 determines in step F57 that the first-group lens 7 should be driven at low speed.

Thereafter, in step F58, the CPU 59 detects the present positions of the first- and second-group lenses 71 and 72 on the basis of the outputs of the position pulse counters $54_1$ and $54_2$. On the basis of the present positions of the first- and second-group lenses 71 and 72, data representing a focus state is obtained. This focus state data is stored in step F59. In step F60, the CPU 59 outputs a driving target position corresponding to the first-group lens 71, in accordance with the data representing the focus state of the first-group lens 71. The method in which the data on the driving target position is obtained will be described later. In step F61, the CPU 59 calculates the target positions of the second- to fourth-group lenses 72–74 on the basis of the target position of the first-group lens 71 and the stored focus state, and outputs data representing the target positions. In step F60, the CPU 59 calculates speed data on the second- to fourth-group lenses 72–74 on the basis of the position data on the first-group lens 71 and the already-output speed data on the first-group lens 71.

As described above, the driving circuits $55_1$–$55_4$ of the second embodiment have a function of controlling the positions and driving speeds of the lens groups.

In step F63, the CPU 59 transmits target position signals of the first- to fourth-group lenses 71–74 to register file C2. In step F64, the CPU 59 transmits speed signals of the first- to fourth-group lenses 71–74 to register file C3. Thereafter, in step F65, the CPU 59 outputs a driving-permission signal, to thereby start the driving of the lens groups. In step F66, the CPU 59 checks whether or not the zooming operation is still continued. If the zooming operation is still continued, the flow returns to step F51. If not, the flow advances to step F67, wherein the CPU 59 is kept in a stand-by state until all lens groups are driven to their respective target positions. After all lens groups are driven to the target positions, the operation performed in the zooming mode is brought to an end.

Unless the flow advances to step F67, steps F51–F66 are repeatedly executed. During this period, the CPU 59 outputs the target position signals and the speed signals in steps F63 and F64, and the lens groups are started in accordance with those signals in step F65. However, the lens groups are driven such that they do not reach the target positions before steps F63 and F64 are executed again. To be more specific, the driving of the lens groups is controlled in accordance with control data read out of ROM 56. Therefore, each lens group can be driven smoothly during the zooming operation, without stopping or moving again in the meantime. In addition, the target positions of the lens groups are determined so as to maintain basic positional relationships at all times. Therefore, the lens groups attain desirable positional relationships whenever they reach the target positions.

Next, a description will be given as to how a focus state is calculated and stored and as to how the target positions and driving speeds are determined.

FIG. 18 is a graph showing the basic moving distances of the second-group to fourth-group lenses 72–74 in relation to the advancing distance of the first-group lens 71. (The basic moving distances are distances which permit the lens groups to maintain an in-focus state with reference to the infinity.) In the graph shown in FIG. 10, the symbols "+" and "−" indicate the lens-advancing direction and lens-retreating direction, respectively, and the basic moving distances are plotted against the ordinate, with the basic moving distances in the wide-angle state being set at 0. The data shown in FIG. 19 is obtained by differentiating the basic moving distances with the advancing distance of the first-group lens 71 and by multiplying the value obtained by the differentiation by the predetermined constant. In other words, FIG. 19 shows the driving speed ratio of the second- to fourth-group lenses 72–74 to the first-group lens 71. As long as the first- to fourth-group lenses are driven to satisfy the speed relationships shown in FIG. 19, the lenses can always maintain the positional relationships indicated by the curves shown in FIG. 18.

In the second embodiment, the floating state at the time of focusing continuously varies between the wide-angle, standard and telephoto modes. However, a slightly-defocusing state at the time of zooming does not become a problem, except in the case where the minimum focusing distance is selected. During zooming, therefore, the lenses are driven in such a manner as to satisfy the speed relationships shown in FIG. 19, and at the end of the zooming, the lenses are made to attain the initial focusing state. More specifically, that position of the first-group lens which can be used as a basis of the zooming operation is determined as a reference position, and that speed of the first-group lens which corresponds to the reference position of the first-group lens is determined as a reference speed. Data representing the ratio of the speeds of the second to fourth-group lenses 72 to the reference speed of the first-group lens 71 is stored in ROM 56 beforehand. Thus, the driving speed data on each lens can be read from ROM 56 in accordance with the position of the first-group lens 71.

Next, a description will be given as to how a focus state is stored and of the method in which the final position data on each lens group is output.

Let it be assumed that in FIG. 18, the first-group lens 71 moves from position x' to position x" in accordance with a zooming operation. The position X(Pi) of e.g. an i-th group lens is expressed as follows:

$$X(Pi) = X(BPi'') + X(FPi'')$$

where X(BPi") is a moving distance for which the i-th group lens is moved from the wide-angle reference position in accordance with a zooming operation, and X(FPi") is a moving distance for which the i-th group lens is moved from the basic position (the infinity position in accordance with a focusing operation. With respect to moving distance X(BPi"), ROM 56 stores basic moving distances $(x1, X(BPi1)), \ldots, (xn, X(BPin)), \ldots$ determined in relation to the first-group lens 71. These basic moving distances correspond to a limited number of data points determined on the curve in FIG. 18. FIG. 18 shows the moving distance of the fourth-group lens 74. The points corresponding to the basic moving distances are indicated by $BPi1, \ldots, BPin, \ldots$. The CPU 59 carries out linear interpolation between the data points. As is understood from FIG. 8, the accuracy of the moving distance X(BPi") will one higher by shortening the distances between the above points. This relationship can be expressed as follows:

$$X(BPi'') = \frac{(x'' - x_n) \cdot X(BP_{in+1}) + (x_{n+1} - x'') \cdot X(BP_{in})}{(x'' - x_n) + (x_{n+1} - x'')}$$

where x" is the position of the first-group lens 71 at the end of zooming, and $x_n$ and $x_{n+1}$ are positions sandwiching that position of the first-group lens 71.

Figure 20:
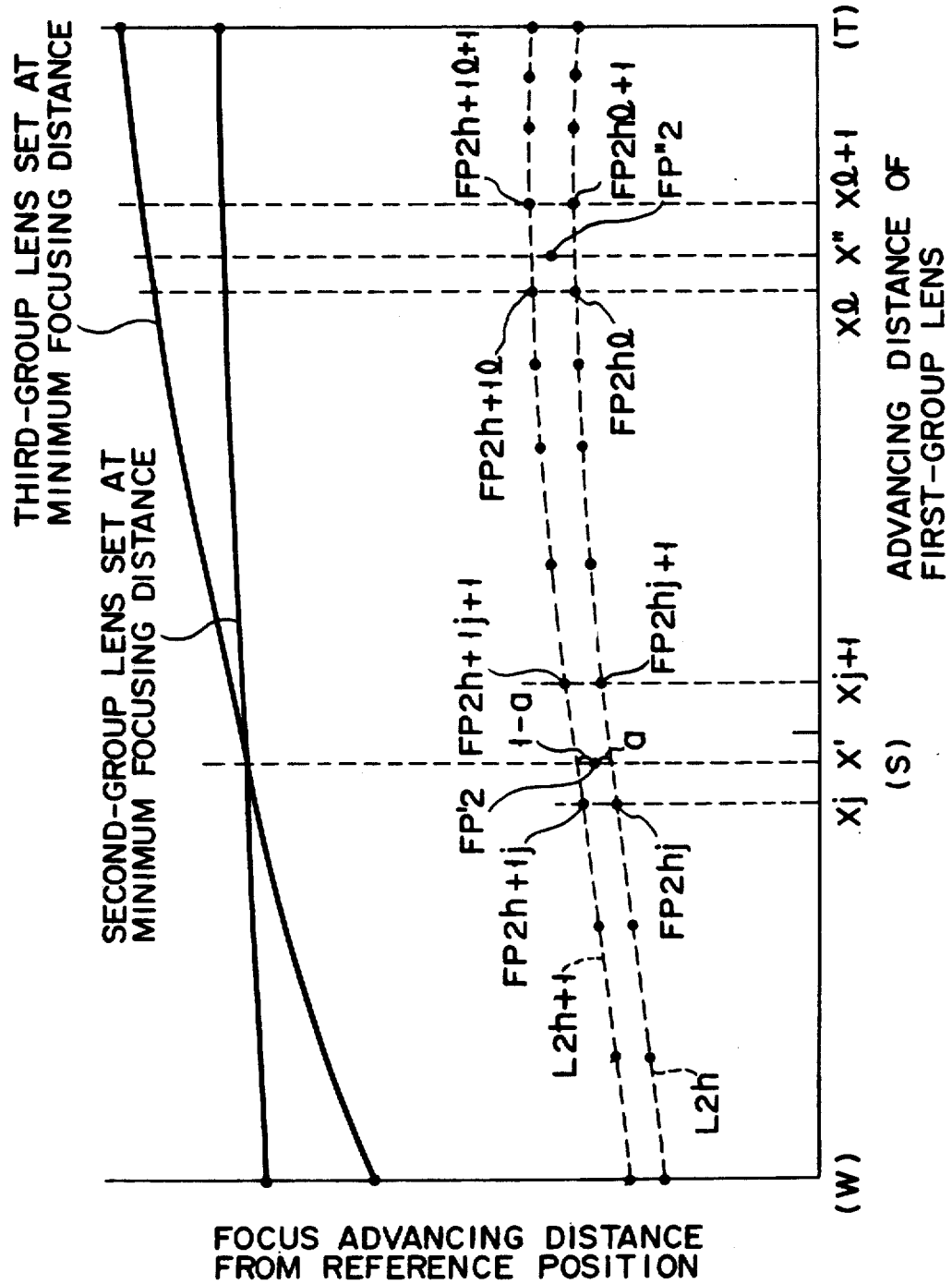

With respect to moving distance X(FPi"), ROM 56 stores data on a limited number of data point groups $(Li1, \ldots, Lih, \ldots)$. As is shown in FIG. 20, the data point groups are determined in accordance with the advancing (zooming) distance of the first-group lens 71, with respect to a limited number of in-focus object distances. The data points included in data point group Lih are indicated by symbols $FPih1, \ldots, FPihj, \ldots$, and h is an integer which monotonously increases from the infinity to the minimum focusing distance. Moving distance X(FPi") is calculated as follows. Let it be assumed that before the start of a zooming operation, the advancing distance for which the i-th group lens is advanced from the reference position in accordance with a focusing operation is FP2' (which is between Lih and Lih+1). In this case, four data points surrounding point FP2' are determined as points FPihj, FPihj+1, FPih+1j and FPih+1j+1. Then, the ratio of the ordinate-direction distance between point FP2' and line FPihj FPihj—FPihj+1 and the ordinate-direction distance between point FP2' and line FPih+1j—FPih+1j+1 is calculated. If this ratio is a:(1−a), the data representing a focus state is stored as (h+a). In other words, Lih and Lih+1 are regarded as similar and close to each other, and an equidistant focusing point between them is regarded as maintaining a linear relationship with reference to the direction of the ordinate. Based on this idea, the focus advancing distance X(FPi") corresponding to the final point FPi" can be calculated easily and accurately by use of the formula below, $$X(FP_i'') =$$

$$(1-a) \cdot \left( \frac{(x''-x_1) \cdot X(FP_{ih1+1}) + (x_{1+1}-x'') \cdot X(FP_{ih1})}{(x''-x_1) + (x_{1+1}-x'')} \right) +$$

$$a \cdot \left( \frac{(x''-x_1) \cdot X(FR_{ih+11+1}) + (x_{1+1}-x'') \cdot (X(FR_{ih+11}))}{(x''-x_1) + (x_{1+1}-x'')} \right)$$

where x" is a position at which the first-group lens 71 is stopped.

In this case, the integral portion of a number representing a focus state is h, and the decimal portion of the same number is a. The switching between high speed and low speed is performed in a similar way between the first and second embodiments, but in the zooming of the second embodiment, data is read out, with number h representing the zoom state being varied.

Figure 21A:
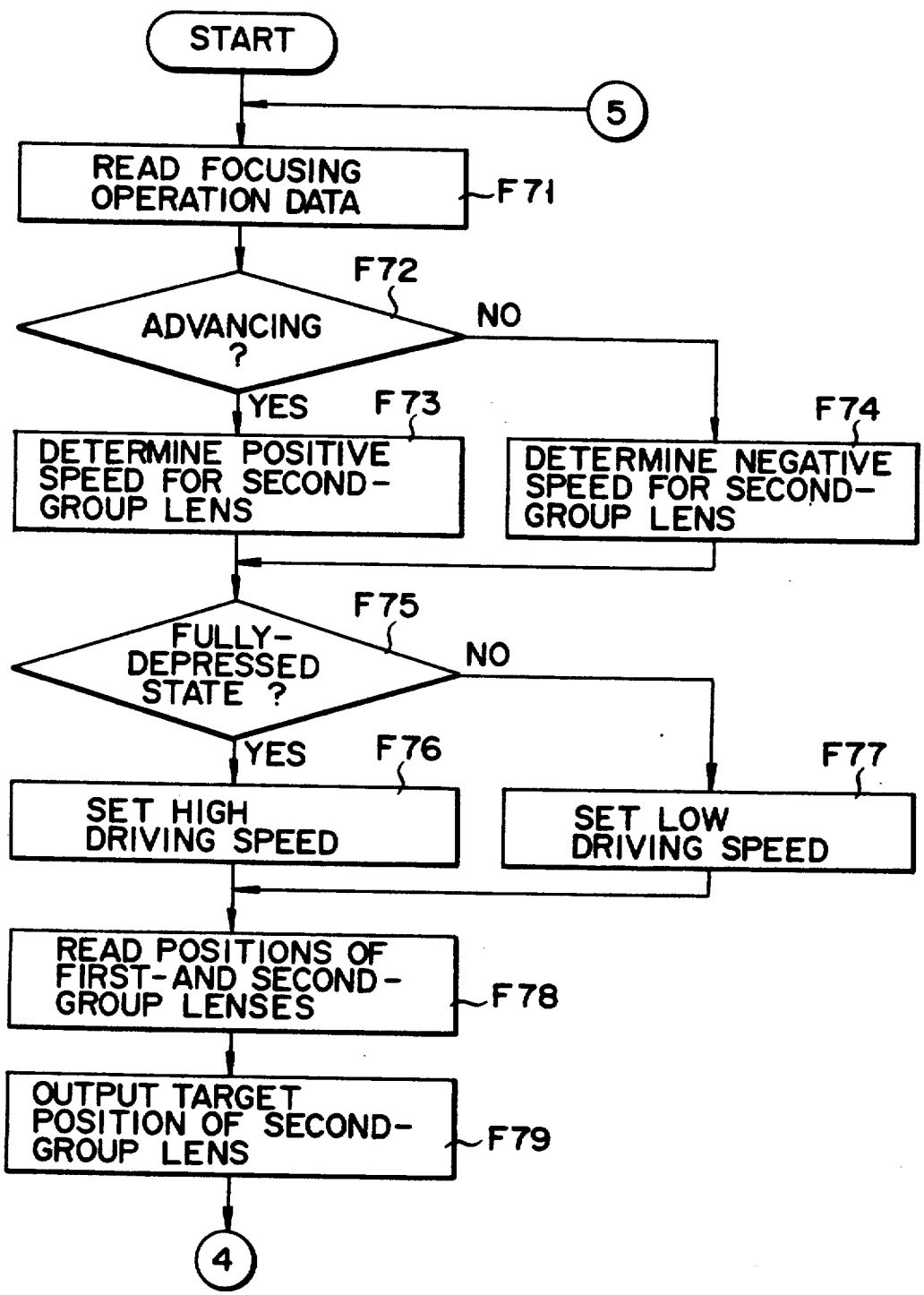

Next, a description will be given, with reference to the flowchart shown in FIGS. 21A and 21B, as to how a power focusing operation is performed in the second embodiment.

The power focusing is carried out by moving the second- and third-group lenses 72 and 73. At this time, the target positions of the second- and third-group lenses 72 and 73 are calculated in a similar manner to that of the zooming operation mentioned above. That is, the CPU 59 reads data out of ROM 56, with number j representing a focus state being varied.

The CPU 59 selects a power focusing mode when the operator operates the focusing operation-input section 61, and reads a signal representing how a zooming operation is performed (step F71). In steps F72–F74 the CPU 59 determines in which direction the focusing operation-input section 61 is operated, and in steps F75–F77 the CPU 59 detects whether the release button 102 is depressed halfway or fully. Subsequently, in step F78, the CPU 59 reads data on the positions of the first- and second-group lenses. (The positions of the first- and second-group lenses represent a zoom state and a focus state, respectively.) As in the case of zooming, data representing the target positions of the second- and third-group lenses 72 and 73 is output in steps F79 and F80. In accordance with the half-depressed state or the fully-depressed state of the focusing operation-input section 61, data on the driving speed of the second-group data is output in step F81, with the values stored in ROM 56 being referred to. On the basis of the focus state and the driving speed data on the second-group lens 72, the driving speed data on the third-group lens 73 is calculated and output in step F82.

Unlike the case of zooming, three different ratios which the second-group lens 72 can have with reference to the third-group lens 73 at the time of focusing are determined in accordance with different zoom states, and data representing the three different ratios is stored in ROM 56. The speed ratio corresponding to the zoom state which is as close as possible to the present zoom state is read out of ROM 56, and the speed of the third-group lens 73 is calculated on the basis of the readout speed ratio.

In steps F83 and F84, the CPU 59 transmits target position signals and speed signals of the second- and third-group lenses 72 and 73 to driving circuits 55₂ and 55₃, as in the case of zooming. Thereafter, in step F85, the CPU 59 outputs a driving-permission signal, to thereby start the driving of the lens groups. In step F86, the CPU 59 checks whether or not the operation is still continued. If the operation is not continued, the flow advances to step F87, wherein the CPU 59 checks whether or not all lenses are stationary. After confirming that all lenses are stationary, the power focusing operation is brought to an end.

Figure 23:
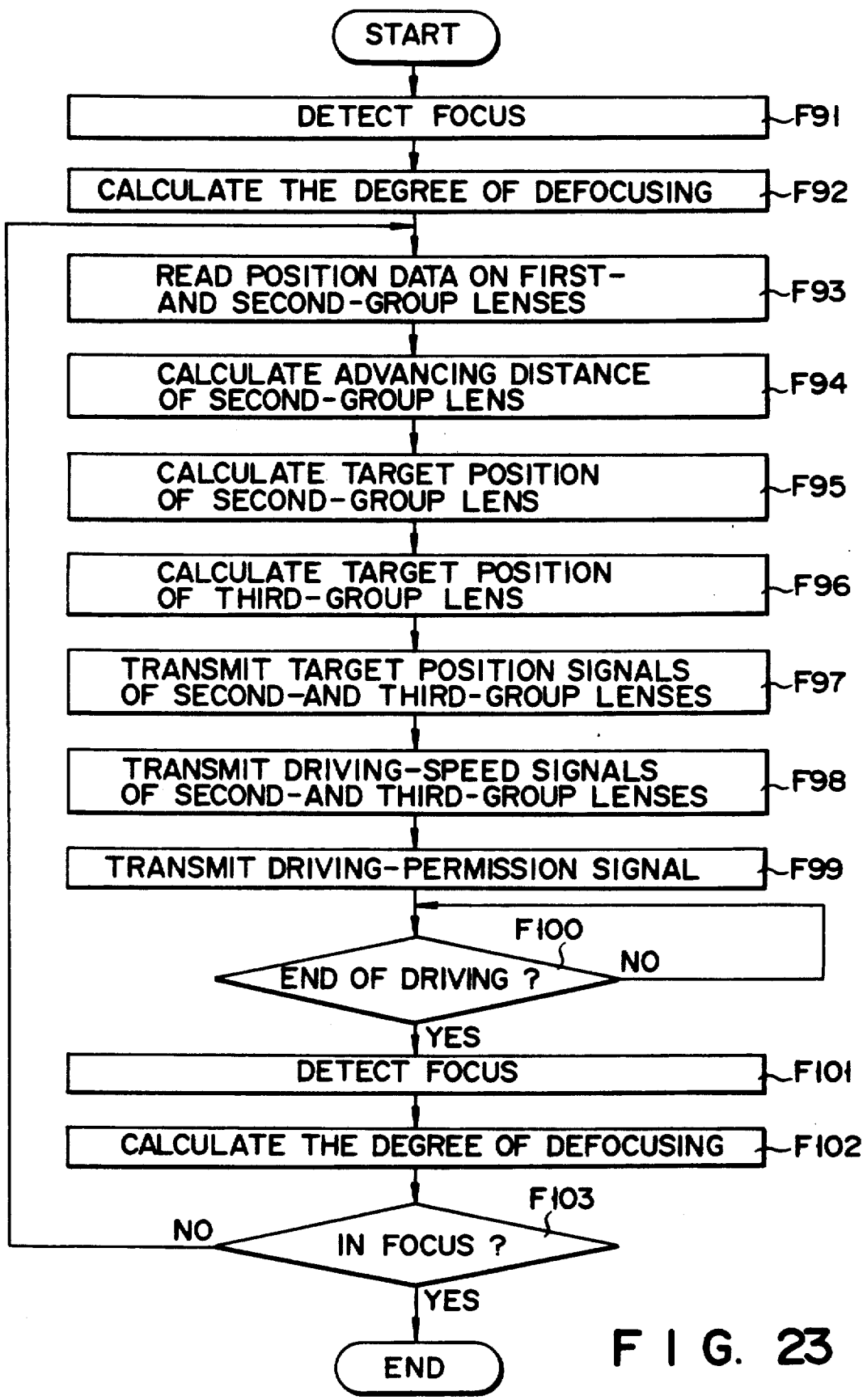

A description will now be given, with reference to the flowchart shown in FIG. 23, as to how an auto focusing operation is performed in the second embodiment.

The CPU 59 selects an autofocus mode when the operator depresses the release button 92 halfway (i.e., the first release state). In the autofocus mode, the CPU 59 first performs focus detection by means of the AF module 57 in step F91. On the basis of the focus detection, the CPU 59 calculates the degree of defocusing in step F92. In step F93, the CPU 59 detects the positions of the first- and second-group lenses 71 and 72 on the basis of the outputs of counters 54$_1$ and 54$_2$. (The positions of the first- and second-group lenses 54$_1$ and 54$_2$ represent a zoom state and a focus state, respectively.) Next, in step F94, the CPU 59 calculates the advancing distance of the second-group lens 72. Calculation of the advancing distance is performed by reading calculation coefficients out of ROM 56 in accordance with the zoom state (i.e., the position of the first-group lens 71). In the case of the second embodiment, calculation coefficients α, β, and γ are stored in ROM 56, as disclosed in U.S. Pat. No. 4,931,820, and the driving distance ΔX can be calculated as below approximately but with sufficient accuracy.

$$\Delta X = a(\beta + d) + \gamma \cdot d - (a/\beta)$$

In step F95, the CPU 59 calculates the final position data o the second lens 72 by adding the driving distance ΔX to the position data on the second-group lens 72. In step F96, the CPU 59 calculates the target position data on the third-group lens 73 in accordance with the focus state number corresponding to the final position of the second-group lens 72, by using a similar technique to that used in zooming.

Thereafter, in steps F97 and F98, the CPU 59 transmits target position data and speed signal data on the second- and third-group lenses 72 and 73 to driving circuits 55₂ and 55₃. Thereafter, in step F99, the CPU 59 outputs a driving-permission signal, to thereby start the driving of the lens groups After confirming in step F100 that the driving of the lens groups has been completed, the CPU 59 performs focus detection once again by means of the AF module 57 (step F101), calculates the degree of defocusing (step F102), and checks whether or not the photographing lens is in focus (step F103). If the photographing lens is not in focus, the flow returns to step F93. If the photographing lens is in focus, the operation in the auto focusing mode is brought to an end.

In the second embodiment, a zoom state is detected based on the output of the position-detecting means provided for the first-group lens 71, and a focus state is detected by the operation control section 59 and the position-detecting means provided for the second-group lens 72. In accordance with the zoom and focus state, thus detected, the driving of the lens groups is controlled. Therefore, the second embodiment does not have to employ any special means for detecting the zoom and focus states. In addition, the state of one lens group is used for calculating the position and driving speed of the other lens groups. Therefore, the lens groups can be driven in various manners with no need to alter the control method, by merely changing the driving speed of the single lens group. Further, the lens groups are driven, with their speeds being controlled in the meantime. Therefore, even when the technique of the second embodiment is applied to a single-lens reflex camera, the image observed through the viewfinder is not adversely affected, and zooming and power focusing can be performed in a reliable manner.

In the first and second embodiments mentioned above, the zooming operation-input section, the focusing operation-input section and other operation-input sections need not be of a button type. For example, an electronic dial, such as that disclosed in U.S. Pat. No. 4,851,869, may be employed as such operation-input sections. In addition, signals of three or more kinds may be generated in accordance with the movement of an operation-input section.

Moreover, the target position data and driving speed data on each lens group may be stored in a ROM, instead of outputting the data. In addition, the technique for interpolating data may be replaced with the technique for performing approximation by use of predetermined formulas in accordance with coefficient data stored beforehand.

The focus-detecting means employed in the foregoing embodiments need not be limited to the type mentioned above. For example, the focus-detecting means may be of an active type wherein infrared rays or ultrasonic waves are used.

The present invention is applicable to a multi-lens focusing lens having no zoom function. The present invention is also applicable to a lens system wherein the MTF or other characteristics are varied by changing the distances between the lens groups.

As has been detailed, according to the first and second embodiments of the present invention, it is possible to provide a lens driving control apparatus which is smaller than, a conventional apparatus (employing a cam cylinder enabling lens groups to move in a complicated manner), has a simple construction allowing the use of a memory of a small storage capacity and reducing the load to be applied to a calculation section, and prevents lens groups from having unintended or undesirable positional relationships, thereby ensuring an image to be focused in a reliable manner.

The third embodiment of the present invention will now be described. The third embodiment differs from the first embodiment, in that lens groups are switched from one to another by a switching circuit 60 and are selectively driven by a single driving circuit 55. Except for this point, the third embodiment is similar to the first embodiment.

Figure 24:
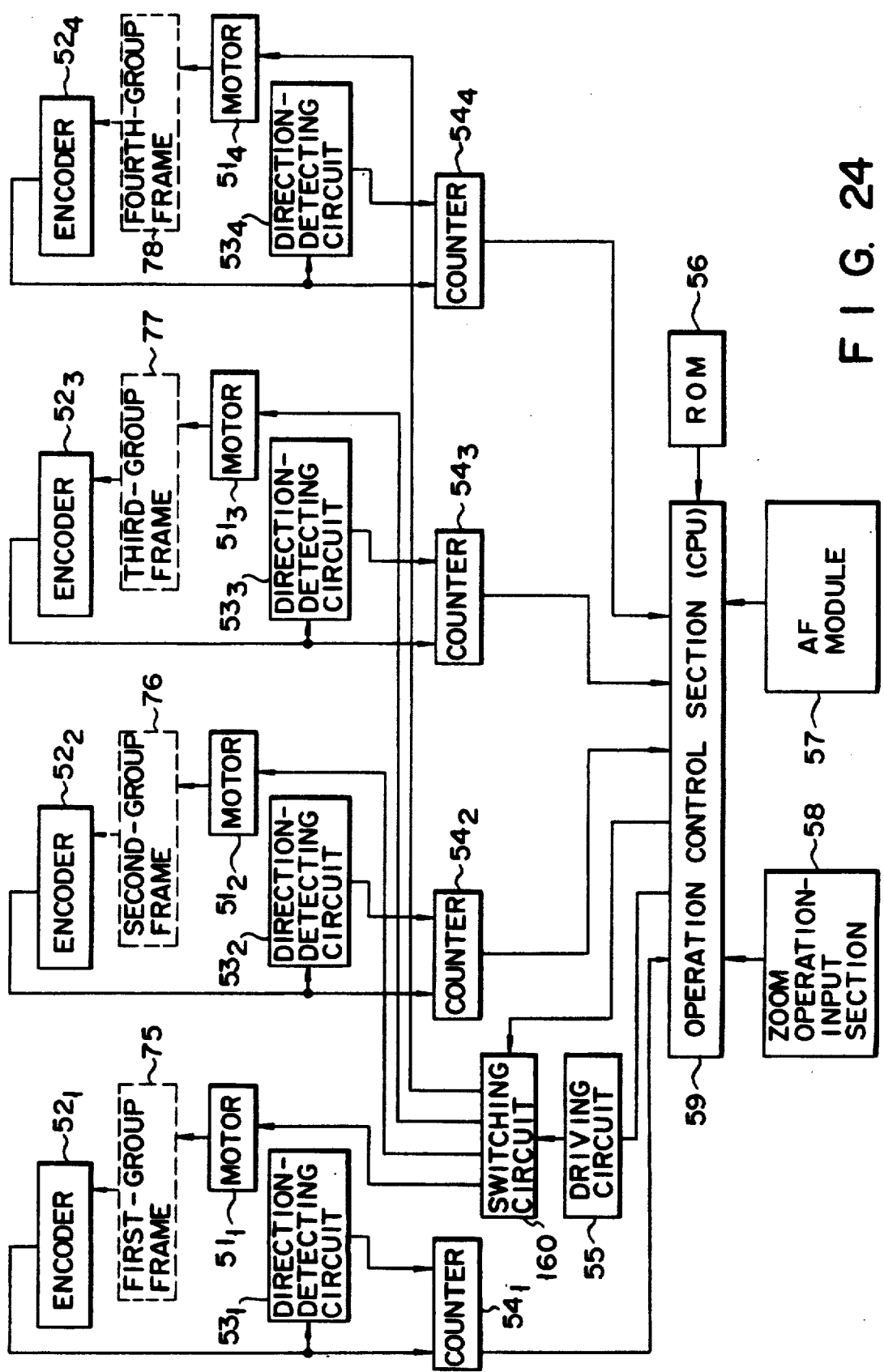

Referring to FIG. 24, reference numeral 55 denotes a driving circuit for driving linear ultrasonic motors $51_1$–$51_4$ in accordance with a driving control signal supplied from an operation control section 59. The linear ultrasonic motors $51_1$–$51_4$ are constituted by vibrating members 80–83, respectively. Reference numeral 160 denotes a switching circuit for selecting one of the motors $51_1$–$51_4$ and supplying the pulses generated by the driving circuit 55 to the selected motor.

Figure 25:
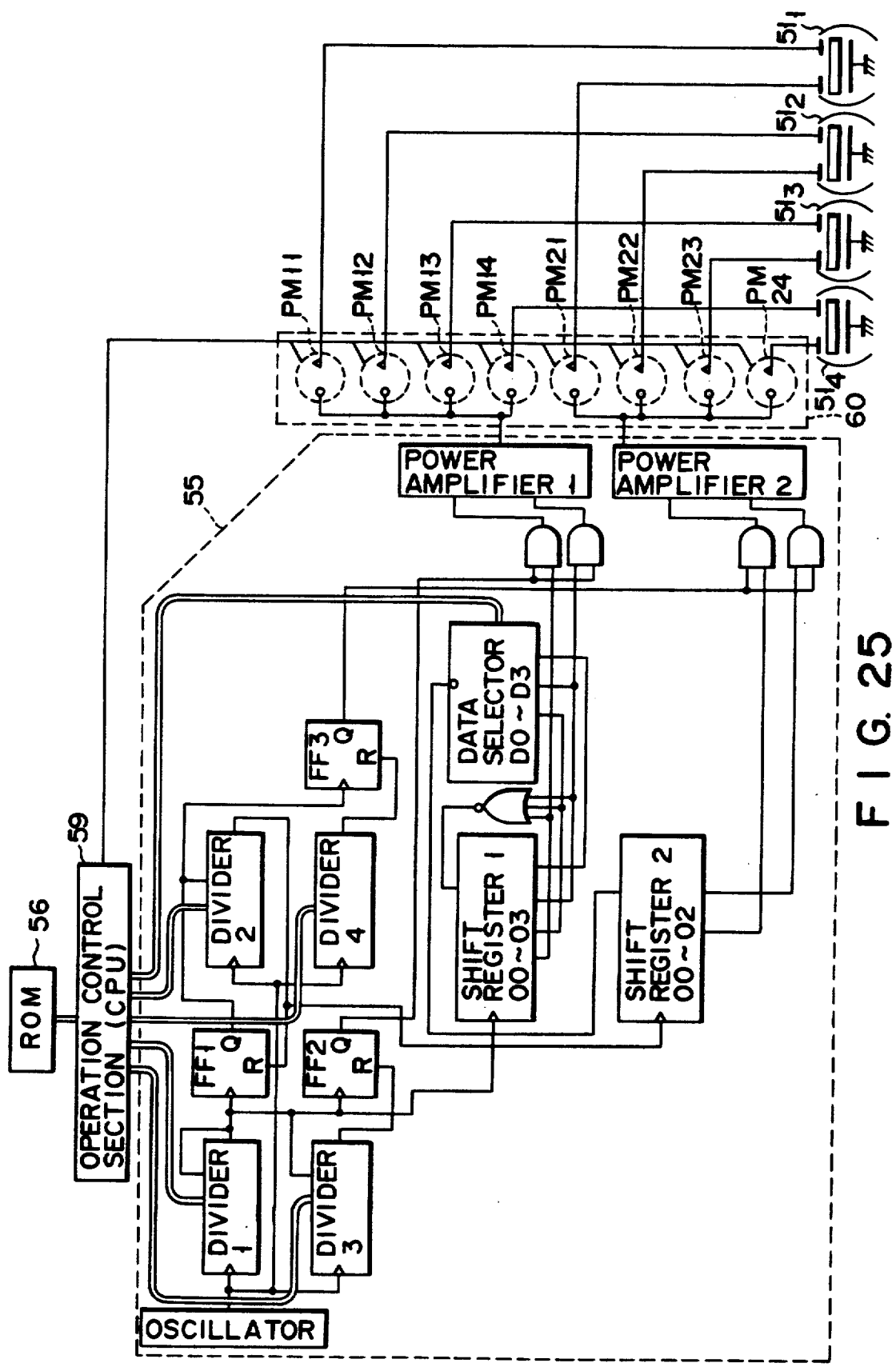

The driving circuit 55 and the switching circuit 160 are shown in detail in FIG. 25. Since the structure of the driving circuit 55 is similar to that of the driving circuit employed in the first embodiment, its description will be omitted. The switching circuit 160 is a combination of e.g. photo MOS relays PM11, PM12, PM13, PM14, PM21, PM22, PM23, and PM24 which are opened or closed in response to control signals supplied from the operation control section 57.

Figure 26B:
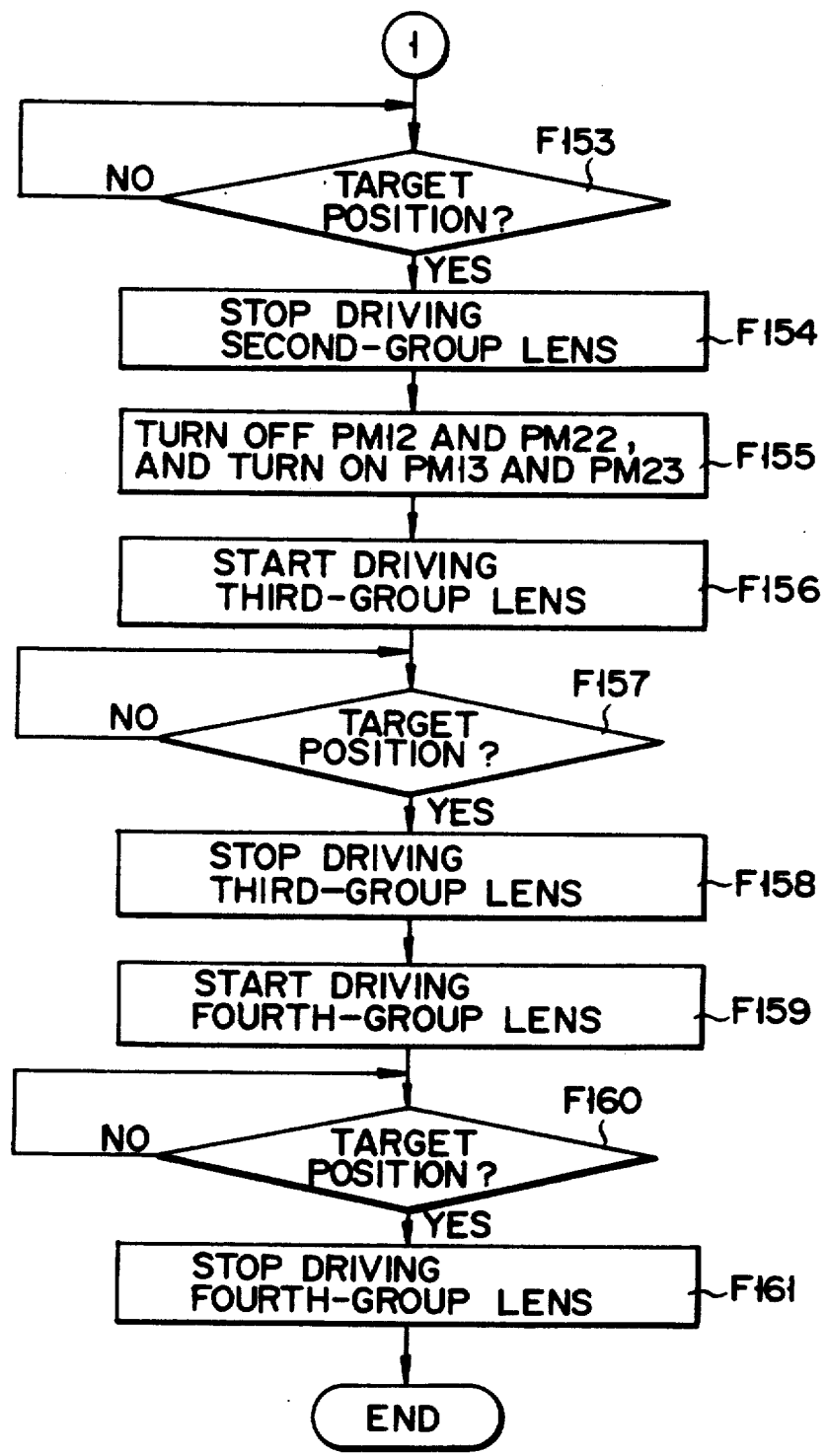

A description will be given, with reference to the flowchart shown in FIGS. 26A and 26B, as to how a zooming operation is performed in the third embodiment.

Upon the operation of the zooming operation-input section 58, the zooming operation is started. In step F141, the CPU 57 turns on photo MOS relays PM11 and r PM21, so that linear ultrasonic motor $51_1$ is set in a state where it can start the driving of the first-group lens 71 in response to a driving pulse generated by the driving circuit 55. In step F142, the CPU 59 determines which button of the input section 58, the telephoto button T or the wide-angle button W, is depressed. If the telephoto button T is depressed, the advancing movement of the first-group lens 71 is started in step F143. In step F144, it is determined whether or not the zooming operation is still continued. If the zooming operation is still continued, the first-group lens 71 is advanced further. If the zooming operation is not continued, the driving of the first-group lens 71 is stopped in step F147. If it is determined in step F142 that the wideangle button W is depressed, steps F145–F147 are executed, wherein the retreating movement of the first-group lens 71 is started and stopped.

As is to be understood from the above, only the first-group lens 71 is moved during the zooming operation. After the end of the zooming operation, photo MOS relays PM11 and PM21 are turned off in step F148. In this state, the CPU 59 reads the data on the position of the first-group lens 71 on the basis of the output of counter $54_1$ in step $F149_1$. In accordance with the data regarding the position of the first-group lens 71, the CPU 59 calculates the data regarding the reference positions of the second- to fourth-group lenses 72–74 and outputs the data in step F150. The reference positions are positions where the lens groups are in focus, with reference to the infinity, in each zoom state. The reference positions of the second- to fourth-group lenses 72–74 are determined when the position of the first-group lens 71 is determined. In the third embodiment, the movable range of the first-group lens 71 is minutely divided to obtain reference positions of the first-lens group 71. Reference position data on the reference positions is written in the ROM 56 beforehand. With the reference position data in the ROM 56 referred to, data on the positions of the second- to fourth-group lenses 72–74 are calculated.

The CPU 59 turns on photo MOS relays PM12 and PM22 in step F151 and starts the driving of the second-group lens 72 in step F152. If it is determined in step F153 that the second-group lens 72 has reached the calculated position, the driving of the second-group lens 72 is stopped in step F154. In steps F155–161, the CPU 59 drives the third- and fourth-group lenses 73 and 74 in a similar way, with the photo MOS relays being opened or closed When the second- to fourth-group lenses 72–74 have been driven to their reference positions, the zooming operation is brought to an end. That is, each lens group is in focus with respect to the infinity at the end of the zooming operation.

Figure 27B:
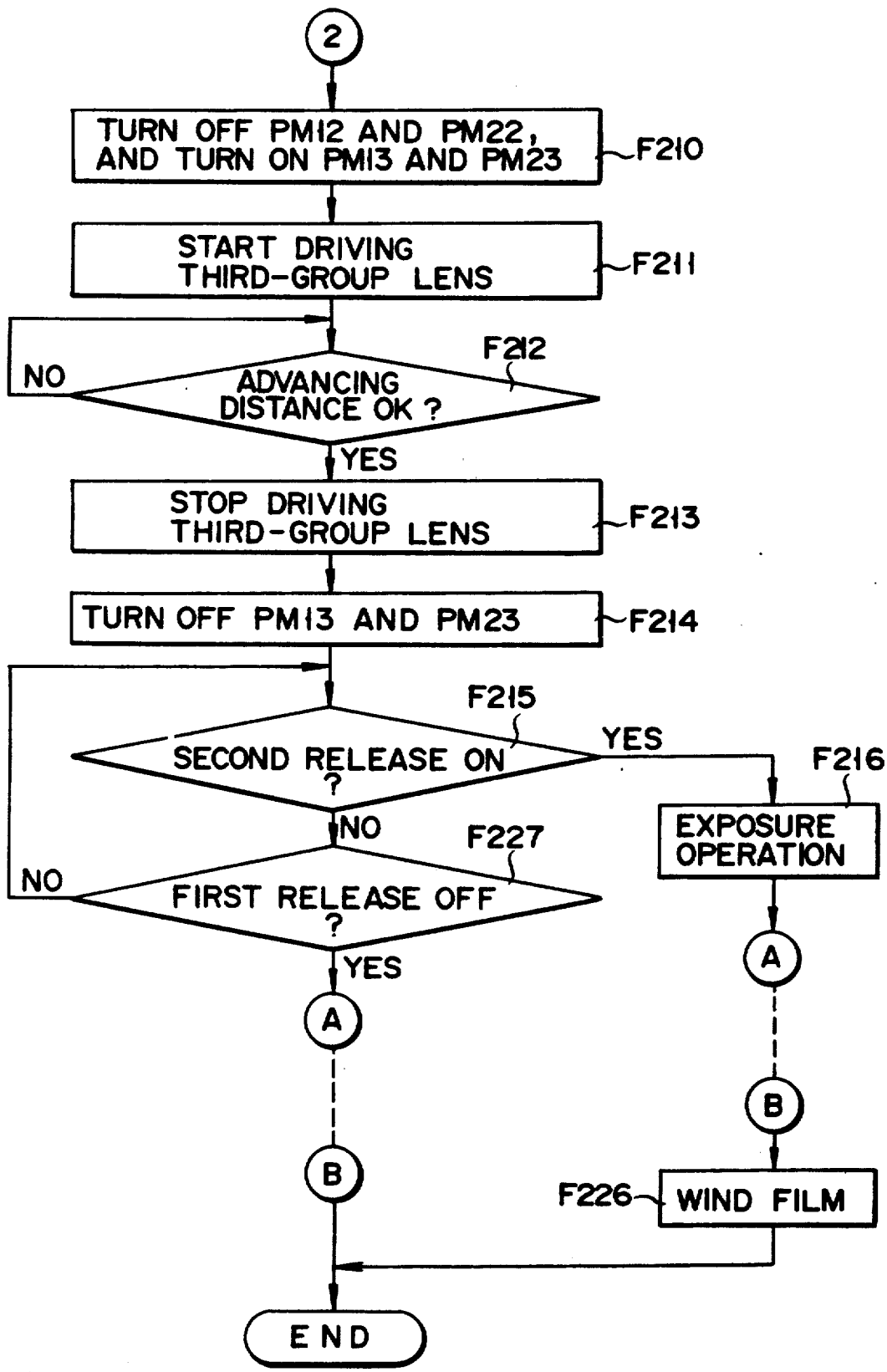
Figure 27C:
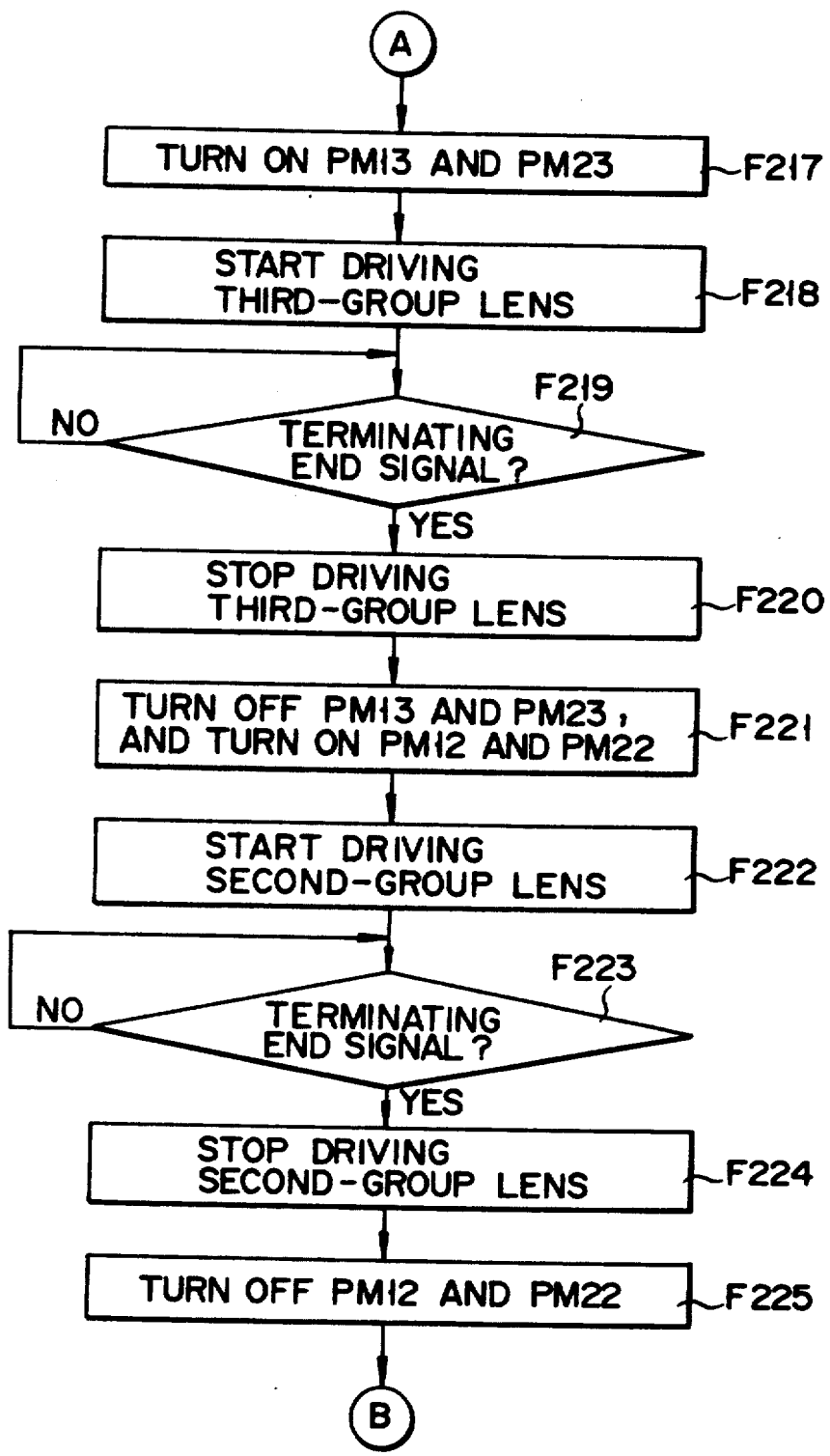

Next, a description will be given, with reference to the flowchart shown in FIGS. 27A–27C, as to how a focusing operation is performed in the third embodiment.

The CPU 59 starts a focusing operation when the release button 92 is depressed halfway. In order to check a zoom state, the CPU 59 detects the position of the first-group lens 71 on the basis of the count of counter $54_1$ in step F201. Then, the CPU 59 measures the distance to an object by means of the AF module 57 in step F202. If it is determined in step F203 that detection is possible, the CPU 59 calculates and outputs the advancing distance of the second-group lens 72 in steps F204. Subsequently, the CPU 59 calculates and outputs the advancing distance of the third-group lens 73 in steps F205.

As in the case of the zooming operation mentioned above, the positions of the second- and third-group lenses 72 and 73 are calculated and output, with the data stored in ROM 56 referred to. That is, a zoom state which is close as possible to the present zoom state is selected from among the wide-angle state, the standard state, and the telephoto state. In accordance with the curve shown in one of FIGS. 12A-12C, the distances for which the second- and third-group lenses 72 and 73 should be advanced from the reference positions are calculated and output, with the data stored in the ROM 56 being referred to. Incidentally, FIG. 12A shows the distances for which the lens groups are moved in relation to the distance to an object in the wide-angle mode, FIG. 12B shows the distances for which the lens groups are moved in relation to the distance to the object in the standard mode, and FIG. 12C shows the distances for which the lens groups are moved in relation to the distance to the object in the telephoto mode.

The CPU 59 turns on photo MOS relays PM12 and PM22 in step F206 and starts the driving of the second-group lens 72 in step F207. If it is determined in step F208 that the second-group lens 72 has been advanced by the calculated advancing distance, the driving of the second-group lens 72 is stopped in step F209. In steps F210-214, the CPU 59 drives the third- and fourth-group lenses 73 and 74 in a similar way. At the end of the driving of the second- to fourth-group lenses 72-74, each lens group is in focus. If it is determined in step F215 that the release button 92 is fully depressed (second release ON), then an exposure operation is performed in step F216. After the second- and third-group lenses 72 and 73 retreat to their reference positions in steps F217-F225, the film is wound in step F226, to thereby bring the operation to an end. In steps F215 and F217, it is determined whether or not the release button 92 is still in the depressed state. If it i determined that the release button 92 is not in the depressed state, the second- and third-group lenses retreat in steps F217-F225, and the operation is brought to an end.

According to the third embodiment, each lens group can be driven in an optimal floating manner in accordance with the present zoom state (i.e., one of wide-angle, standard, and telephoto states. Therefore, an image is hardly affected by focus adjustment, and the minimum focusing distance can be as short as possible. Moreover, these advantages are achieved by employing only one driving circuit. This means that the electric circuit is simple. In addition, since two or more lens groups are not simultaneously driven, it is possible to reduce the maximum current consumption.

When calculating data on the position of each lens group, an approximation formula or an interpolation formula may be used, so as to reduce the number of coefficients and the amount of data used in the calculation.

The fourth embodiment of the present invention will now be described, referring to a single-lens reflex camera employing a zoom lens which is similar to that of the third embodiment and which incorporates lens groups driven in a floating manner.

The lens arrangement and frame structure employed in the fourth embodiment ar similar to those of the first embodiment, and the camera obtained in accordance with the fourth embodiment is also similar to the that obtained in accordance with the second embodiment. Therefore, a description of the lens arrangement, the frame structure and the camera related to the fourth embodiment will be omitted herein.

The electric circuit employed in the fourth embodiment will be described, with reference to FIG. 28. Since the fourth embodiment is applied to a TTL camera, the lens groups of the fourth embodiment have to maintain the positional relationships predetermined at the time of design. If each lens group is driven for a long distance, the positional relationships among the lens groups become greatly different from the predetermined positional relationships. In such a case, the image observed through the viewfinder is adversely affected. As a result, the operator looking into the viewfinder may feel unpleasant, and think it difficult to accurately operate the keys when looking through the viewfinder. In the fourth embodiment, therefore, the lens groups are driven to have parallel relationships, such that desirable positional relationships among the lens groups are not affected. In order to driven the lens groups in this manner, the fourth embodiment employs four driving circuits $55_1$-$55_4$, unlike the third embodiment, and the four driving circuits $55_1$-$55_4$ drive the first- to fourth-group lenses 71-74, respectively, under the control of the operation control section 59. Since the four driving circuits 551-554 are controlled independently of one another, the fourth embodiment does not employ a switching circuit, such as that employed in the third embodiment. Further, the fourth embodiment employs a focusing operation-input section 61 with which focus adjustment is made manually, as in the second embodiment. Since the lens groups are electrically driven in accordance with the manual focus adjustment, the manual focusing performed in the fourth embodiment is so-called power focusing. As for the other structures, the fourth embodiment is similar to the third embodiment, and a description of the other structures will be omitted herein.

Figure 29B:
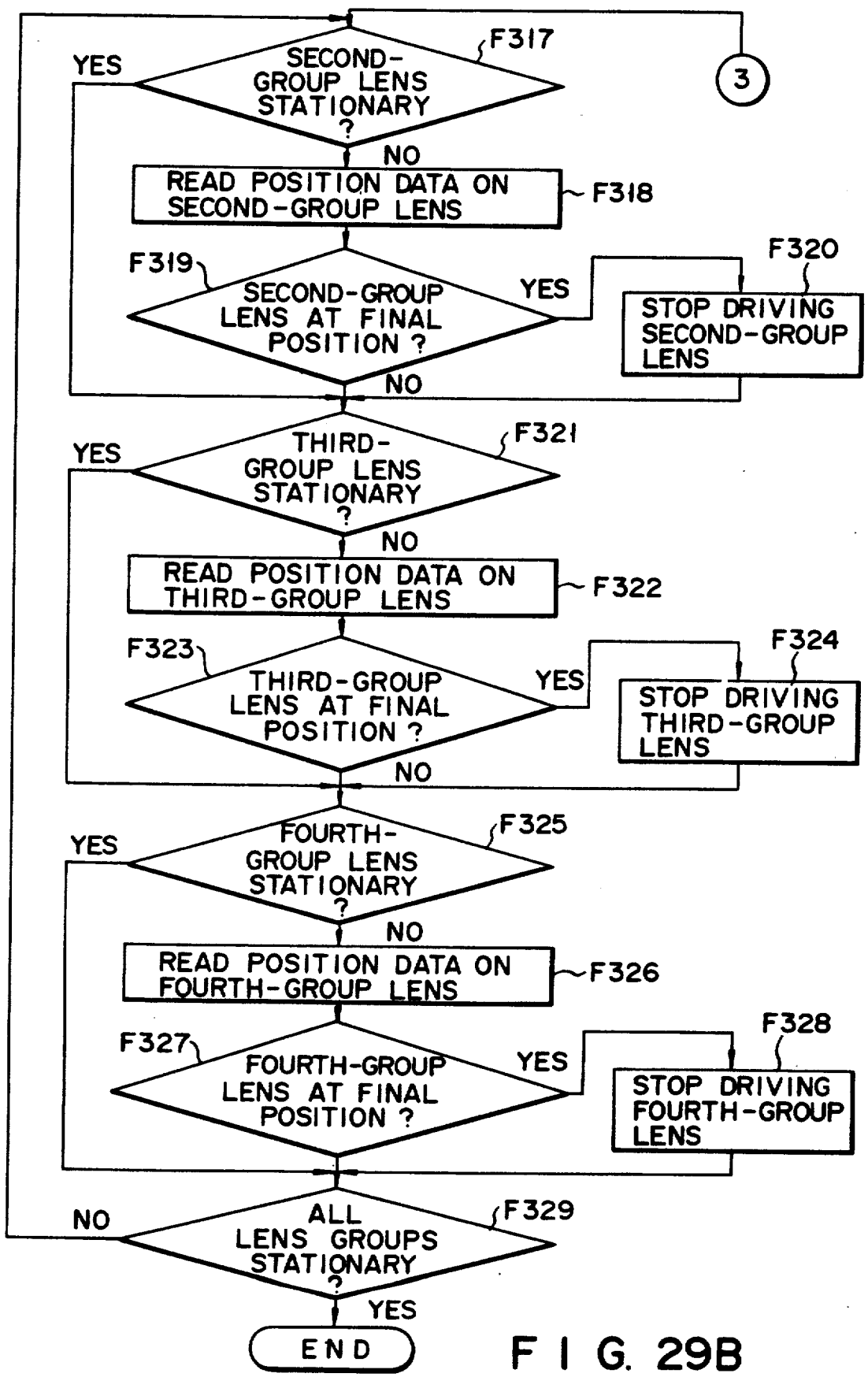

FIGS. 29A and 29B are flowcharts showing how a zooming operation is performed in the fourth embodiment. The CPU 59 selects a zooming mode when the zoom operation-input section 58 is operated. First, in step F301, the CPU 59 stores data on the present focus state (i.e., the initial focus state) in the same manner as in the second embodiment. Then, in step F302, the CPU 59 determines which button, the telephoto button T or the wide-angle button W, is depressed. If the telephoto button T is depressed, each lens group is driven in the direction toward the telephoto position. Conversely, if the wide-angle button W is depressed, each lens group is driven in the direction toward the wide-angle position.

In the case where the telephoto button T is depressed, the CPU 59 reads the position of the first-group lens 71 in step F303, and outputs speed data on each lens group in step F304, with the data stored in ROM 56 being referred to. In step F305, the CPU 59 causes the linear ultrasonic motors $51_1$–$51_4$ to generate driving signals in accordance with the output speed data. In step F306, the CPU 59 determines whether or not the zooming operation has been stopped. If it is determined that the zooming operation has been stopped, the CPU 59 stops the lens group in step F307. If it is determined that the zooming operation is still being performed, the flow returns to step F303.

Steps F308 to F312, which the CPU 59 performs where the wide-angle button W is depressed, are similar to steps F303 to F307, respectively.

Next, the CPU 59 starts the operation for returning the lens groups to their focusing positions. First of all, step F313 is executed wherein the CPU 59 reads the position data on the first-group lens 71. In step F314, the CPU 59 reads the data on the initial focus state. In step F315, the CPU 59 outputs the final position data on the second- to fourth-group lenses 72–74 such that the final position data reflects the initial focus state of the second- to fourth-group lenses 72–74. In step F316, the CPU 59 starts the driving of the second- to fourth-group lenses 72–74. After confirming in step F317 that the second-group lens 72 is still moving, the CPU 59 determines in steps F318 and F319 whether or not the second-group lens 72 is at the final position corresponding to the final position data. If it is determined that the second-group lens 72 is at the final position, the driving of the second-group lens 72 is stopped in step F320. If it is determined in step F317 that the second-group lens 72 is stationary, the CPU 59 skips steps F318 to F320. In steps F321 to F328, the CPU 59 drives the third- and fourth-group lenses 73 and 74 in a similar manner. After confirming in step F329 that all lens groups are stationary, the zooming operation is brought to an end.

In the zooming operation of the fourth embodiment, the technique for outputting the driving-speed and final-position data on each lens group is similar to that of the second embodiment. Likewise, the technique for storing the focus state is similar to that of the second embodiment.

Figure 30A:
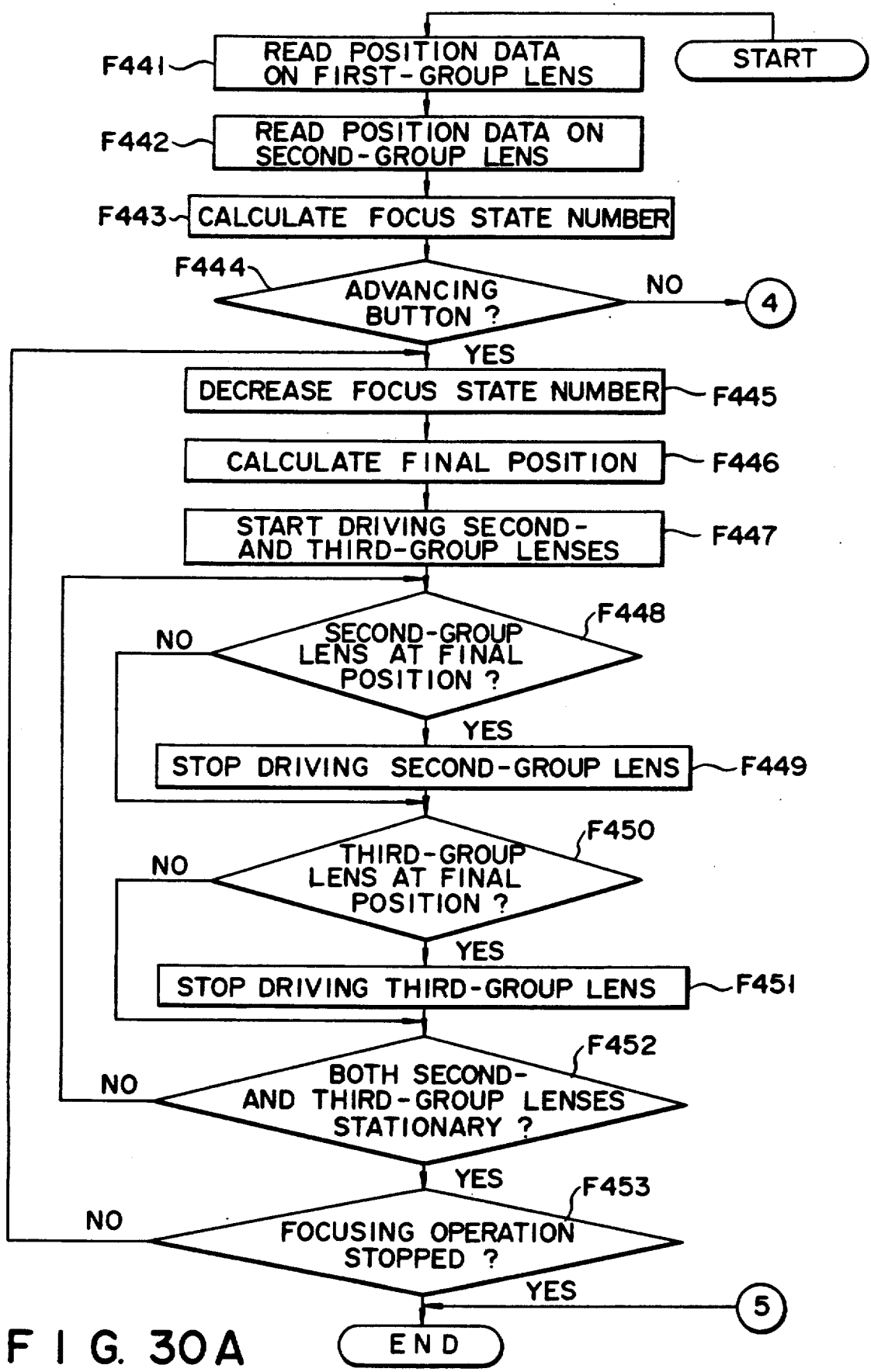
FIGS. 30A and 30B are flowcharts showing a power focusing operation.
Figure 30B:
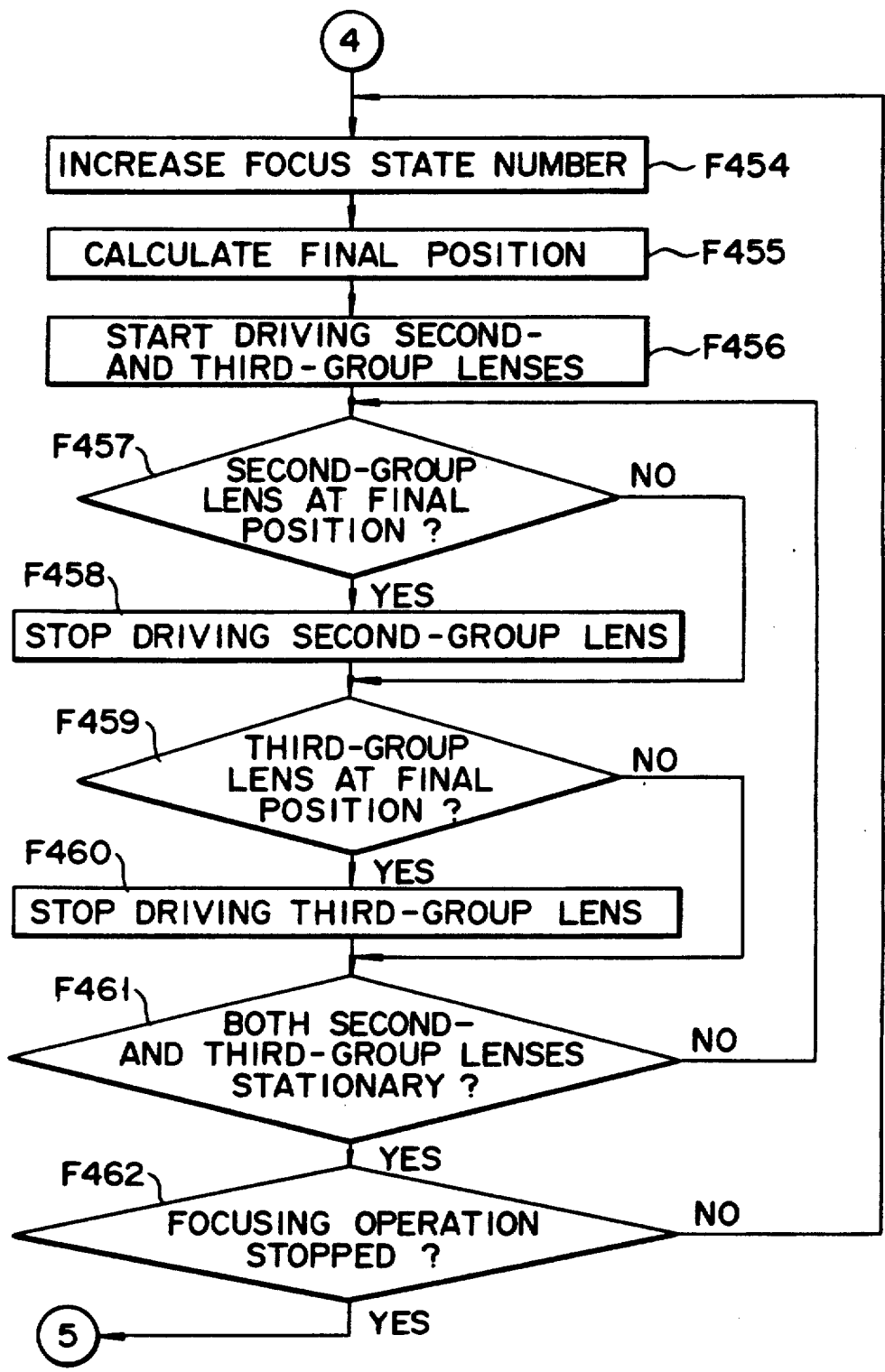

FIGS. 30A and 30B are flowcharts showing how a power focusing operation is performed in the fourth embodiment. The CPU 59 selects a power focusing mode when the operator operates either the advancing or retreating button of the focusing operation-input section 61. First, in step F441, the CPU 59 reads the position of the first-group lens 71. (The position of the first-group lens 71 corresponds to the present zoom state.) Next, in step F442, the CPU 59 reads the position of the second-group lens 72, so as to check the focus state. In step F443, the CPU 59 calculates the focus state number in the same way as in the case of zooming. In step F444, the CPU 59 determines which button, the advancing button or the retreating button, is depressed.

If it is determined in step F444 that the advancing button is depressed, then the CPU 59 reduces the focus state number in step F445. The reduction of the focus state number is carried out to such an extent that it does not result in deterioration of the quality of the image observed by the operator. In step F446, the CPU 59 calculates data on the positions of the second- and third-group lenses 72 and 73 in accordance with the new focus state number. In step F447, the driving of the second- and third-group lenses 72 and 73 is started. In steps F448 to F451, the CPU 59 checks the present positions of the second- and third-group lenses 72 and 73 and stops the driving of these lenses if their present positions coincide with the final positions. After confirming in step F452 that both the second- and third-group lenses 72 and 73 are stationary, the CPU 59 checks in step F453 whether or not the focusing operation is still continued. If it is determined in step F453 that the focusing operation is still continued, the flow returns to step F145, so as to further adjust the focus state. If it is determined in step F453 that the focusing operation is not continued, then the operation according to the flowchart shown in FIG. 3 is brought to an end.

If it is determined in step F444 that the retreating button is depressed, the CPU executes steps F454 to F462, which are similar to steps F445 to F453, respectively.

Figure 31B:
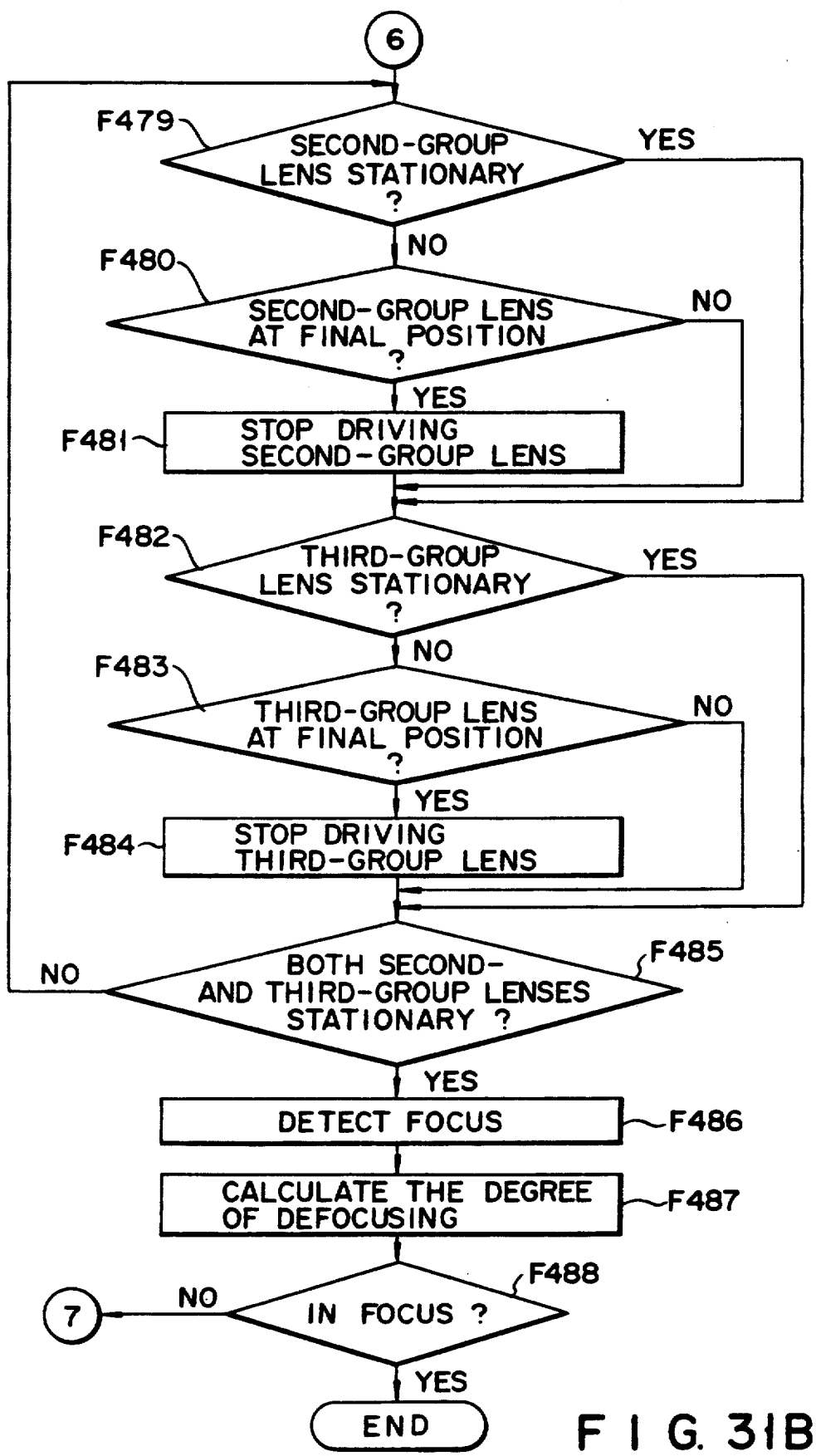

FIGS. 31A and 31B are flowcharts showing how an autofocus (AF) operation is performed in the fourth embodiment. The CPU 59 selects an AF mode when the operator depresses the release button 102 halfway. In the AF mode, the CPU 59 first performs focus detection by means of the AF module 57 in step F471. On the basis of the focus detection, the CPU 59 calculates the degree of defocusing in step F472. In step F473, the CPU 59 detects the positions of the first- and second-group lenses 71 and 72 on the basis of the outputs of counters $54_1$ and $54_2$. (The positions of the first- and second-group lenses $54_1$ and $54_2$ represent a zoom state and a focus state, respectively.) Next, in step F474, the CPU 59 calculates the advancing distance of the second-group lens 72. Calculation of the advancing distance is performed by reading calculation coefficients out of ROM 56 in accordance with the zoom state (i.e., the position of the first-group lens 71). In steps F475 and F476, the CPU 59 calculates the final position data on the second lens 72 and the corresponding focus state number by adding the advancing driving distance to the position data on the second-group lens 72. In step F477, the CPU 59 calculates the target position data on the third-group lens 73 in accordance with the focus state number, by using a similar technique to that used in zooming. In step F478, the CPU 59 starts the driving of the second- and third-group lenses 72 and 73. After the start of the driving, the CPU 59 confirms in steps F480 and F483 whether or not the second- and third-group lenses 72 and 73 are at the final positions calculated. If the second- and third-group lenses 72 and 73 are at the final positions, then the driving of the lenses is stopped in steps F481 and F484. If it is determined in step F479 that the second-group lens 72 is stationary, the CPU 59 skips steps F480 and F481. Likewise, if it is determined in step F482 that the third-group lens 73 is stationary, the CPU 59 skips steps F483 and F484. After confirming in step F485 that the second- and third-group lenses 72 and 73 are stationary, the CPU 59 performs focus detection once again by means of the AF module 57 (step F486), calculates the degree of defocusing (step F487), and checks whether or not the photographing lens is in focus (step F488). If the photographing lens is in focus, the operation in the AF mode is brought to an end.

As mentioned above, according to the fourth embodiment, the lens groups are prevented from having unexpected or undesirable positional relationships, and an image is therefore prevented from being degraded even in the case of power focusing wherein the operator looks through the viewfinder when the lens groups are being driven. In addition, as in the third embodiment, each lens group can be driven in an optimal floating manner during focusing in accordance with the present zoom state. Therefore, the image observed by the operator can be improved, and the range in which photographing is possible can be widened. These advantages are available even in the case of a TTL camera. Further, the utilization of interpolation calculation or the like permits reduction of data which has to be stored beforehand, as in the third embodiment.

As has been described, according to the third and fourth embodiments of the present invention, it is possible to provide a high-performance zoom lens incorporating a focusing mechanism which permits the lens groups to move in an optimal floating state in accordance with a zoom condition, with no need to use a large amount of data. It is also possible to provide a lens driving control apparatus which can reliably suppress the aberration associated with focusing.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A zooming lens system-driving control apparatus, comprising:
   a plurality of lens groups movably provided so as to be movable along a direction of an optical axis therebetween;
   a plurality of motors provided in order to drive the plurality of lens groups, respectively;
   focusing distance-detecting means for detecting a position of a predetermined lens group which is one of said plurality of lens groups and which is changed in the position in accordance with a change in a focusing distance, and for outputting focusing distance data in accordance with data representing a detected position;
   lens position-detecting means for detecting positions of the lens groups other than said predetermined lens group of the plurality of lens groups;
   storage means for storing positional relationships between said predetermined lens group and the other lens groups of the plurality of lens groups;
   zooming operation means for commanding a zooming operation; and
   driving control means for actuating a motor which drives to said predetermined lens group of the plurality of motors in accordance with the zooming operation commanded by said zooming operation means such that the motor is driven by a driving distance determined on the basis of the focusing distance data, calculating driving distances of the other lens groups in accordance with the positions detected by the lens position-detecting means and with the positional relationships stored in the storage means being referred to, and actuating the motors which drive the other lens groups in accordance with the driving distances of the other lens groups.

2. A zooming lens system-driving control apparatus according to claim 1, further comprising second storage means for storing data on relative speed relationships between said predetermined lens group and said remainder lens groups,
   said driving control means including means for controlling the driving of the other lens groups during the zooming operation in accordance with the relative speed relationships whose data is stored in the second storage means.

3. A zooming lens system-driving control apparatus according to claim 1, further comprising:
   distance-measuring means for measuring a distance to an object and outputting object distance data; and
   third storage means for storing driving distance data on said remainder lens group, on the basis of the focusing distance data and the object distance data,
   said driving control means including means for controlling the driving of the other lens groups in accordance with a value which is read out of the third storage means in accordance with the focusing distance data and the object distance data.

4. A zooming lens system-driving control apparatus according to claim 1, wherein said driving control means includes calculation means for performing interpolation calculation so as to derive intermediate points from the positional relationships stored in said storage means.

5. A zooming lens system-driving control apparatus, comprising:
   a plurality of lens groups movably provided so as to be moveable along a direction of an optical axis therebetween;
   a plurality of motors provided in order to drive the plurality of lens groups, respectively;
   first detecting means for detecting a position of a reference lens group which is one of said plurality of lens groups, and for outputting position data on said reference lens group;
   second detecting means for detecting positions of the lens groups other than said reference lens group of the plurality of lens groups;
   storage means for storing positional relationships between said reference lens group and the other lens groups of the plurality of lens groups; and
   driving control means for actuating a motor which drives said reference lens group in accordance with a driving distance corresponding to the position data on said reference lens group, calculating driving distances of the other lens groups in accordance with the positions detected by the second detecting means and with the positional relationships stored in the storage means being referred to, and actuating motors which drive the other lens group in accordance with the calculated driving distances of the other lens groups.

6. A lens-driving apparatus for driving a plurality of lens groups, which are movably provided so as to be movable along a direction of an optical axis therebetween, independently of one another and in accordance with a manual-operation signal generated by a manual operating member, so as to perform focusing or zooming adjustments, said lens-driving apparatus comprising:
   detecting means for detecting present positions of the plurality of lens groups;
   calculating means for calculating data representing a target driving position of a reference lens group which is one of said plurality of lens groups based on a present position of said reference lens group detected by said detecting means, in accordance with the manual-operation signal generated by the manual operating member;
   output means for outputting data representing target driving positions with respect to the lens groups other than said reference lens group of the plurality of lens groups corresponding to the data representing the target driving position of said reference lens group calculated by said calculating means, based on a positional relationship to said reference lens group;

driving means for driving the plurality of lens groups to the target driving positions in accordance with the data representing the target driving positions, respectively; and means for repeatedly operating the detecting means, the calculating means, the output means, and the driving means, while the manual operating member is being operated.

7. A lens-driving apparatus according to claim 6, wherein said output means includes means for storing data representing a plurality of positions which the other lens groups should take in accordance with a position of said reference lens group.

8. A lens-driving apparatus according to claim 7, wherein said output means includes:

means for storing coefficients which are applied to a predetermined calculation formula so as to determine those positions that the other lens groups should take in accordance with the position of said reference lens group; and means for calculating data the positions of the other lens groups, in accordance with the position of the reference lens group which is detected by the detecting means and the coefficients stored in the coefficient-storing means.

9. A zooming lens system-driving control apparatus, comprising:

a plurality of lens groups movably provided so as to be movable along a direction of an optical axis therebetween;

a plurality of motors provided in order to drive the plurality of lens groups, respectively;

zooming operation means for commanding a zooming operation;

storage means for storing position data representing those positions where the plurality of lens groups are in focus with reference to an infinity, such that the position data is stored for each focusing distance as a relative amount to one of said plurality of lens groups; and control means for determining driving distances for which the plurality of lens groups are driven and reach the positions represented by the position data stored in the storage means such that the driving distances are determined in accordance with an operation of the zooming operation means, and outputting a control signal to the plurality of motors.

10. A zooming lens system-driving control apparatus according to claim 9, further comprising:

distance-measuring means for measuring a distance to an object and outputting object distance data;

focusing distance-detecting means for detecting the positions of the plurality of lens groups, and for outputting focusing distance data;

an autofocus operation member for starting a focusing operation on the basis of the object distance data;

second storage means for storing data on the position where each lens group is in focus with reference to the distance to the object, such that the data is stored for each focusing distance, with the position of each lens group determined with reference to the infinity being used as a reference; and control means, responsive to an operation of the autofocus operation member, for reading data on the position of each lens group out of the second storage means on the basis of the focusing distance data and the object distance data, determining driving distance for which each lens group is driven and reaches the position whose data is read out of the second storage means, and outputting a control signal to the plurality of motors.

11. A zooming lens system-driving control apparatus, comprising:

a plurality of lens groups movably provided so as to be movable along a direction of an optical axis therebetween and including a focus lens group used for focusing and a zooming lens group used for zooming;

a plurality of motors provided in order to drive the plurality of lens groups, respectively;

focusing distance-detecting means for detecting focusing distances of the plurality of lens groups and outputting focusing distance data;

zooming operation means for commanding a zooming operation;

first storage means for storing position data representing those positions where the plurality of lens groups are in focus with reference to an infinity, such that the position data is stored for each focusing distance, as a relative amount to one of said plurality of lens groups;

second storage means for storing data on the positions where the plurality of lens groups are in focus with reference to the distance to an object, such that the data is stored for each focusing distance, with the positions of the plurality of lens groups determining with reference to the infinity being used as a reference;

focus state number-storing means for storing a focus state number which represents how the focus lens group is before the start of the zooming operation; and control means for determining data on positions where the lens groups should be during the zooming operation by adding data, which is stored in the second storage means on the basis of focusing distance data and object distance data corresponding to the focus state number, to position data which is read out of the first storage means in accordance with the focusing distance data and which represents the positions where the lens groups are in focus with reference to the infinity, determining distances for which the lens groups are driven and reach the positions whose data is determined, and outputting a control signal to the motors.

12. A zooming lens system-driving control apparatus, comprising:

a plurality of lens groups movably provided so as to be movable along a direction of an optical axis therebetween and including a focus lens group used for focusing and a zooming lens group used for zooming;

a plurality of motors provided in order to drive the plurality of lens groups, respectively;

focusing distance-detecting means for detecting focusing distances of the plurality of lens groups and outputting focusing distance data;

focus lens group position-storing means for storing position data representing those positions where the focus lens group is in focus with reference to an infinity, such that the position data is stored for each focusing distance as a relative amount to one of said plurality of lens groups, with the positions of the plurality of lens groups determined with reference to the infinity being used as a reference;

focus state number-storing means for storing a focus state number which represents how the focus lens group is before the start of the focusing operation; and control means for reading positions of the focus lens group, during the focusing operation, from amount the position data stored in the focus lens group position-storing means on the basis of the focusing distance data and object distance data corresponding to a new focus state number, determining distances for which the plurality of lens groups are driven and reach the positions whose data is read out, and outputting a control signal to the plurality of motors.

13. A zooming lens system-driving control apparatus according to claim 12, further comprising a manual focus operation member for commanding a manual focusing operation, and wherein the focusing operation is started by an operation of the manual focus operation member, and the new focus state number is updated when the motors are driven for a predetermined distance by the control means.

14. A zooming lens system-driving control apparatus according to claim 12, further comprising:

distance-measuring means for measuring a distance to an object and outputting distance data; and an autofocus operation member for commanding the start of the focusing operation in response to an output of the distance-measuring means, and wherein the focusing operation is started by an operation of the autofocus operation member, and the new focus state number is determined in accordance with the distance data.

15. A zooming lens system-driving control apparatus, comprising:

a plurality of lens groups movably provided so as to be movable along a direction of an optical axis therebetween and including a focus lens group used for focusing therebetween and a zooming lens group used for zooming;

a plurality of motors provided in order to drive the plurality of lens groups, respectively;

focusing distance-detecting means for detecting focusing distances of the plurality of lens groups and outputting focusing distance data;

first output means for outputting position data representing those positions where the plurality of lens groups are in focus with reference to an infinity, such that the position data is output for each focusing distance;

second output means for outputting position data representing those positions where the plurality of lens groups are in focus with reference to a distance different from the infinity as a relative amount to one of said plurality of lens groups, such that the position data is output for each focusing distances and with the positions of the plurality of lens groups determined with reference to the infinity being used as a focus state number-storing means for storing a focus state number of the focus lens group; and control means for determining driving positions of the plurality of lens groups such that, in the case of a zooming operation, they are determined by adding the position data which the second output means outputs on the basis of a distance corresponding to the stored focus state number to the position data which is output by the first output means and such that, in the case of a manual or auto focus operation, they are determined by correcting the position data which the second output means outputs on the basis of the distance corresponding to the stored focus state number, determine driving distances for which the lens groups are driven and reach the driving positions, and outputting a control signal to the plurality of motors.

16. A zooming lens system-driving control apparatus according to claim 15, wherein at least one of the first and second output means includes storage means for storing data which represents positional relationships among the plurality of lens groups.

17. A zooming lens system-driving control apparatus according to claim 15, wherein at least one of the first and second output means includes calculation means for calculating positional relationships among the plurality of lens groups by use of a predetermined calculation formula.

18. A zooming lens system-driving control apparatus according to claim 15, wherein at least one of the first and second output means includes:

storage means for storing data which represents positional relationships among the plurality of lens groups; and calculation means for performing interpolation calculation on the basis of the positional relationships stored in the storage means.

19. A zooming lens system-driving control apparatus according to claim 15, further comprising distance-measuring device for measuring an object distance, and wherein said control means includes means for deriving final target positions of the plurality of lens groups from an output of the second output means in accordance with the object distance measured by the distance-measuring device, and simultaneously driving the lens groups to the final target positions.

20. A zooming lens system-driving control apparatus, comprising:

a plurality of lens groups movably provided so as to be movable along a direction of an optical axis therebetween;

a plurality of motors provided in order to drive the plurality of lens groups, respectively;

focus distance-detecting means for detecting focusing distances of the plurality of lens groups;

first storage means for storing position data representing those positions of the plurality of lens groups associated with an infinity, such that the position data is stored on the basis of the focusing distances;

second storage means for storing position data representing those positions of the plurality of lens groups which are determined in accordance with the focusing distances of the plurality of lens groups with reference to the positions associated with the infinity as a relative amount to one of said plurality of lens groups; and control means for obtaining driving distances of the lens groups on the basis of at least one of outputs of the first and second storage means during a zooming operation or a focusing operation, determining a control signal in accordance with the driving distances, and supplying the control signal to the motors, thereby controlling the plurality of motors.

21. A zooming lens system-driving control apparatus according to claim 20, further comprising:

single driving means for generating a driving signal with which to drive at least two of the plurality of motors; and a switching circuit inserted between the motors and the driving means, and wherein said control means sequentially selects the motors one by one, supplies a switching signal to the switching circuit, and performs driving control on the basis of the driving distances.

22. A zooming lens system-driving control apparatus according to claim 20, further comprising a plurality of driving means, connected to the plurality of lens groups, respectively, for generating driving signals with which to drive the motors independently of one another, and wherein said control means drives the driving means substantially simultaneously on the basis of the driving distances.

23. A focus adjustment apparatus for a zoom lens capable of performing auto focusing or power focusing, said apparatus comprising:

means for detecting a present zoom region which is one of a plurality of a divided zoom regions;

a plurality of lens groups which are electrically driven independently of one another, for focus adjustment;

means for storing data representing those positional relationships of the plurality of lens groups which are determined with reference to an object distance as a relative amount to one of said plurality of lens groups, such that the data is stored for each zoom region;

means for calculating a target driving position of a reference lens group which is one of said plurality of lens groups, during a focus adjustment operation, and determining target driving positions of the lens groups other than the reference lens groups of the plurality of lens groups, with the data stored in the storing means being referred to in accordance with data on the target driving position of the reference lens group and data on the present zoom region; and means for driving the plurality of lens groups to the target driving positions, respectively.

24. An apparatus for making focus adjustment of a zoom lens on the basis of object distance data output by focus-detecting means, comprising:

means for detecting a present zoom region, one of a plurality of zoom regions, on the basis of the position of a lens group movable in accordance with a zooming operation alone;

a plurality of lens groups which are electrically driven independently of one another, for focus adjustment;

means for storing data representing those positional relationship of the plurality of lens groups which are determined with reference to an object distance as a relative amount to one of said plurality of lens groups, such that the data is stored for each zoom region;

means for determining advancing distances of the lens groups, with the data stored in the storing means being referred to in accordance with the object distance data output by focus-detecting means and data on the present zoom region; and means for driving the plurality of lens groups in accordance with the advancing distances, respectively.

* * * * *